US009570002B2

(12) United States Patent
Sakariya et al.

(10) Patent No.: US 9,570,002 B2
(45) Date of Patent: Feb. 14, 2017

(54) INTERACTIVE DISPLAY PANEL WITH IR DIODES

(71) Applicant: LuxVue Technology Corporation, Santa Clara, CA (US)

(72) Inventors: Kapil V. Sakariya, Sunnyvale, CA (US); Tore Nauta, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/307,336

(22) Filed: Jun. 17, 2014

(65) Prior Publication Data

US 2015/0364107 A1    Dec. 17, 2015

(51) Int. Cl.
| | |
|---|---|
| *G09G 3/3225* | (2016.01) |
| *G09G 3/32* | (2016.01) |
| *G06F 3/041* | (2006.01) |
| *G06F 3/042* | (2006.01) |

(52) U.S. Cl.
CPC ............ *G09G 3/3225* (2013.01); *G06F 3/042* (2013.01); *G06F 3/0412* (2013.01); *G09G 2300/04* (2013.01); *G09G 2300/0809* (2013.01); *G09G 2320/0626* (2013.01); *G09G 2320/0686* (2013.01); *G09G 2358/00* (2013.01); *G09G 2360/144* (2013.01); *G09G 2360/148* (2013.01); *G09G 2370/08* (2013.01)

(58) Field of Classification Search
None
See application file for complete search history.

(56) References Cited

U.S. PATENT DOCUMENTS

| | | | |
|---|---|---|---|
| 3,717,743 A | | 2/1973 | Costello |
| 3,935,986 A | | 2/1976 | Lattari et al. |
| 4,618,814 A | | 10/1986 | Kato et al. |
| 5,131,582 A | | 7/1992 | Kaplan et al. |
| 5,378,926 A | | 1/1995 | Chi et al. |
| 5,435,857 A | | 7/1995 | Han et al. |
| 5,448,082 A | * | 9/1995 | Kim ................................ 257/82 |

(Continued)

FOREIGN PATENT DOCUMENTS

| | | |
|---|---|---|
| EP | 1 694 099 A2 | 8/2006 |
| JP | 07-060675 A | 3/1995 |

(Continued)

OTHER PUBLICATIONS

Asano, Kazutoshi, et al., "Fundamental Study of an Electrostatic Chuck for Silicon Wafer Handling" IEEE Transactions on Industry Applications, vol. 38, No. 3, May/Jun. 2002, pp. 840-845.

(Continued)

*Primary Examiner* — Kathy Wang-Hurst
*Assistant Examiner* — Matthew Yeung
(74) *Attorney, Agent, or Firm* — Blakely, Sokoloff, Taylor & Zafman LLP

(57) ABSTRACT

Exemplary methods and systems use a micro light emitting diode (LED) in an active matrix display to emit light and a sensing IR diode to sense light. A display panel includes a display substrate having a display region, an array of subpixel circuits, and an array of selection devices. Each subpixel circuit includes a driving circuit to operate a corresponding infrared (IR) emitting LED in a light emission mode. Each selection device may be coupled to a corresponding sensing IR diode to operate the corresponding sensing IR diode in a light sensing mode.

20 Claims, 28 Drawing Sheets

(56) References Cited

U.S. PATENT DOCUMENTS

| | | | |
|---|---|---|---|
| 5,592,358 A | 1/1997 | Shamouilian et al. | |
| 5,740,956 A | 4/1998 | Seo et al. | |
| 5,794,839 A | 8/1998 | Kimura et al. | |
| 5,839,187 A | 11/1998 | Sato et al. | |
| 5,851,664 A | 12/1998 | Bennett et al. | |
| 5,888,847 A | 3/1999 | Rostoker et al. | |
| 5,903,428 A | 5/1999 | Grimard et al. | |
| 5,996,218 A | 12/1999 | Shamouilian et al. | |
| 6,071,795 A | 6/2000 | Cheung et al. | |
| 6,080,650 A | 6/2000 | Edwards | |
| 6,081,414 A | 6/2000 | Flanigan et al. | |
| 6,335,263 B1 | 1/2002 | Cheung et al. | |
| 6,403,985 B1 | 6/2002 | Fan et al. | |
| 6,420,242 B1 | 7/2002 | Cheung et al. | |
| 6,521,511 B1 | 2/2003 | Inoue et al. | |
| 6,558,109 B2 | 5/2003 | Gibbel | |
| 6,613,610 B2 | 9/2003 | Iwafuchi et al. | |
| 6,629,553 B2 | 10/2003 | Odashima et al. | |
| 6,670,038 B2 | 12/2003 | Sun et al. | |
| 6,683,368 B1 | 1/2004 | Mostafazadeh | |
| 6,786,390 B2 | 9/2004 | Yang et al. | |
| 6,788,109 B2 | 9/2004 | Kitagawa | |
| 6,878,607 B2 | 4/2005 | Inoue et al. | |
| 6,918,530 B2 | 7/2005 | Shinkai et al. | |
| 7,015,825 B2 | 3/2006 | Callahan | |
| 7,033,842 B2 | 4/2006 | Haji et al. | |
| 7,079,205 B2 | 7/2006 | Kuji | |
| 7,148,127 B2 | 12/2006 | Oohata et al. | |
| 7,208,337 B2 | 4/2007 | Eisert et al. | |
| 7,353,596 B2 | 4/2008 | Shida et al. | |
| 7,358,158 B2 | 4/2008 | Aihara et al. | |
| 7,439,549 B2 | 10/2008 | Marchl et al. | |
| 7,585,703 B2 | 9/2009 | Matsumura et al. | |
| 7,628,309 B1 | 12/2009 | Erikssen et al. | |
| 7,642,710 B2 | 1/2010 | Yao et al. | |
| 7,714,336 B2 | 5/2010 | Imai | |
| 7,723,764 B2 | 5/2010 | Oohata et al. | |
| 7,795,629 B2 | 9/2010 | Watanabe et al. | |
| 7,797,820 B2 | 9/2010 | Shida et al. | |
| 7,838,410 B2 | 11/2010 | Hirao et al. | |
| 7,854,365 B2 | 12/2010 | Li et al. | |
| 7,880,184 B2 | 2/2011 | Iwafuchi et al. | |
| 7,884,543 B2 | 2/2011 | Doi | |
| 7,888,690 B2 | 2/2011 | Iwafuchi et al. | |
| 7,906,787 B2 | 3/2011 | Kang | |
| 7,910,945 B2 | 3/2011 | Donofrio et al. | |
| 7,927,976 B2 | 4/2011 | Menard | |
| 7,928,465 B2 | 4/2011 | Lee et al. | |
| 7,972,875 B2 | 7/2011 | Rogers et al. | |
| 7,989,266 B2 | 8/2011 | Borthakur et al. | |
| 7,999,454 B2 | 8/2011 | Winters et al. | |
| 8,023,248 B2 | 9/2011 | Yonekura et al. | |
| 8,076,670 B2 | 12/2011 | Slater et al. | |
| 8,186,568 B2 | 5/2012 | Coronel et al. | |
| 8,333,860 B1 | 12/2012 | Bibl et al. | |
| 8,349,116 B1 | 1/2013 | Bibl et al. | |
| 8,390,582 B2 | 3/2013 | Hotelling et al. | |
| 8,426,227 B1 | 4/2013 | Bibl et al. | |
| 8,518,204 B2 | 8/2013 | Hu et al. | |
| 8,552,436 B2 | 10/2013 | Bibl et al. | |
| 8,558,243 B2 | 10/2013 | Bibl et al. | |
| 8,573,469 B2 | 11/2013 | Hu et al. | |
| 8,614,693 B2 | 12/2013 | King et al. | |
| 8,646,505 B2 | 2/2014 | Bibl et al. | |
| 8,730,196 B2 | 5/2014 | Hotelling et al. | |
| 8,730,197 B2 | 5/2014 | Hamaguchi et al. | |
| 2001/0029088 A1 | 10/2001 | Odajima et al. | |
| 2002/0076848 A1 | 6/2002 | Spooner et al. | |
| 2002/0140713 A1 | 10/2002 | Klompenhouwer et al. | |
| 2003/0010975 A1 | 1/2003 | Gibb et al. | |
| 2003/0177633 A1 | 9/2003 | Haji et al. | |
| 2003/0197664 A1 | 10/2003 | Koyama | |
| 2004/0100164 A1 | 5/2004 | Murata et al. | |
| 2004/0227704 A1 | 11/2004 | Wang et al. | |
| 2004/0232439 A1 | 11/2004 | Gibb et al. | |
| 2004/0266048 A1 | 12/2004 | Platt et al. | |
| 2005/0185113 A1 | 8/2005 | Weindorf et al. | |
| 2005/0224822 A1 | 10/2005 | Liu | |
| 2005/0232728 A1 | 10/2005 | Rice et al. | |
| 2005/0243039 A1 | 11/2005 | Kwak | |
| 2006/0038291 A1 | 2/2006 | Chung et al. | |
| 2006/0055035 A1 | 3/2006 | Lin et al. | |
| 2006/0065905 A1 | 3/2006 | Eisert et al. | |
| 2006/0157721 A1 | 7/2006 | Tran et al. | |
| 2006/0160276 A1 | 7/2006 | Brown et al. | |
| 2006/0214299 A1 | 9/2006 | Fairchild et al. | |
| 2006/0244693 A1* | 11/2006 | Yamaguchi et al. | 345/76 |
| 2007/0048902 A1 | 3/2007 | Hiatt et al. | |
| 2007/0166851 A1 | 7/2007 | Tran et al. | |
| 2007/0194330 A1 | 8/2007 | Ibbetson et al. | |
| 2007/0284604 A1 | 12/2007 | Slater et al. | |
| 2008/0018830 A1* | 1/2008 | Negley | G02F 1/133603 349/69 |
| 2008/0048206 A1 | 2/2008 | Lee et al. | |
| 2008/0074401 A1* | 3/2008 | Chung et al. | 345/175 |
| 2008/0150134 A1 | 6/2008 | Shinkai et al. | |
| 2008/0163481 A1 | 7/2008 | Shida et al. | |
| 2008/0194054 A1 | 8/2008 | Lin et al. | |
| 2008/0196237 A1 | 8/2008 | Shinya et al. | |
| 2008/0205027 A1 | 8/2008 | Coronel et al. | |
| 2008/0283190 A1 | 11/2008 | Papworth et al. | |
| 2008/0283849 A1 | 11/2008 | Imai | |
| 2008/0303038 A1 | 12/2008 | Grotsch et al. | |
| 2009/0033604 A1* | 2/2009 | Silzars | G09G 3/30 345/84 |
| 2009/0068774 A1 | 3/2009 | Slater et al. | |
| 2009/0072382 A1 | 3/2009 | Guzek | |
| 2009/0146303 A1 | 6/2009 | Kwon | |
| 2009/0167644 A1 | 7/2009 | White et al. | |
| 2009/0242918 A1 | 10/2009 | Edmond et al. | |
| 2009/0289910 A1* | 11/2009 | Hattori | 345/173 |
| 2009/0303713 A1 | 12/2009 | Chang et al. | |
| 2009/0314991 A1 | 12/2009 | Cho et al. | |
| 2010/0039030 A1* | 2/2010 | Winters | H01L 27/3248 313/505 |
| 2010/0052004 A1 | 3/2010 | Slater et al. | |
| 2010/0105172 A1 | 4/2010 | Li et al. | |
| 2010/0123164 A1 | 5/2010 | Suehiro et al. | |
| 2010/0176415 A1 | 7/2010 | Lee et al. | |
| 2010/0188794 A1 | 7/2010 | Park et al. | |
| 2010/0200884 A1 | 8/2010 | Lee et al. | |
| 2010/0203659 A1 | 8/2010 | Akaike et al. | |
| 2010/0203661 A1 | 8/2010 | Hodota | |
| 2010/0213471 A1 | 8/2010 | Fukasawa et al. | |
| 2010/0214777 A1 | 8/2010 | Suehiro et al. | |
| 2010/0248484 A1 | 9/2010 | Bower et al. | |
| 2010/0276726 A1 | 11/2010 | Cho et al. | |
| 2011/0001145 A1 | 1/2011 | Park | |
| 2011/0003410 A1 | 1/2011 | Tsay et al. | |
| 2011/0049540 A1 | 3/2011 | Wang et al. | |
| 2011/0069096 A1 | 3/2011 | Li et al. | |
| 2011/0132655 A1 | 6/2011 | Horiguchi et al. | |
| 2011/0132656 A1 | 6/2011 | Horiguchi et al. | |
| 2011/0143467 A1 | 6/2011 | Xiong et al. | |
| 2011/0147760 A1 | 6/2011 | Ogihara et al. | |
| 2011/0151602 A1 | 6/2011 | Speier | |
| 2011/0159615 A1 | 6/2011 | Lai | |
| 2011/0187653 A1* | 8/2011 | Ko et al. | 345/173 |
| 2011/0210357 A1 | 9/2011 | Kaiser et al. | |
| 2011/0244611 A1 | 10/2011 | Kim | |
| 2011/0291134 A1 | 12/2011 | Kang | |
| 2011/0297914 A1 | 12/2011 | Zheng et al. | |
| 2011/0312131 A1 | 12/2011 | Renavikar et al. | |
| 2012/0018494 A1 | 1/2012 | Jang et al. | |
| 2012/0064642 A1 | 3/2012 | Huang et al. | |
| 2012/0134065 A1 | 5/2012 | Furuya et al. | |
| 2012/0250323 A1 | 10/2012 | Velu | |
| 2013/0019996 A1 | 1/2013 | Routledge | |
| 2013/0038416 A1 | 2/2013 | Arai et al. | |
| 2013/0126098 A1 | 5/2013 | Bibl et al. | |
| 2013/0130440 A1 | 5/2013 | Hu et al. | |
| 2013/0134591 A1 | 5/2013 | Sakamoto et al. | |
| 2013/0161682 A1 | 6/2013 | Liang et al. | |
| 2013/0181949 A1 | 7/2013 | Setlak | |

(56) References Cited

U.S. PATENT DOCUMENTS

| | | |
|---|---|---|
| 2013/0221856 A1 | 8/2013 | Soto |
| 2013/0234175 A1* | 9/2013 | Okada .................. H01L 25/0753 257/89 |
| 2013/0300953 A1 | 11/2013 | Hotelling et al. |
| 2014/0028575 A1 | 1/2014 | Parivar et al. |
| 2014/0092052 A1 | 4/2014 | Grunthaner et al. |
| 2014/0168037 A1 | 6/2014 | Sakariya et al. |

FOREIGN PATENT DOCUMENTS

| | | |
|---|---|---|
| JP | 11-142878 | 5/1999 |
| JP | 2001-298072 A | 10/2001 |
| JP | 2001-353682 A | 12/2001 |
| JP | 2002-134822 A | 5/2002 |
| JP | 2002-164695 A | 6/2002 |
| JP | 2002-176291 A | 6/2002 |
| JP | 2002-240943 A | 8/2002 |
| JP | 2004-095944 A | 3/2004 |
| JP | 2008-200821 A | 9/2008 |
| JP | 2010-056458 A | 3/2010 |
| JP | 2010-161212 A | 7/2010 |
| JP | 2010-186829 A | 8/2010 |
| JP | 2011-181834 A | 9/2011 |
| KR | 10-0610632 B1 | 8/2006 |
| KR | 10-2007-0042214 A | 4/2007 |
| KR | 10-2007-0093091 A | 9/2007 |
| KR | 10-0973928 B1 | 8/2010 |
| KR | 10-1001454 B1 | 12/2010 |
| KR | 10-2007-0006885 A | 1/2011 |
| KR | 10-2011-0084888 A | 7/2011 |
| WO | WO 2005-099310 A2 | 10/2005 |
| WO | WO 2011/123285 | 10/2011 |

OTHER PUBLICATIONS

Bower, C.A., et al., "Active-Matrix OLED Display Backplanes Using Transfer-Printed Microscale Integrated Circuits", IEEE, 2010 Electronic Components and Technology Conference, pp. 1339-1343.

"Characteristics of electrostatic Chuck(ESC)" Advanced Materials Research Group, New Technology Research Laboratory, 2000, pp. 51-53 accessed at http://www.socnb.com/report/ptech_e/2000p51_e.pdf.

Guerre, Roland, et al, "Selective Transfer Technology for Microdevice Distribution" Journal of Microelectromechanical Systems, vol. 17, No. 1, Feb. 2008, pp. 157-165.

Han, Min-Koo, "AM backplane for AMOLED" Proc. Of ASID '06, Oct. 8-12, New Delhi, pp. 53-58.

Harris, Jonathan H., "Sintered Aluminum Nitride Ceramics for High-Power Electronic Applications" Journal of the Minerals, Metals and Materials Society, vol. 50, No. 6, Jun. 1998, p. 56.

Horwitz, Chris M., "Electrostatic Chucks: Frequently Asked Questions" Electrogrip, 2006, 10 pgs, accessed at www.electrogrip.com.

Hossick-Schott, Joachim, "Prospects for the ultimate energy density of oxide-based capacitor anodes" Proceedings of CARTS Europe, Barcelona, Spain, 2007, 10 pgs.

Lee, San Youl, et al., "Wafer-level fabrication of GAN-based vertical light-emitting diodes using a multi-functional bonding material system" Semicond. Sci. Technol. 24, 2009, 4 pgs.

"Major Research Thrust: Epitaxial Layer Transfer by Laser Lift-off" Purdue University, Heterogeneous Integration Research Group, accessed at https://engineering.purdue.edu/HetInt/project_epitaxial_layer_transfer_llo.htm, last updated Aug. 2003.

Mei, Zequn, et al., "Low-Temperature Solders" Hewlett-Packard Journal, Article 10, Aug. 1996, pp. 1-10.

Mercado, Lei, L., et al., "A Mechanical Approach to Overcome RF MEMS Switch Stiction Problem" 2003 Electronic Components and Technology Conference, pp. 377-384.

Miskys, Claudio R., et al., "Freestanding GaN-substrates and devices" phys. Stat. sol. © 0, No. 6, 2003, pp. 1627-1650.

"Principles of Electrostatic Chucks: 1—Techniques for High Performance Grip and Release" ElectroGrip, Principles1 rev3 May 2006, 2 pgs, accessed at www.electrogrip.com.

Steigerwald, Daniel, et al., "III-V Nitride Semiconductors for High-Performance Blue and Green Light-Emitting Devices" article appears in journal JOM 49 (9) 1997, pp. 18-23. Article accessed Nov. 2, 2011 at http://www.tms.org/pubs/journals/jom/9709/setigerwald-9709.html, 12 pgs.

Widas, Robert, "Electrostatic Substrate Clamping for Next Generation Semiconductor Devices" Apr. 21, 1999, 4 pgs.

Sarariya, et al., U.S. Appl. No. 14/294,494, entitled, "Interactive Display Panel with Emitting and Sensing Diodes," dated Jun. 3, 2014, 91 pgs.

"12-Bit High Bandwidth Multiplying DAC with Serial Interface: Data Sheet AD5452W," Rev. 0, Analog Devices, Inc., 2012, 24 pgs.

"Circuit Note CN-0139: Single Supply Low Noise LED Current Source Driver Using a Current Output DAC in the Reverse Mode" Rev. 0, Analog Devices, Inc., 2009, 2 pgs.

"LM3450: LM3450A LED Drivers with Active Power Factor Correction and Phase Dimming Decoder," Texas Instruments, Inc. SNVS681 C, Nov. 2010—Revised Jun. 2011, 37 pgs.

"Application Guide: Driving LEDs," found at www.micropowerdirect.com, Jun. 21, 2011, 8 pgs.

Tsujimura, et al., "OLED Displays: Fundamentals and Applications" 4.3 Passive-Matrix OLED Display, pp. 91-109, 5.2 TFT Process, pp. 110-120, 7.2 OLED Lighting Requirement, pp. 191-196, 2012, John Wiley & Sons, Inc., Hoboken, New Jersey, USA.

Campbell, Mikey, "Apple details in-display fingerprint sensor tech in patent filing from AuthenTec cofounder" Jul. 18, 2013, Article accessed Jul. 19, 2013 at http://appleinsider.com/articles/13/07/18/apple-details-in-display-fingerprint-sensor-tech-inpatent-filing-from-authentec-cofounder, 4 pgs.

Lee, Hoy, "A low-droop sample-and-hold circuit" The Institute of Physics, J. Phys. E: Sci. Instrum ., vol. 13, 1980, 2 pgs.

* cited by examiner

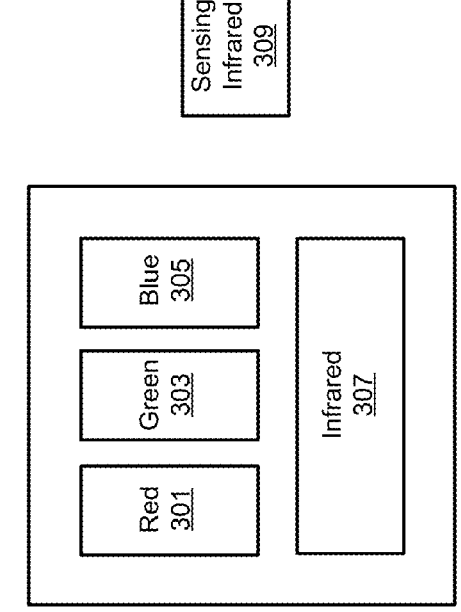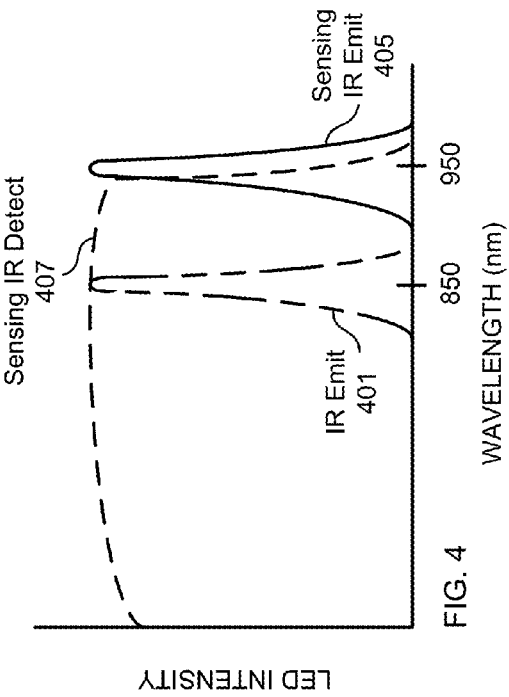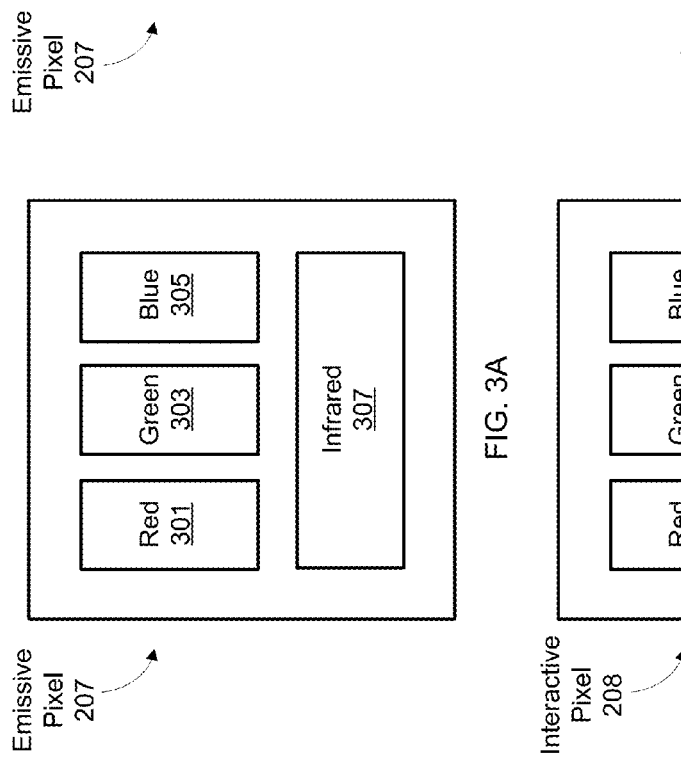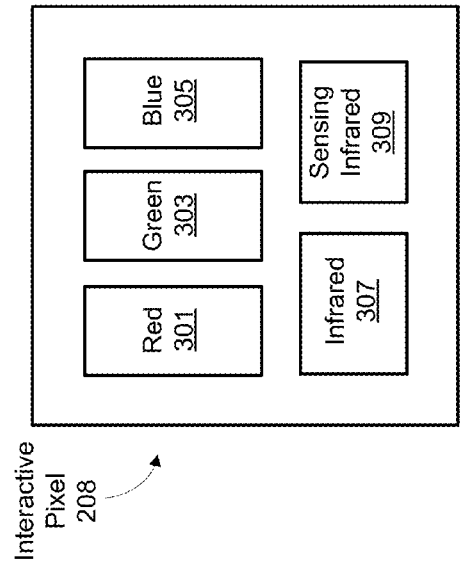

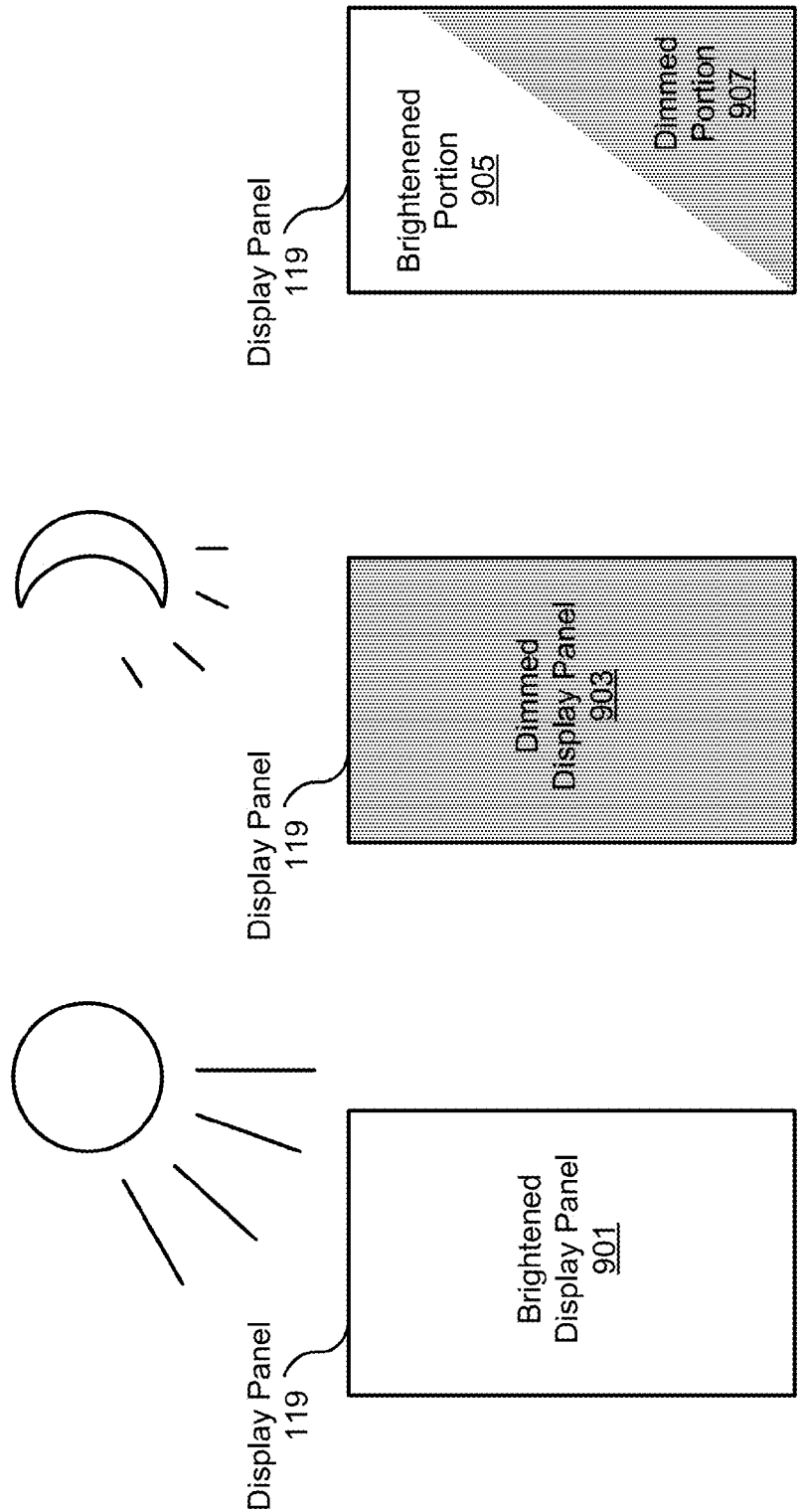

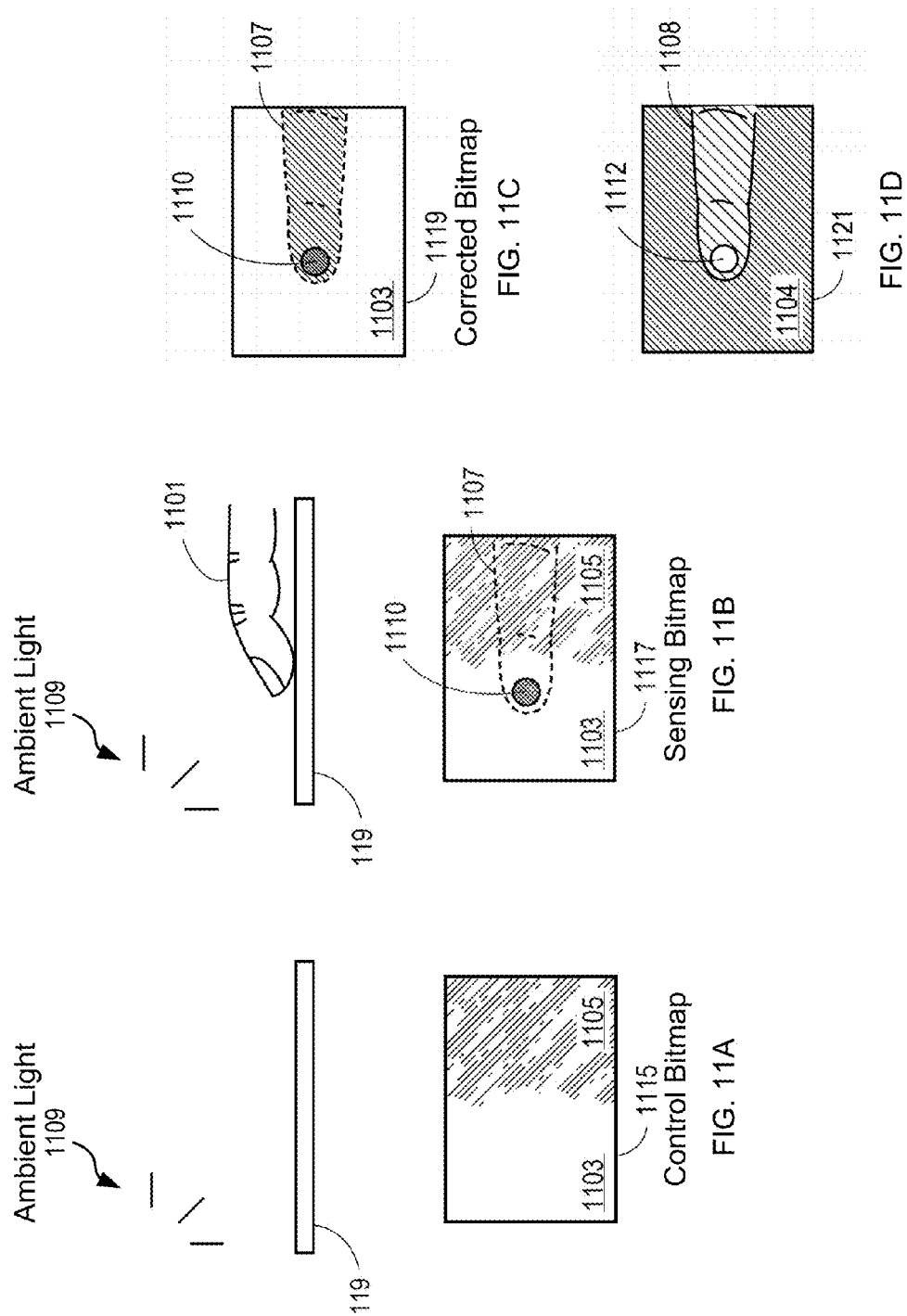

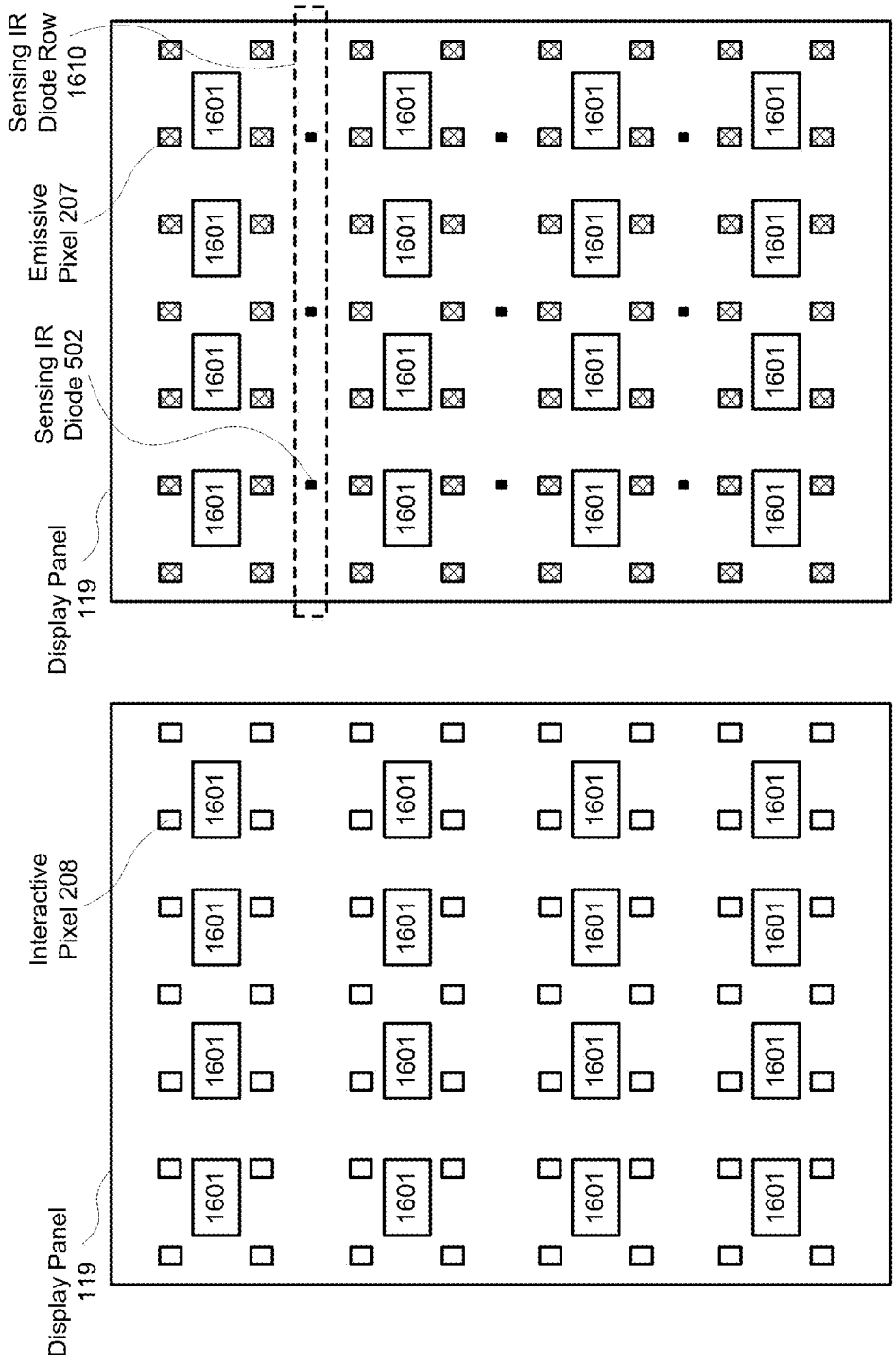

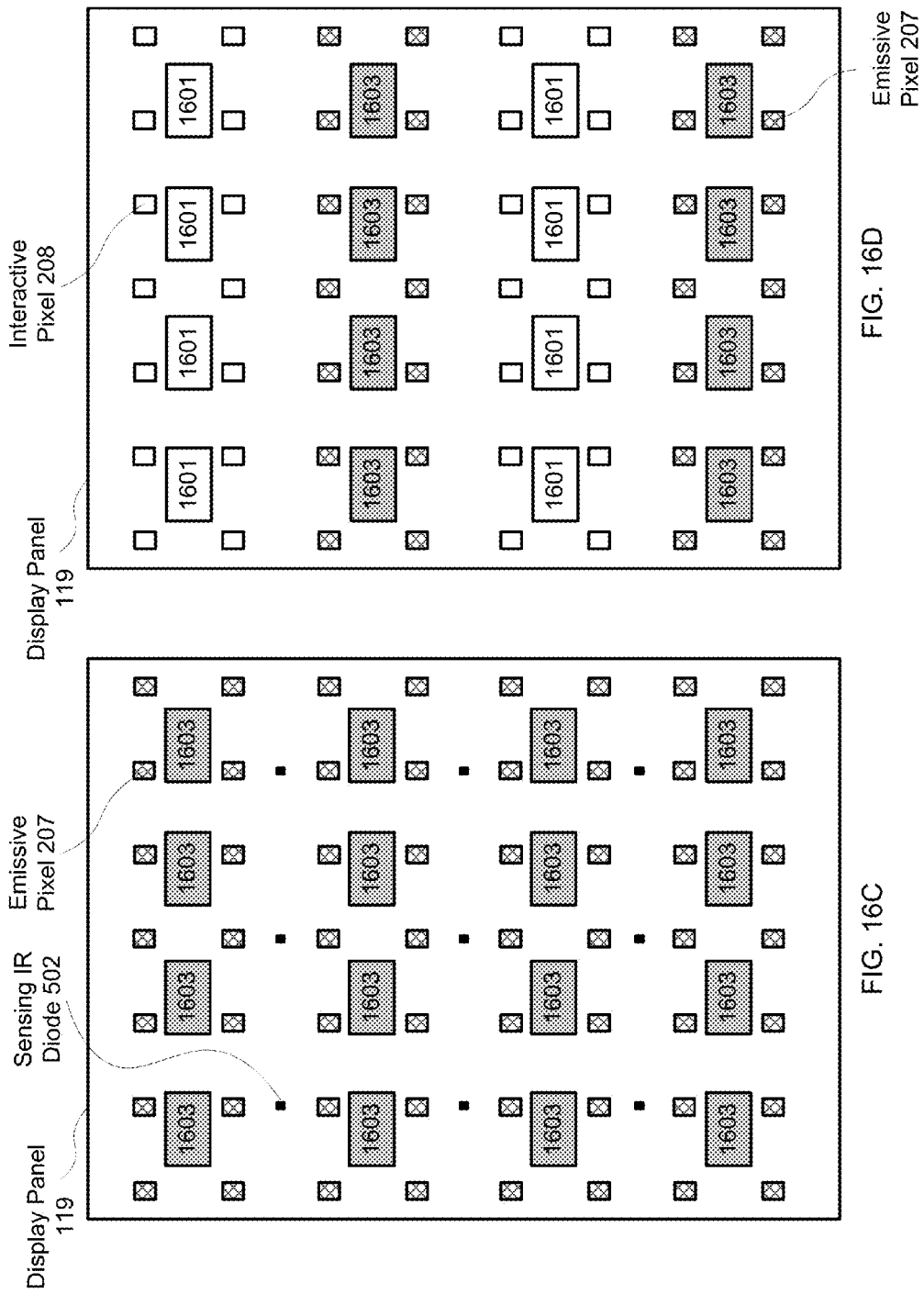

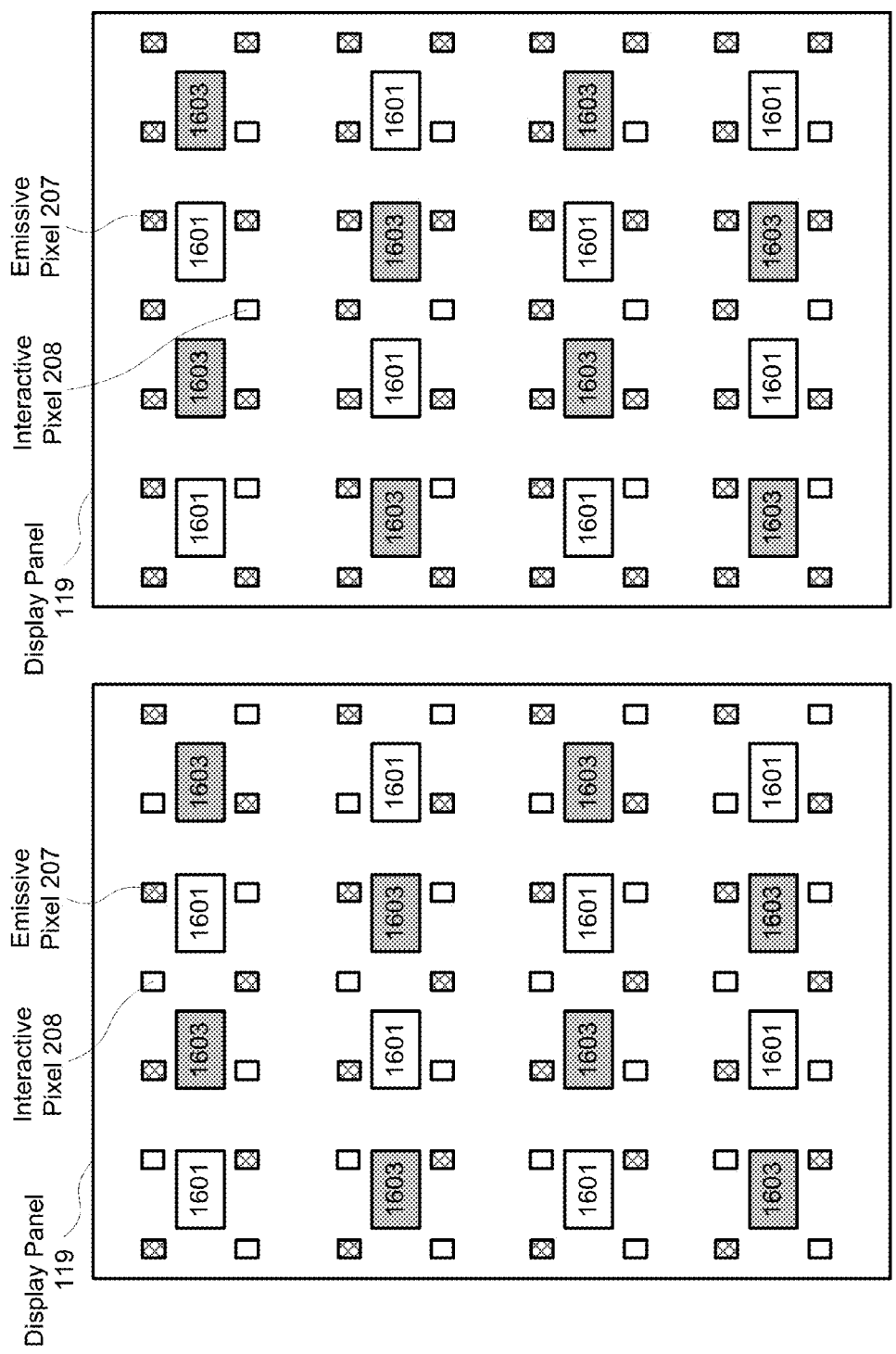

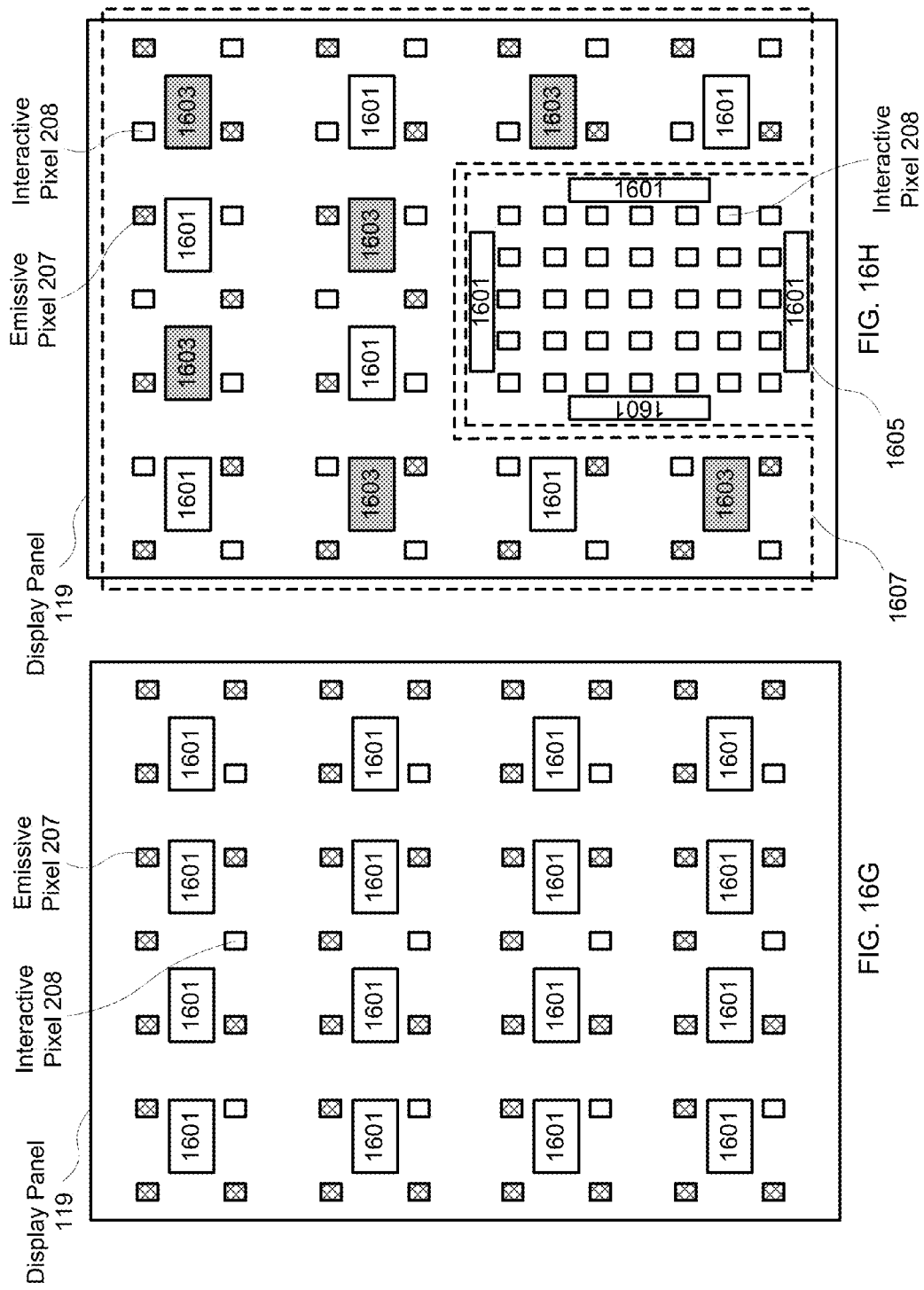

INTERACTIVE DISPLAY PANEL WITH IR DIODES

BACKGROUND

Field

The present invention relates to a display system. More particularly, embodiments of the present invention relate to interactive display panels.

Background Information

Interactive display systems are quickly becoming ubiquitous in modern electronic devices, such as cell phones, tablets, and laptop computers. A typical interactive flat panel display system includes an active matrix display panel and a separate sensor. For instance, an interactive flat panel display system typically includes an active matrix display panel and an interactive screen. The interactive screen includes a matrix of capacitors that are arranged at specific locations within the screen. The interactive screen is placed over the active matrix display panel such that the capacitors are arranged at strategic locations over the active matrix display panel. When a user interacts with the interactive screen, the capacitors output a corresponding signal to a processor. The signal is then processed as input signals and subsequently used to alter the active matrix display panel. Such interactive display systems require two separate devices to be layered together.

Other typical interactive display systems include an active matrix display panel with a separate sensor located near the active matrix display panel. These separate sensors are not layered over the active matrix display panel, but rather stacked on areas adjacent to it to avoid obstructing a display region in the display panel. The sensor, such as a light sensor (e.g., a photodiode), detects intensity of light emissions and relays corresponding signals to a processor. In response, the processor calculates the received signals and controls the active matrix display panel according to the calculations. Accordingly, such interactive display systems require two separate components located adjacent one another.

BRIEF DESCRIPTION OF THE DRAWINGS

FIGS. 3A-3C are block diagrams of emissive and interactive pixels containing subpixels in accordance with embodiments.

FIG. 4 is a chart plot illustrating the emission and sensing spectrum of an infrared (IR) emitting light emitting diode (LED) and a sensing IR diode in accordance with an embodiment.

FIGS. 9A-9C illustrate an operation of an interactive display panel with a processor configured for ambient light detection in accordance with an embodiment.

FIGS. 11A-11D illustrate an operation of an interactive display panel with a processor configured for object location determination in accordance with an embodiment.

FIGS. 16A-16H illustrate interactive display panels with different microchip, emitting LED, and sensing IR diode arrangements according to embodiments.

DETAILED DESCRIPTION

Figure 1:
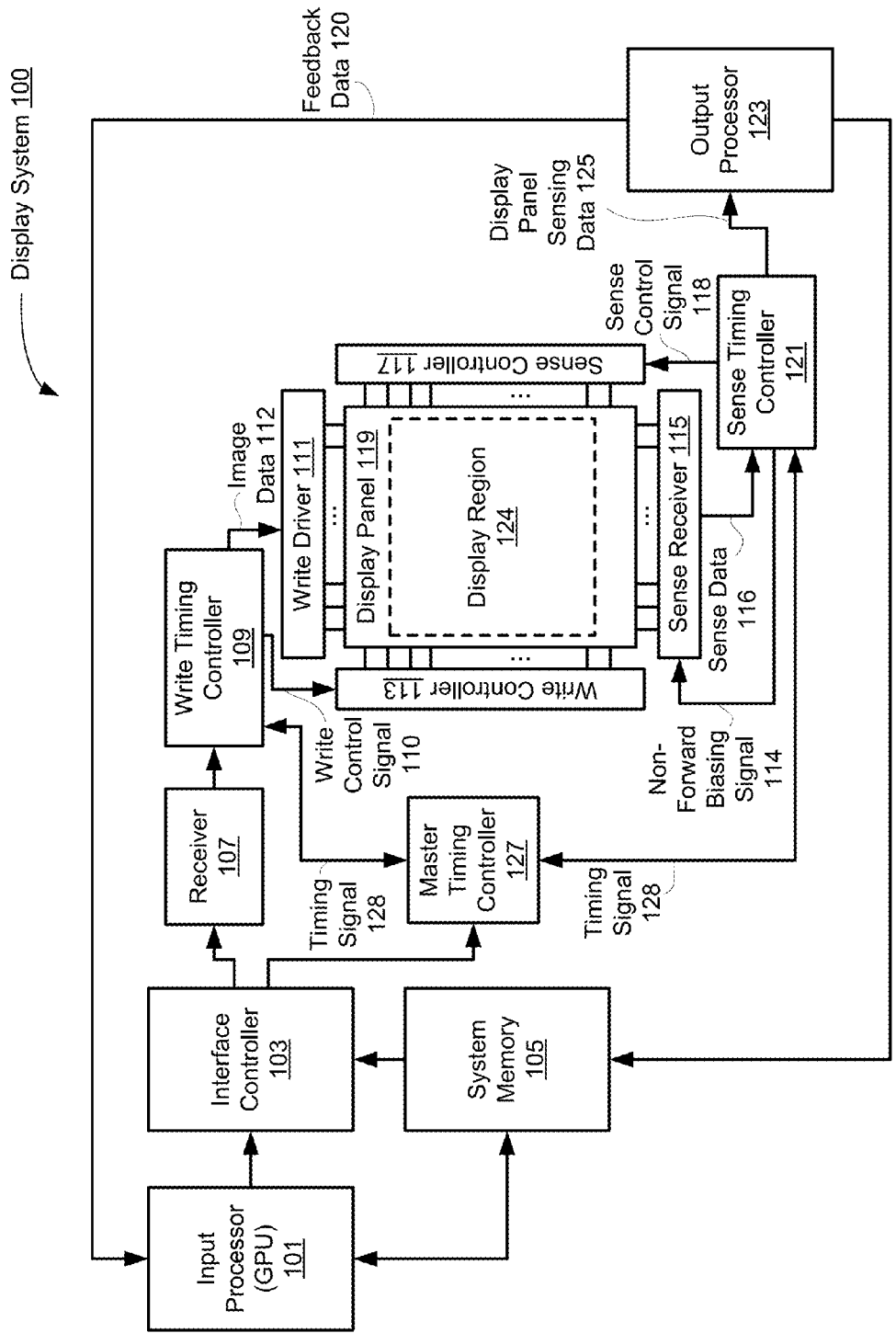
FIG. 1 is a block diagram of a display system according to an embodiment.

Embodiments of the invention relate to interactive display panels for sensing and emitting light. In an embodiment, an interactive display panel includes a display substrate having a display region, an array of subpixel circuits, and an array of selection devices. Each subpixel circuit may include a driving circuit to operate a corresponding infrared (IR) emitting LED in a light emission mode. Further, each selection device may be coupled to a corresponding sensing IR diode to operate the corresponding sensing IR diode in a light sensing mode. The driving circuit and/or selection device may be embedded in the substrate or inside a microchip mounted on the display substrate. As a result, display systems with interactive display panels described herein are able to sense with sensing IR diodes located in pixels on the display substrate and within the display region, as opposed to separate sensing components not on the display substrate or outside of the display region. The integration of sensing IR diodes into pixels within the display region may allow for thinner, less bulky display systems. Further, the ability to sense IR light enables the display panel to perform interactive operations without the need to emit visible light. Accordingly, a user can interact with a display panel even though the display panel appears to be off.

In accordance with some embodiments, the interactive display panel described herein is a micro LED active matrix display panel formed with inorganic or organic semiconductor-based micro LEDs. For example, a micro LED active matrix display panel utilizes the performance, efficiency, and reliability of inorganic semiconductor-based LEDs for both emitting and sensing light. Furthermore, the small size of micro LEDs enables a display panel to achieve high resolutions, pixel densities, and subpixel densities. In some embodiments, the high resolutions, pixel densities, and subpixel densities are achieved due to the small size of the micro LEDs and microchips. For example, the term "micro" as used herein, particularly with regard to IR diodes, LEDs, and microchips, refers to the descriptive size of certain devices or structures in accordance with embodiments. For example, the term "micro" may refer to the scale of 1 to 300 µm or, more specifically, 1 to 100 µm. In some embodiments, "micro" may even refer to the scale of 1 to 50 µm, 1 to 20 µm, or 1 to 10 µm. However, it is to be appreciated that embodiments of the present invention are not necessarily so limited, and that certain aspects of the embodiments may be applicable to larger, and possibly smaller size scales. For example, a 55 inch interactive television panel with 1920× 1080 resolution, and 40 pixels per inch (PPI) has an approximate pixel pitch of (634 µm×634 µm) A pixel that includes a red, green, blue, and IR emitting LEDs, may divide the pixel pitch equally amongst the four pixels. In some instances, the pixel pitch may be divided further for pixels that include a sensing IR diode. Furthermore, where real estate is reserved for microchips in addition to micro LEDs and IR diodes, the size of the micro LEDs and IR diodes may be further reduced. For example, a 5 inch interactive display panel with 1920×1080 resolution, and 440 pixels per inch (PPI) has an approximate pixel pitch of (58 µm×58 µm). Microchips may be arranged between pixels, subpixels, or LEDs and IR diodes. For example, each microchip may be characterized with a length and/or width less than the pitch between subpixels, pixels, or LEDs. In an embodiment, each microchip has a length greater than the pitch between subpixels or pixels and a width less than the pitch between subpixels or LEDs and IR diodes. Accordingly, some embodiments combine with efficiencies of semiconductor-based LEDs and IR diodes (e.g. inorganic semiconductor-based LEDs) for both emitting and sensing light with the scalability of semiconductor-based LEDs and IR diodes, and optionally microchips, to the micro scale for implementation into high resolution and pixel density applications.

In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of embodiments of the present invention. In other instances, well-known semiconductor processes and manufacturing techniques have not been described in particular detail in order to not unnecessarily obscure embodiments of the present invention. Reference throughout this specification to "one embodiment," "an embodiment" or the like means that a particular feature, structure, configuration, or characteristic described in connection with the embodiment is included in at least one embodiment. Thus, the appearances of the phrase "in one embodiment," "an embodiment" or the like in various places throughout this specification are not necessarily referring to the same embodiment. Furthermore, the particular features, structures, configurations, or characteristics may be combined in any suitable manner in one or more embodiments.

In an embodiment, a display system includes a display panel with an array of pixels. The array of pixels may include interactive pixels and emissive pixels. Each pixel may have at least one subpixel. Each subpixel may include one or more LEDs or IR diodes. An interactive pixel includes a subpixel with a sensing IR diode that is configured to detect light. The sensing IR diode may be an IR LED that is arranged in a way so that it cannot be forward biased. In an embodiment, the interactive pixel may also include subpixels having emitting LEDs that are configured to emit light. An emissive pixel includes emitting LEDs, but does not include a sensing IR diode. According to embodiments, the display panel is capable of emitting light or sensing light with the interactive and emissive pixels. In an embodiment, the display panel includes a selection device to electrically connect the sensing IR diode to a sensing circuit for detecting light. In a particular embodiment, the LEDs and IR diodes in the interactive and emissive pixels are micro LEDs and micro IR diodes. In some embodiments, the emitting LED in the emissive pixel is a red, green, or blue emitting LED in a red, green, and blue (RGB) subpixel arrangement or a red, green, blue, and IR emitting LED in a red, green, blue, and IR (RGBIR) subpixel arrangement, although embodiments are not so limited. In embodiments, the interactive pixel includes at least one emitting LED and a sensing IR diode. In an embodiment, the interactive pixel is a red, green, blue, IR, emitting LED and sensing IR diode (RGBIRSIR) subpixel arrangement. In an embodiment, each emissive and interactive subpixel includes a redundant pair of LEDs and IR diodes. Additionally, in an embodiment, each subpixel in the emissive pixel is electrically coupled to a write controller and a write driver, and each sensing IR diode in the interactive pixel is electrically coupled to a sense controller and a sense receiver. In an embodiment, each interactive pixel is electrically coupled to a write controller, write driver, sense driver, sense controller, and a sense receiver. An arrangement of signals can be sent from the controllers and the drivers to each subpixel. The arrangement of signals determines what image is displayed on the display panel as well as whether the display panel is sensing or emitting light. The sensing IR diode is a photosensitive device that can generate a signal when exposed to light. For instance, the sensing IR diode may be an IR LED that is configured to be driven to sense light. That is, the sensing IR diode may be an IR LED that is arranged in a way so that it cannot be forward biased. To sense light, the sensing IR diode is operated in a light sensing mode. In an embodiment, when the sensing IR diode is operated in the light sensing mode, the sensing IR diode is not forward biased ("non-forward biased"). A non-forward biased sensing IR diode may be driven in reverse bias with a reverse bias voltage applied by the sensing circuit, such as the sense receiver. A non-forward biased sensing IR diode may also be zero biased, e.g., not biased with a voltage although still operably coupled to the sensing circuit. As the sensing IR diode is exposed to light during the light sensing mode operation, it may generate a current or create a change in voltage or charge corresponding to an intensity of sensed light.

A write timing controller may be electrically coupled to the write controller and write driver to synchronize the data being sent to the display panel for displaying a cohesive image. In addition, a sense timing controller may be electrically coupled to the sense controller and sense receiver to synchronize reception of sensing data from the display panel for sensing with the interactive display panel. In an embodiment, the write timing controller and the sense timing controller are electrically coupled to a master timing controller to synchronize the orchestration of sensing and emitting light from the interactive display panel. The sense receiver may receive sensing output data from each individual sensing IR diode or a portion of the sensing IR diodes within the display panel.

In an embodiment, once the sense receiver receives the sensing output data from the sensing IR diodes, the sense receiver sends sense data to the sense timing controller, which then sends display panel sensing data to a processor in the form of a bitmap. The processor receives the bitmap and may use it to perform a useful operation. Using the display panel sensing data, the processor, or any other computing device, can perform a number of different operations including, but not limited to: (1) brightening or dimming a display panel in response to an amount of ambient light (ambient light detection), (2) turning the light emitting portion of a display panel on or off in response to an object's proximity to the display panel by sensing ambient light (ambient light proximity detection) or reflected light (reflected light proximity detection), (3) determine the location of an object relative to the dimensions of the display panel by sensing ambient light (ambient light object location detection) or by sensing reflected light (reflected light object location determination), (4) determining a surface profile of a target object by sensing reflected light (surface profile determination), and (5) calibrating display panel uniformity (display panel calibration). The details of each operation are discussed further below. It is to be appreciated that a processor may perform one or more of the operations in this list.

FIG. 1 is a block diagram depiction of a display system 100 that is configured to perform a method of emitting and sensing light with an interactive display panel according to an embodiment. The display system 100 includes a display panel 119, which may be an active matrix display that includes a two-dimensional matrix of display elements. In one embodiment, each display element is an emissive device, which, for example, may include organic light emitting diodes (OLEDs), semiconductor-based LEDs, or other light-emissive devices. In accordance with some specific embodiments, the LEDs are inorganic semiconductor-based micro LEDs.

The display panel 119 includes a matrix of pixels. Each pixel includes multiple subpixels that emit different colors of lights. At least one pixel may, however, include a subpixel that only detects light. An emissive pixel may have a red-green-blue-infrared (RGBIR) arrangement where the emissive pixel includes four subpixels that emit red, green, blue, and infrared light, respectively. An interactive pixel may have a red-green-blue-infrared-sensing infrared (RGBIRSIR) arrangement where each interactive pixel includes four subpixels that emit red, green, blue, and infrared light and one additional subpixel that can detect emitted red, green, blue, and infrared light. It is to be appreciated that the RGBIR and RGBIRSIR arrangements are exemplary and that embodiments are not so limited. Examples of other subpixel arrangements for emissive pixels include, but are not limited to, red-green-blue-yellow (RGBY), red-green-blue-yellow-infrared (RGBYIR), red-green-blue-yellow-cyan (RGBYC), red-green-blue-yellow-cyan-infrared (RGBYCIR), red-green-blue-white (RGBW), red-green-blue-white-infrared (RGBWIR), or other subpixel matrix schemes in which the emissive pixels have different numbers and/or colors of subpixels. Each of these subpixel arrangements may be paired with a sensing IR diode to form an interactive pixel that can sense and emit light. In an embodiment, the display panel 119 includes a display region 124. The display region 124 may be a region where light is emitted from emitting LEDs within the display panel 119. In an embodiment, the display region 124 is a region where a cohesive image is displayed on the display panel 119.

The display panel 119 may be driven by display driver integrated circuitry, which may include a write driver 111 and a write controller 113. The write controller 113 may select a row of the display panel 119 at a time by providing an ON voltage to the selected row. The selected row may be activated to receive pixel image data from the write driver 111 as will be discussed further below. In one embodiment, the write driver 111 and the write controller 113 are controlled by a write timing controller 109. The write timing controller 109 may provide the write controller 113 a write control signal 110 indicating which row is to be selected next for writing data. The write timing controller 109 may also provide the write driver 111 image data 112 in the form of a row of data voltages. Each data voltage may drive a corresponding subpixel in the selected row to emit a colored light at a specified intensity.

The display system 100 includes a receiver 107 to receive data to be displayed on the display panel 119. The receiver 107 may be configured to receive data wirelessly, by a wire connection, or by an optical interconnect. Wireless operation may be implemented in any of a number of wireless standards or protocols including, but not limited to, WiFi (IEEE 802.11 family), WiMAX (IEEE 802.16 family), IEEE 802.20, long term evolution (LTE), Ev-DO, HSPA+, HSDPA+, HSUPA+, EDGE, GSM, GPRSS, CDMA, TDMA, DECT, Bluetooth, derivatives thereof, as well as any other wireless protocols that are designated as 3G, 4G, 5G, and beyond.

The receiver 107 receives display data from an input processor 101 via an interface controller 103. In one embodiment, the input processor 101 is a graphics processing unit (GPU), a general-purpose processor having a GPU located therein, or a general-purpose processor with graphics processing capabilities. The interface controller 103 may provide display data and synchronization signals to the receiver 107, which in turn may provide the display data to the write timing controller 109. The display data may be generated in real time by the input processor 101 executing one or more instructions in a software program, retrieved from a system memory 105, or generated from local memory on the display panel 119. In an embodiment, the display panel 119 is in a "Panel Self-Refresh Mode" where the interface to the display panel is turned off and the image data is constantly generated from local memory on the display panel 119.

Depending on its applications, the display system 100 may include other components, such as a power supply, e.g., battery (not shown). In various implementations, the display system 100 may be a part of a television, tablet, phone, laptop, computer monitor, automotive heads-up display, kiosk, digital camera, handheld game console, media display, or ebook display.

According to an embodiment, in addition to being driven by the display driver integrated circuitry described above, the display panel 119 is also driven by display sensor integrated circuitry, which may include a sensing circuit (i.e., sense receiver 115) and a sense controller 117. The sense controller 117 may select one row of the display panel 119 at a time by providing an ON voltage to the selected row. The selected row may then be operated in a light sensing mode, i.e., be non-forward biased by the sense receiver 115, in order for the selected row to sense light. Output data from the selected row may be detected by the sense receiver 115 in the form of data voltage or current signals corresponding to the intensity of light sensed by each subpixel in the selected row. These signals may be calculated by a voltage or current calculator, such as, but not limited to, a digital to analog converter, a voltage sampler or comparator, a current sampler or comparator, and a charge amplifier located, in an embodiment, within the sense receiver 115. The sense receiver 115 may present sense data 116 to a sense timing controller 121. The sense receiver 115 and the sense controller 117 may be controlled by the sense timing controller 121. The sense timing controller 121 may provide the sense controller 117 a sense control signal 118 indicating which row is to be selected next for sensing light. The sense timing controller 121 may also present a non-forward biasing signal 114 to the sense receiver 115 to indicate a non-forward biasing voltage 228, such as no bias voltage or a reverse bias voltage 228, is to be applied to each sensing IR diode in the selected row for sensing light.

In embodiments, a master timing controller 127 is connected to the write timing controller 109 and the sense timing controller 121. The master timing controller 127 may control the timing synchronization between the write timing controller 109 and the sense timing controller 121. In an embodiment, the master timing controller 127 sends and receives timing signals 128 to and from the write timing controller 109 and the sense timing controller 121. The timing signals 128 sent from the master timing controller 127 may indicate to the write and sense timing controllers when to send write and sense signals to the display panel 119. Additionally, timing signals 128 may be sent back to the master timing controller 127 to indicate when an operation has been completed. In an embodiment, the master timing controller 127 receives timing parameters from the interface controller 103. The master timing controller 127 may use the timing parameters to determine which timing scheme will be used to operate the display panel 119.

In an embodiment, the sense timing controller 121 consolidates the sense data 116 and sends the consolidated sense data 116 to an output processor 123 as display panel sensing data 125. The display panel sensing data 125 received by the output processor 123 may be in the form of a bitmap that corresponds to the consolidated sense data 116 from sensing IR diodes. The output processor 123 may then process the display panel sensing data 125 and optionally sends feedback data 120 to the input processor 101 to alter the display properties of the display panel 119. The output processor 123 can be configured to perform a number of operations. For example, the output processor 123 can perform one or more of ambient light detection, ambient light proximity detection, reflected light proximity detection, ambient light object location determination, reflected light object location determination, surface profile determination, and display panel calibration as mentioned in the numbered list above. Although the output processor 123 is depicted as a separate processor, the input processor 101 and the output processor 123 can be a single processor that performs functions of both processors.

Figure 2:
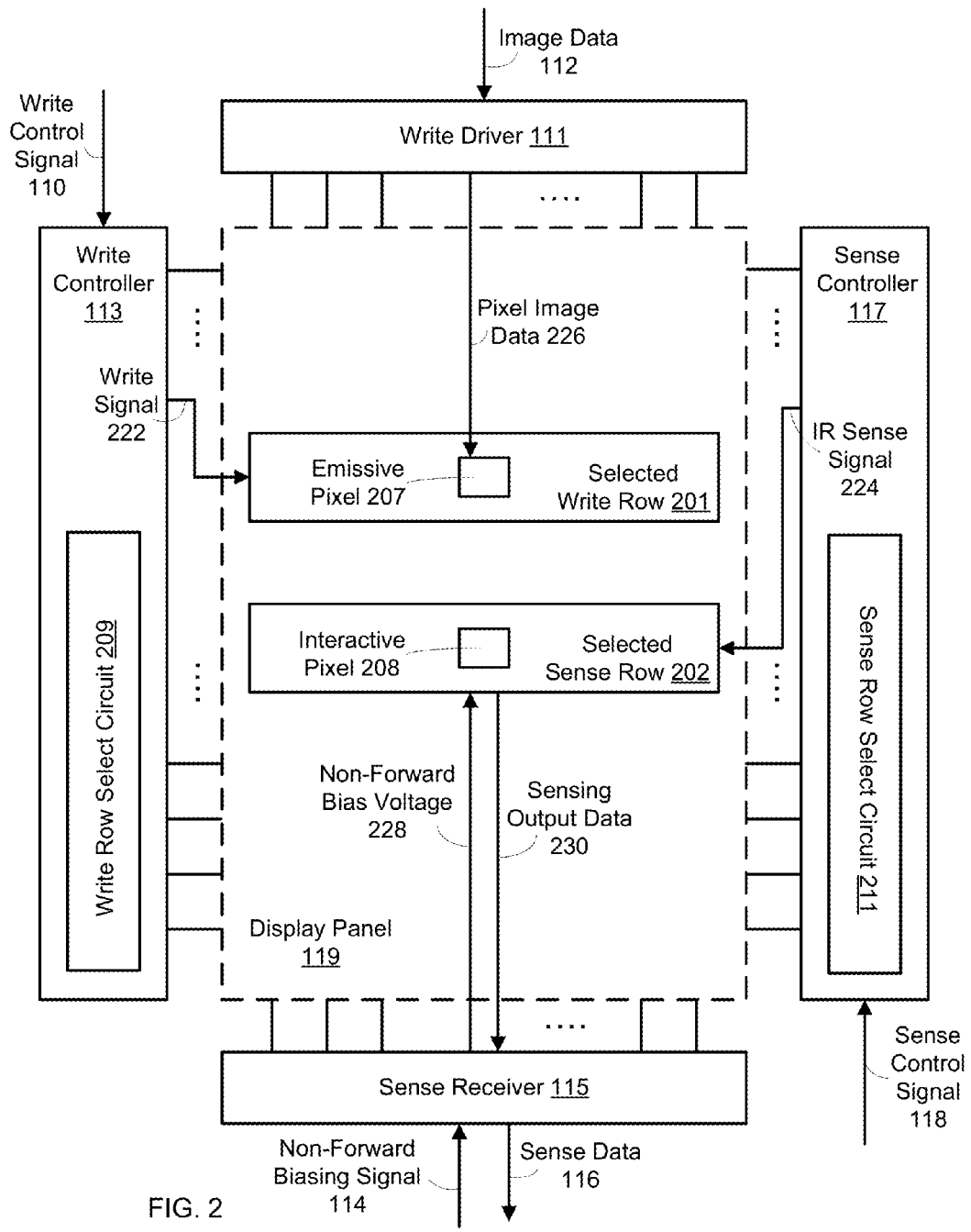
FIG. 2 is a block diagram of a display panel and its connection with the display driver integrated circuitry and sensing integrated circuitry in accordance with an embodiment.

FIG. 2 illustrates an example of the display panel 119 and its operation with the display driver integrated circuitry and display sensing integrated circuitry in further detail. In this example, the display panel 119 is in a decoupled sensing and emitting mode, in which a selected sense row 202 is sensing light and a selected write row 201 is being written with new data, while rows above and below the selected sense row 202 are emitting light. During typical sensing and emitting operation, the selected rows 201 and 202 scroll sequentially from the top row to the bottom row of the display panel 119, though embodiments are not intended to be limited to such scrolling sequences.

For the selected write row 201, the write timing controller 109 (shown in FIG. 1) sends a write control signal 110 to the write controller 113 and image data 112 to the write driver 111. The write control signal 110 may specify a row index to directly address a row in the display panel 119 for writing data, or may prompt the write controller 113 to select the next row in sequential order. To select a row to write data, the write controller 113 may use a write row select circuit 209 as shown in the illustrated embodiment. The write row select circuit 209 may be a demultiplexer, which, based on an input row index, outputs an ON voltage to directly select a row 201 of the display panel 119. The image data 112 may specify the brightness of each LED in the selected row 201 during emission. Once the write driver 111 receives the image data 112, the write driver 111 may divide the signal according to each pixel and drives pixel image data 226 to each corresponding emissive pixel 207 in the selected write row 201. A write signal 222 may then be sent to each subpixel within pixel 207 to allow the pixel image data 226 to be stored on a storage capacitor within a subpixel driving circuit.

In order for the selected sense row 202 to be operated in the light sensing mode to sense light, the sense timing controller 121 (shown in FIG. 1) may send a sense control signal 118 to the sense controller 117 and a non-forward biasing signal 114 to the sense receiver 115. The sense control signal 118 may specify a row index to directly address a row in the display panel 119 for sensing light, or may prompt the sense controller 117 to select the next sensing row in sequential order. To select a row for sensing light, the sense controller 117 may use a sense row select circuit 211. The sense row select circuit 211 may be a demultiplexer, which, based on an input row index, outputs an ON voltage to directly select a selected sense row 202 of the display panel 119. Once the selected sense row 202 is selected, an IR sense signal 224 may be sent to each interactive pixel 208 in the selected sense row 202 to electrically couple a sensing IR diode to a sensing circuit, such as the sense receiver 115. The sense receiver 115 may then operate each sensing IR diode in the selected sense row 202 in the light sensing mode by applying a non-forward bias voltage 228 to the sensing IR diode in each interactive pixel 208 in the selected sense row 202 through a biasing and sensing line. In an embodiment, the sense receiver 115 operates the selected sense row 202 in the light sensing mode by applying a non-forward bias voltage, such as a reverse biasing voltage or no biasing voltage (zero bias), to the sensing IR diode in each pixel 208 in the selected sense row 202. The sense receiver 115 may determine the potential of the applied non-forward bias voltage 228 based upon the non-forward biasing signal 114 sent from the sense timing controller 121. Once the sensing IR diode is not forward biased, light detected by the sensing IR diode may create a voltage change or a current flow back through the biasing and sensing line as sensing output data 230. In embodiments, the non-forward bias voltage 228 and sensing output data 230 flow through the same physical line. The sense receiver 115 may interpret the sensing output data 230 with sensing circuitry, such as, but not limited to, analog to digital converters, voltage samplers or comparators, current samplers or comparators, and charge amplifiers to form sense data 116. Thereafter, the sense receiver 115 relays corresponding sense data 116 to the sense timing controller 121.

FIGS. 3A-3C illustrate exemplary subpixel arrangements within a pixel, such as emissive pixel 207 and interactive pixel 208 from FIG. 2, of the display panel 119 according to an embodiment. FIG. 3A illustrates an emissive pixel 207. The emissive pixel 207 includes several subpixels, each with one or more LEDs capable of emitting a specific color of light. The emissive pixel 207 does not have an LED that is configured to be non-forward biased to detect light. Rather, every LED in an emissive pixel 207 is configured to be forward biased to emit light. In an RGBIR subpixel arrangement, such as in an emissive pixel 207 illustrated in FIG. 3A, the emissive pixel 207 includes a red 301, a green 303, a blue 305, and an infrared (IR) 307 emissive subpixel. Each emissive subpixel may include a driving circuit and an emitting LED. Although the emissive pixel 207 is illustrated as only having four subpixels, other embodiments are not so limited. For example, other subpixel arrangements that can be utilized include, but are not limited to, RGBY, RGBYIR, RGBYC, RGBYCIR, RGBW, RGBWIR, or other subpixel matrix schemes in which the emissive pixels have different numbers and/or colors of subpixels.

FIG. 3B illustrates an interactive pixel 208 according to an embodiment of the invention. The interactive pixel 208 includes a sensing IR subpixel 309 having a selection device and a sensing IR diode that is operable in a light sensing mode to detect light. In an embodiment, the sensing IR diode of the sensing IR subpixel 309 is an IR LED that is not electrically coupled to a driving circuit. As such, it is not possible to forward bias the sensing IR diode to operate it in a light emission mode to emit light. Accordingly, the sensing IR subpixel 309 may not have a driving circuit to forward bias the sensing IR diode. In an embodiment, the selection device electrically couples the sensing IR diode to a sense circuit to non-forward bias the sensing IR diode to operate it in a light sensing mode to detect light, which will be discussed further below.

In the embodiment depicted in FIG. 3B, the sensing IR diode in the sensing IR subpixel 309 is in a coupled arrangement with the emissive subpixels 301, 303, 305, and 307 within the interactive pixel 208. In a coupled arrangement, the sensing IR diode in the sensing IR subpixel 309 is spatially located in areas of a pixel conventionally reserved for emitting LEDs. In an embodiment, a coupled sensing IR diode is placed in repeating areas of a display panel that correlate with the display panel's PPI.

In FIG. 3C, the sensing IR subpixel 309 is in a decoupled arrangement such that the sensing IR diode in the sensing IR subpixel 309 is not formed in locations conventionally reserved for emitting LEDs. Rather, in an embodiment, the decoupled sensing IR subpixel 309 is formed on the display substrate in areas where an emitting LED would not be considered to be placed. For example, the decoupled sensing IR diode may be placed in an isolated area of the display substrate in between two emissive pixels.

The emissive and interactive pixels 207 and 208 may have a redundancy scheme where, instead of having one LED for each color in each subpixel, each subpixel has two LEDs or diodes that are connected in parallel. In this example, if one LED or diode is defective, the redundant LED or diode may still emit or detect light. As such, the chances of having a non-emitting and/or non-sensing LED or diode are significantly decreased. It is to be appreciated that the physical layout of the pixels 207 and 208 is but only one embodiment of the present invention to which other embodiments are not so limited. For example, rather than positioning the IR emissive subpixel 307 below the RGB subpixels, the IR emissive subpixel 307 may be located above or beside the RGB subpixels. In some embodiments, each subpixel in the emissive pixel 207 is driven by a subpixel circuit located in a microchip on the same substrate supporting the pixel 207 and within the display region 124 of the display panel, or integrated within an embedded circuit located within the display substrate, as described further herein. Each subpixel may be individually controlled by the subpixel circuit in the microchip or embedded circuit. In addition to the subpixel circuit, the microchip may also include other devices as well. For example, each microchip may also include selection devices, write drivers, write and sense controllers, and/or sense receivers that are used in emitting and sensing light as will be discussed further below. Although the selection devices may be contained in a microchip, in an embodiment, the selection devices are included within an embedded circuit located within the display substrate. The selection devices may be used to electrically couple a sensing IR diode with sensing circuits located in the sense receivers.

FIG. 4 is a chart illustrating an emission intensity profile of an IR emitting LED and a sensing intensity profile of a sensing IR diode according to embodiments. Generally, an LED emits light at a wavelength corresponding to its color. The semiconductor material(s) used to form the LED determines its color emission. For example, an IR emitting LED may be formed from aluminum gallium arsenide (AlGaAs) or gallium arsenide (GaAs), which emits light at a wavelength of around 800 to 900 nm, with a peak wavelength intensity at around 850 nm as shown in FIG. 4. A sensing IR diode may be an IR LED formed from gallium arsenide (GaAs), which can be designed to emit light at a wavelength higher than that of the IR emitting LED, such as a wavelength of around 900 to 1000 nm, with a peak wavelength intensity at around 950 nm as also shown in FIG. 4. In embodiments, the sensing IR diode is designed to have an emission wavelength higher than the IR emitting LED.

A sensing wavelength range of the sensing IR diode, however, differs from its emission wavelength range. Rather than operating at a narrow wavelength, the sensing IR diode can sense a wide range of light below its emission wavelength. However, the sensing IR diode's ability to sense light significantly decreases at wavelengths at and higher than its own emissive wavelength. The emissive curve for the IR emitting LED, IR Emit 401, is shown as a narrow peak that drastically increases and decreases around a wavelength of 850 nm. The emissive curve for the sensing IR diode, sensing IR Emit 405, peaks at approximately 950 nm, which is higher than the wavelength of IR light emitted from the IR emitting LED and much higher than the visible light spectrum (which ranges from 400 to 700 nm). The dotted line representing the sensing intensity curve for the sensing IR diode, sensing IR detect 407, spans the whole wavelength range of visible light as well as lower wavelengths of IR light. As such, a sensing IR diode is able to effectively sense substantially all wavelengths of visible light and lower wavelengths of IR light, including the light emitted from the IR emitting LED.

Figure 5A:
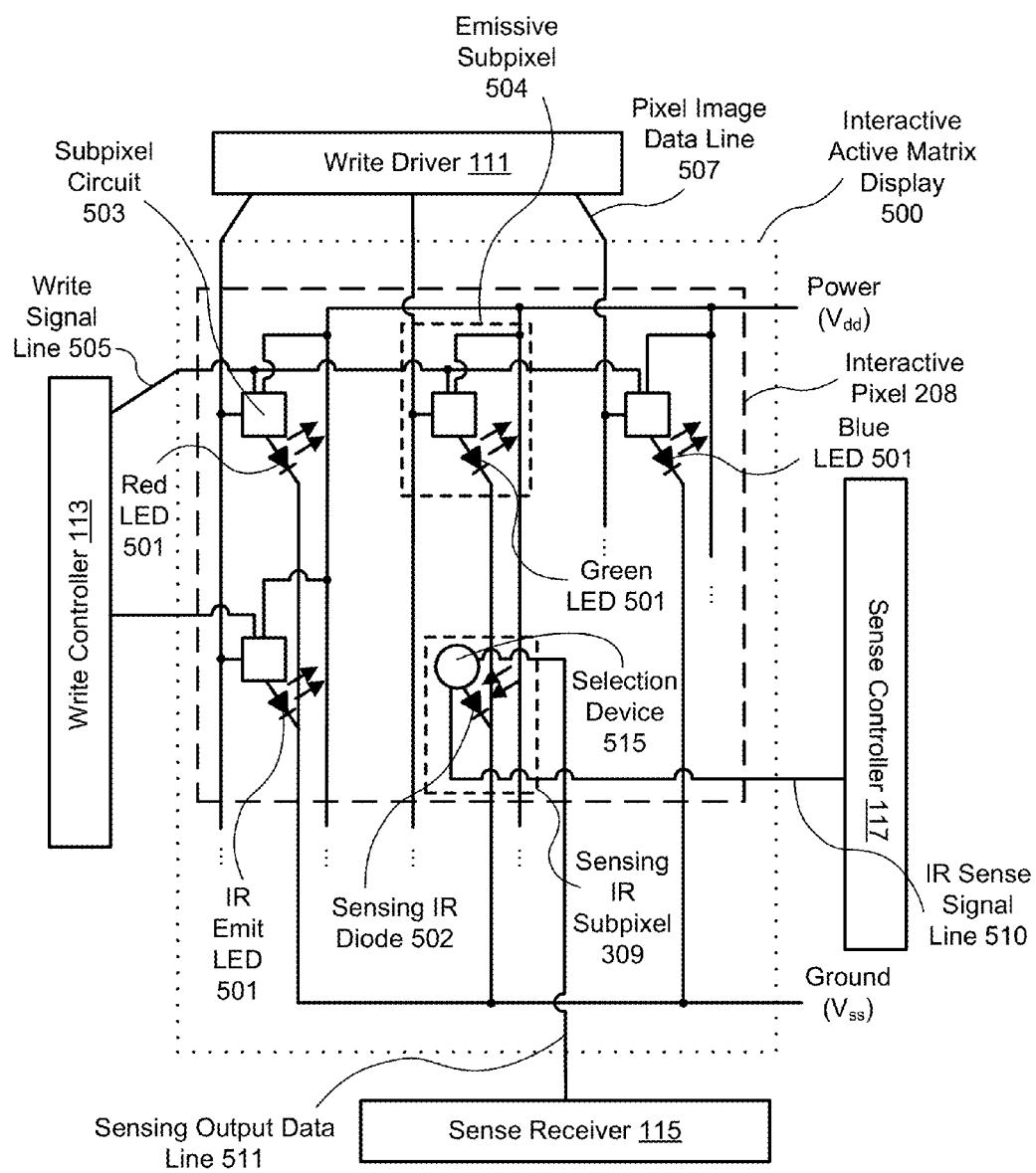
FIG. 5A is a circuit diagram of an interactive display panel having an interactive pixel with an RGBIR and sensing IR subpixel arrangement in accordance with an embodiment.
Figure 5C:
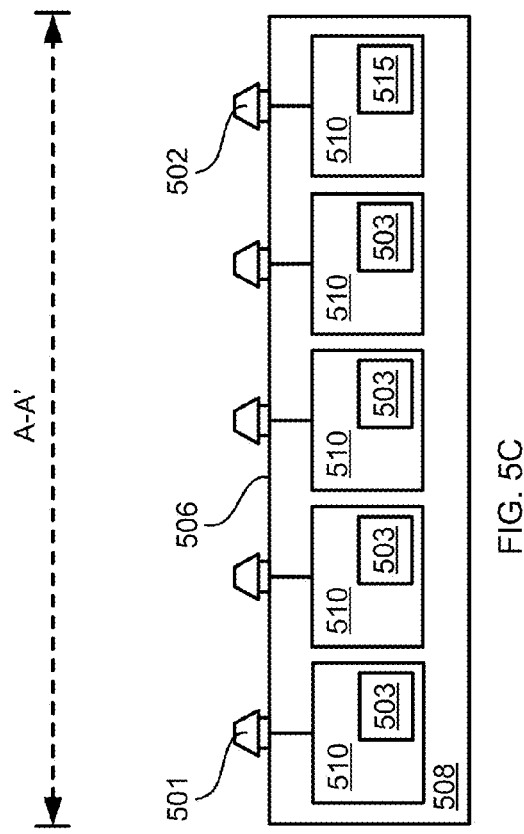
FIGS. 5B and 5C illustrate a perspective view and a schematic side view of an interactive active matrix display with embedded circuitry in accordance with an embodiment.
Figure 5B:
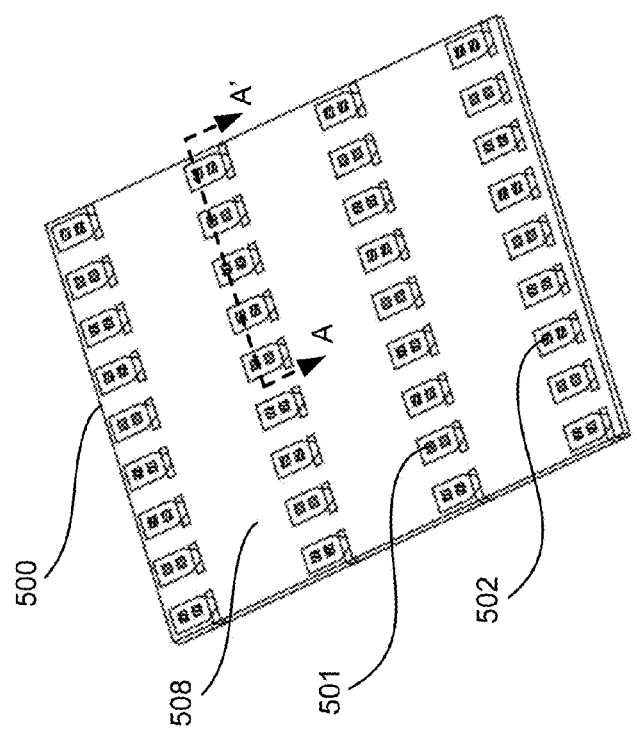
Figure 5D:
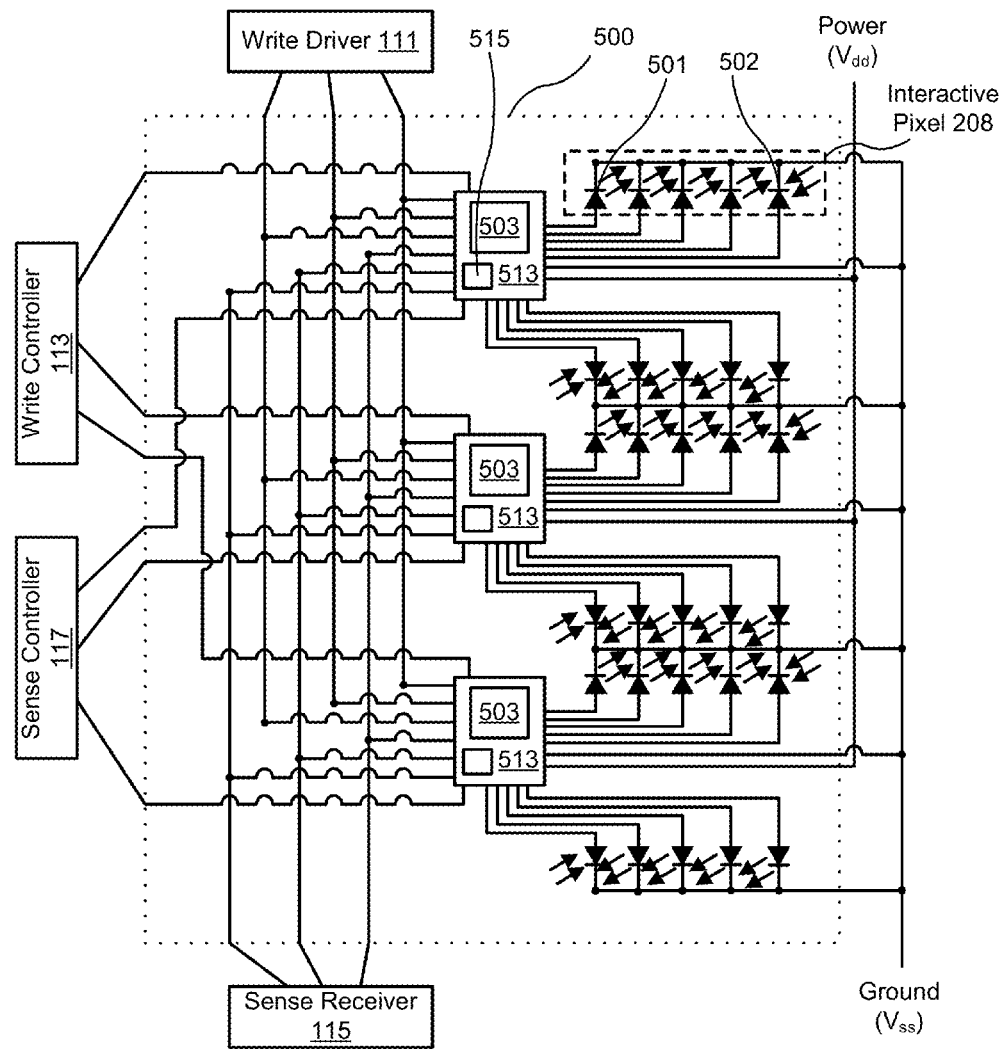
FIG. 5D is a circuit diagram of an interactive display panel with a microchip layout in accordance with an embodiment.
Figure 5E:
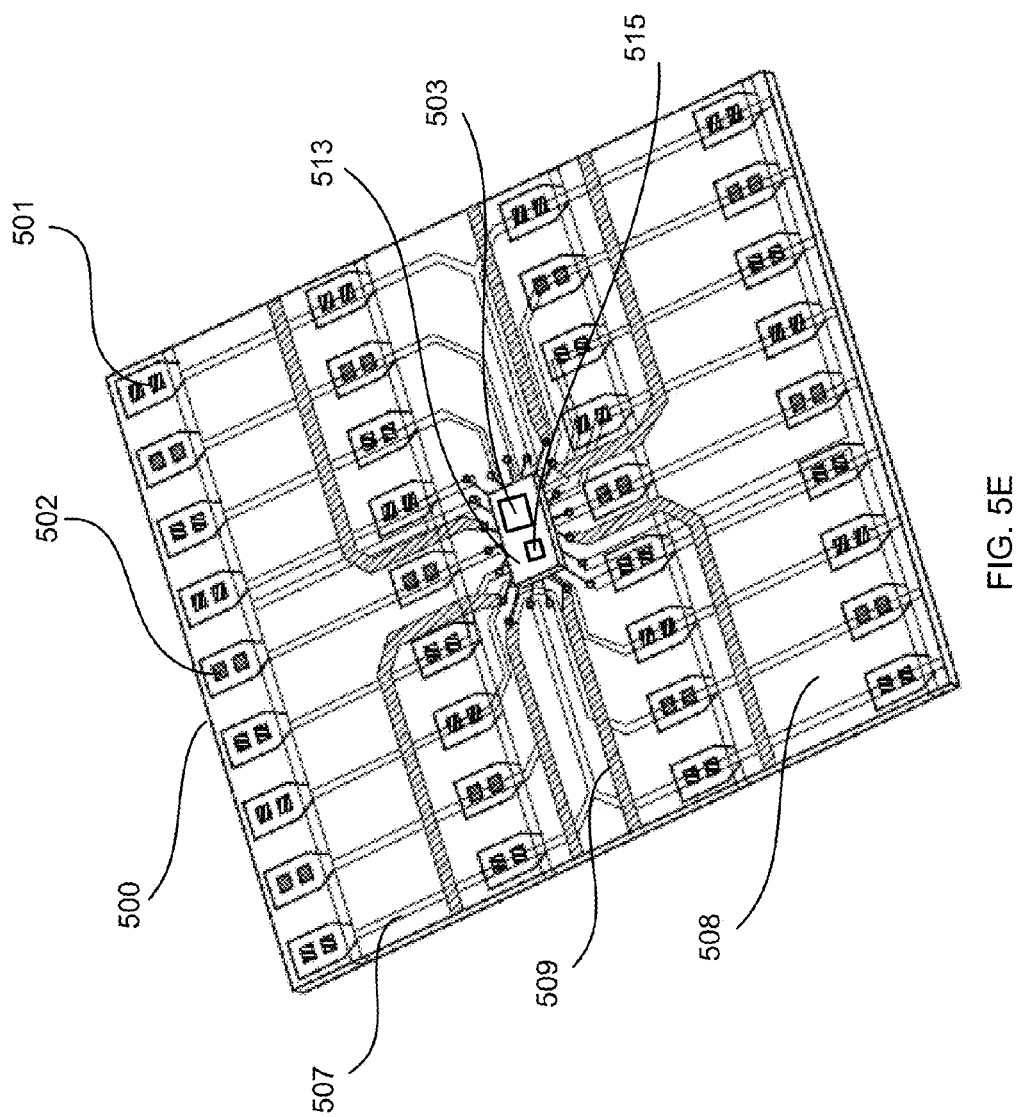
FIG. 5E illustrates a perspective view of an interactive active matrix display with a microchip containing subpixel circuitry in accordance with an embodiment.

FIGS. 5A-5E illustrate interactive display panels 500 in accordance with embodiments. More specifically, FIGS. 5A-5C illustrate an interactive display panel 500 with an embedded subpixel circuit and embedded selection device layout in accordance with an embodiment. For example, in the embodiments illustrated and described with FIGS. 5A-5C micro LED devices may be integrated onto a display panel using existing backplane technologies, such as thin film transistor (TFT) processing technology to form the embedded subpixel circuit and embedded selection device. FIGS. 5D-5E illustrate an interactive display 500 with a microchip layout in accordance with an embodiment. For example, in the embodiments illustrated and described with FIGS. 5D-5E micro LED devices may be integrated onto a display panel along with microchips including subpixel circuits and selection devices. In this manner, the display panels can be formed using a variety of display substrates. In addition, the subpixel circuits and selection devices within the microchips can be formed using a variety of processing techniques such as metal-oxide-semiconductor field-effect transistor (MOSFET) processing technology, which is well known for scalability and performance.

FIG. 5A is a circuit diagram of an interactive active matrix display 500 having an RGBIRSIR subpixel arrangement in accordance with an embodiment. FIG. 5A depicts one interactive pixel 208 in an array of subpixels for ease of explanation. As illustrated, write signal lines 505 are oriented horizontally and driven by the write controller 113, while the image data lines 507 are oriented vertically and are driven by the write driver 111. Although the write signal lines 505 and image data lines 507 are arranged in horizontal and vertical orientations, other embodiments are not limited to such arrangements. The write signal lines 505 and pixel image data lines 507 are connected to each subpixel circuit 503 in the interactive active matrix display. Each subpixel circuit 503 is coupled to an emitting LED, thus forming an emissive subpixel 504, such as emissive subpixels 301, 303, 305 and 307 from FIGS. 3A-3C. In embodiments, the subpixel circuit 503 includes a driving circuit to operate a corresponding emitting LED in a light emission mode to emit light. The write signal lines 505 may carry write signals 222 to each subpixel circuit 503, and the pixel image data lines 507 may carry pixel image data 226 to each subpixel circuit 503.

In addition, the IR sense signal lines 510 are oriented horizontally and driven by the sense controller 117, while the sensing output data lines 511 are vertically oriented and driven by the sense receiver 115. Although the IR sense signal lines 510 and sensing output data lines 511 are arranged in horizontal and vertical orientations, other embodiments are not limited to such arrangements. The IR sense signal lines 510 and sensing output data lines 511 are connected to each selection device 515 in the interactive active matrix display 500. Each selection device 515 may be coupled to a sensing IR diode 502 to form a sensing IR subpixel 309, such as the sensing IR subpixel 309 in FIGS. 3B and 3C. The IR sense signal lines 510 may carry IR sense signals 224 to each selection device 515 to turn the selection device 515 ON or OFF. The sensing output data line 511 may apply a non-forward biasing voltage 228 to a corresponding sensing IR diode and allow sensing output data 230 to flow from the corresponding sensing IR diode 502 as the sensing IR diode 502 detects light. In one embodiment, the LEDs 501 and 502 are inorganic semiconductor-based LEDs. Alternatively, in an embodiment, the LEDs are OLEDs. The interactive active matrix display 500 is meant to be one example of the display panel 119 shown in FIGS. 1 and 2, though other types of interactive active matrix displays are contemplated in accordance with embodiments.

FIG. 5B is a perspective view of an interactive display 500 with an embedded circuitry and selection device layout in accordance with an embodiment. Emitting LEDs 501 and sensing IR diode 502 are exposed on a surface of a display substrate 508 so that emitted light can be seen and ambient or reflected light can be sensed. Furthermore, selection devices are embedded within the display substrate 508 and are therefore not visible from the perspective view.

FIG. 5C illustrates an exemplary schematic side view of the interactive display 500 with embedded circuitry and embedded selection devices across line A-A' within FIG. 5B. The display substrate 508 contains embedded circuits 510 containing at least one subpixel circuit 503 that includes a driving circuit to drive emitting LEDs 501 in a forward bias mode. The display substrate 508 further contains a selection device 515 to electrically couple sensing IR diodes 502 to a sensing circuit. The sensing circuit non-forward bias the sensing IR diodes 502 to operate them in a light sensing mode to detect light, as will be discussed further herein. The embedded circuits 510 are formed within the display substrate 508 below a top surface 506 of the display substrate 508. Embedded circuits 510, subpixel circuits 503, and selection devices 515 are illustrated as boxes for clarity. Actual implementations of an embedded circuit 510, a subpixel circuit 503, and a selection device 515 are not so structured. In an embodiment the display substrate 508 is a flexible or rigid substrate in which the embedded circuits are formed utilizing TFT processing technology, though other processing technologies may be used.

FIG. 5D is a circuit diagram of an interactive active matrix display 500 having an interactive pixel 208 with an RGBIRSIR subpixel arrangement in a microchip layout in accordance with an embodiment. In this embodiment, the microchip 513 is equivalent in operation and purpose to the embedded circuit 510, but is different in that the microchip 513 is mounted on the display substrate. The microchip 513 may contain at least one subpixel circuit 503. The subpixel circuit 503 may include at least a driving circuit to operate an emitting LED in a light emission mode to emit light. In an embodiment, the microchip 513 includes a selection device 515 in addition to the subpixel circuit 503. The selection device 515 may be separated from the subpixel circuit 503 such that the selection device 515 operates independently of the subpixel circuit. In an embodiment, a write driver 111, write controller 113, sense receiver 115, and sense controller 117 are all coupled to the microchip 513. In an embodiment, at least one of the write driver 111, write controller 113, sense receiver 115, and sense controller 117 are included in the microchip 513. As illustrated, the LEDs 501 and 502 are coupled with a common ground (Vss) and power source (Vdd), but may each have a separate ground and power source. In this figure, each LED 501 and 502 may represent a single LED, or may represent multiple LEDs arranged in series, in parallel, or a combination of the two, such that multiple LEDs may be driven from the same control signal. While the exemplary circuit in FIG. 5D illustrates ten LED outputs for each microchip 513, embodiments are not so limited. A single microchip 513 can control multiple pixels on a display, or multiple LED 501 and 502 groupings for a lighting device. In one embodiment, a single microchip 513 can control fifty to one hundred pixels.

FIG. 5E is a perspective view of an interactive display 500 with a microchip layout in accordance with an embodiment. In this embodiment, a microchip 513 containing at least one subpixel circuit 503 and at least one selection device 515 is mounted on top of a display substrate 508 with an array of LEDs 501 and 502. Wiring connections 507 and 509 may be formed within the display substrate 508, on the display substrate 508, or a combination of both, to electrically couple the microchip 513 to the array of LEDs 501 and 502. The microchip 513 may receive signals from the write and sense controllers and may control the LEDs 501 and 502 accordingly. LEDs 501 and 502 are exposed on a surface of a display substrate 508 so that emitted light from the emitting LEDs 501 can be seen and ambient or reflected light can be sensed by the sensing IR diodes 502. The display substrate 508 may be any suitable display substrate such as, but not limited to, a flexible or rigid substrate, a build-up structure, or a glass substrate. The build-up structure may include electrical interconnects that electrically couple a front surface to a back surface of the substrate 508. In an embodiment, the subpixel circuit 503 and selection device 515 formed within the microchip 513 are formed using MOSFET processing technology, though other processing technologies may be used.

Figure 6A:
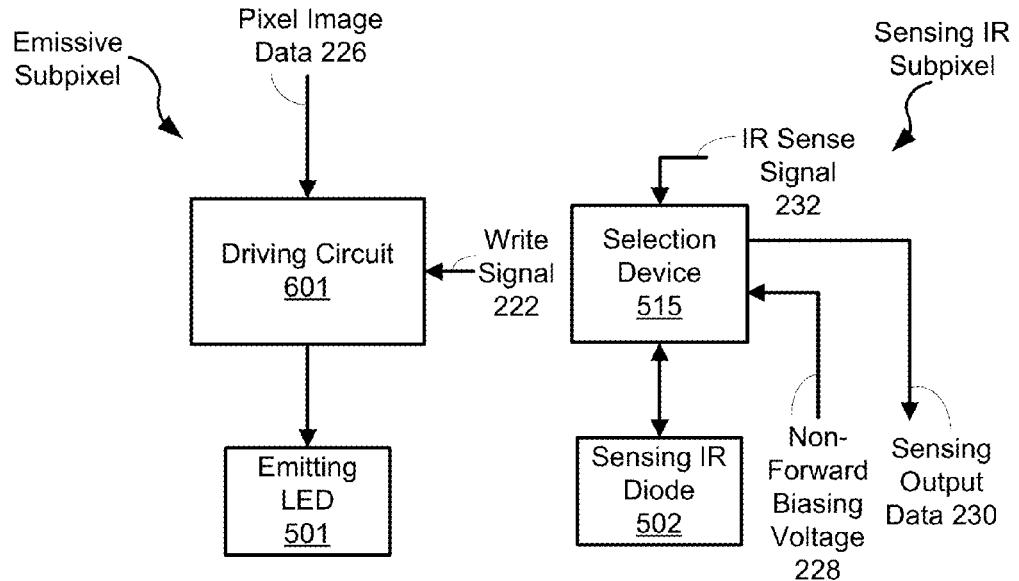
FIG. 6A is a block diagram of various connections for a driving circuit and a selection device in accordance with an embodiment.
Figure 6B:
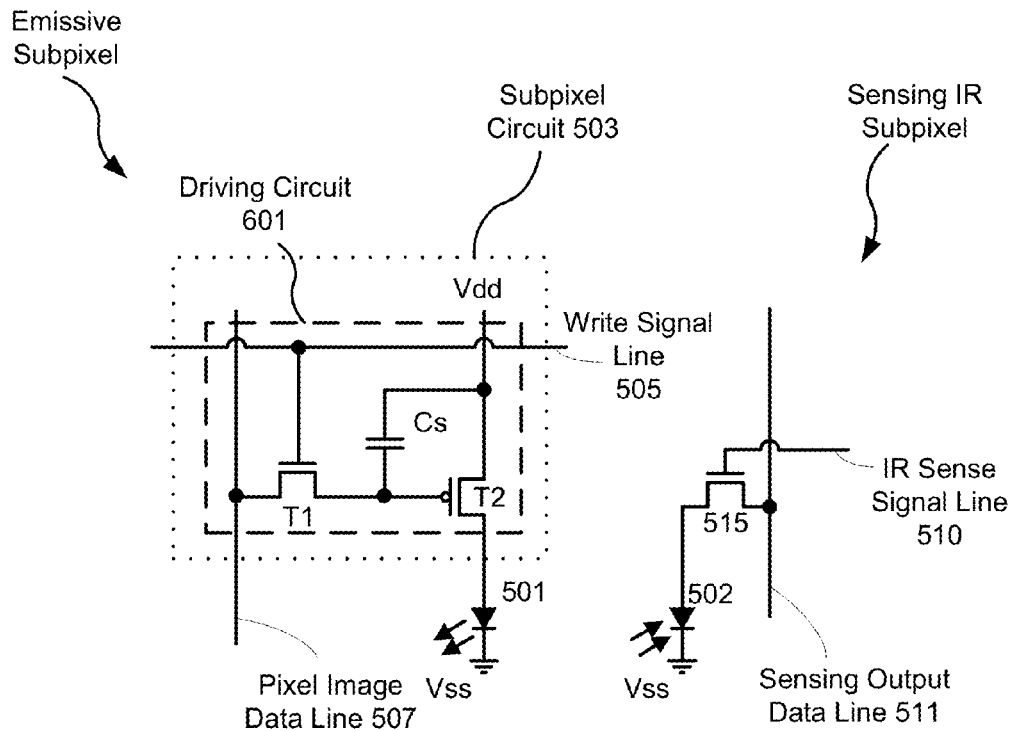
FIGS. 6B-6C are circuit diagrams of an interactive pixel having various arrangements of a driving circuit, a selection device, and an exposure capacitor in accordance with embodiments.
Figure 6C:
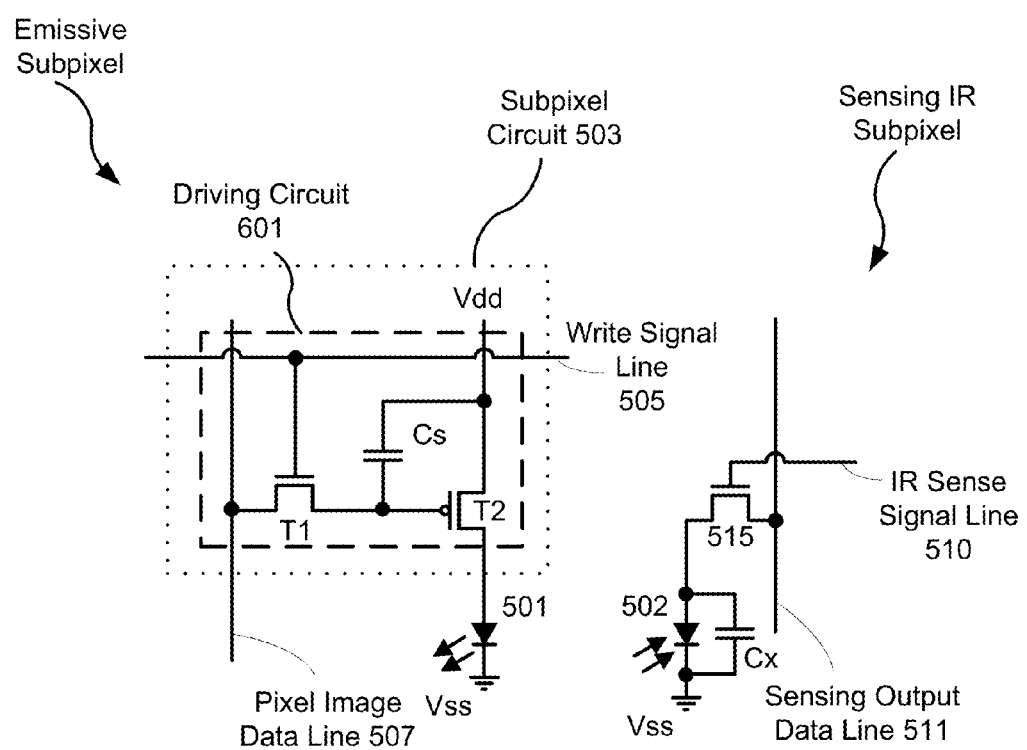

FIGS. 6A-6C depict a block diagram and circuit diagrams for a subpixel for an emitting LED (e.g., the emissive subpixels 301, 303, 305, or 307 in FIG. 3) and a subpixel for a sensing IR diode (e.g., the sensing IR subpixel 309 in FIG. 3) according to an embodiment. More specifically, FIG. 6A depicts a block diagram of a driving circuit 601 coupled to an emitting LED 501, and a selection device 515 coupled to a sensing IR diode 502 according to an embodiment. FIGS. 6B-6C depict circuit diagrams of embodiments of FIG. 6A having various arrangements of a driving circuit, a selection device, an emitting LED, a sensing IR diode, and an exposure capacitor in accordance with embodiments. The embodiments depicted in FIGS. 6B-6C are illustrated to show exemplary designs of a driving circuit, a selection device, an emitting LED, a sensing IR diode, and an exposure capacitor, but are not intended to limit embodiments of the present invention.

Referring to FIG. 6A, a driving circuit 601 receives a write signal 222 and pixel image data 226 from a write controller 113 and a write driver 111, respectively. The write signal 222 may indicate to the driving circuit 601 whether the pixel image data 226 will be stored for use in emitting light. The driving circuit 601 may be any suitable circuit capable of delivering a forward bias voltage at a specified magnitude to any suitable emitting LED 501, such as an organic or inorganic semiconductor-based LED. For example, the driving circuit 601 may be a two-transistor-one-capacitor (2T1C) circuit, a six-transistor-two-capacitor circuit (6T2C), or any other suitable driving circuit. Furthermore, the transistors implemented in the driving circuit 601 may be any type of transistor, such as a TFT or MOSFET. For example, the transistors can be p-type metal-oxide semiconductor (PMOS) transistors, n-type metal-oxide semiconductors (NMOS) transistors, or a combination thereof. Additionally, the transistors can be designed to be in any type of arrangement such as, but not limited to, a complementary metal-oxide semiconductor (CMOS) transistor arrangement. Alternatively, in some embodiments, the subpixel circuit 503 and the selection device 515, are contained within a microchip 513 (shown in FIGS. 5D-5E) mounted on top of the display substrate. As described above, each microchip 513 can be configured to control a single or multiple subpixels or pixels.

The selection device 515 is coupled to the sensing IR diode 502. The selection device 515 may be any conventional transistor device, e.g., an NMOS, PMOS, BJT, or a similar device that can allow current to flow across two terminals based upon a controlling voltage applied to a third terminal. The selection device 515 may be a transistor that turns ON to electrically couple the sensing circuit, such as sense receiver 115, to the sensing IR diode 502 via the sensing output data line 511, as will be discussed further below in FIGS. 6B-6C. The sensing circuit, when coupled to the sensing IR diode 502, non-forward biases the sensing IR diode 502 and detects a corresponding sensing current or a sensing voltage through a sensing output data line 511.

In FIG. 6B, a circuit diagram of an embodiment of FIG. 6A is illustrated with a subpixel circuit 503 and a selection device 515. The subpixel circuit 503 contains a driving circuit 601. The driving circuit 601 is an exemplary 2T1C circuit for ease of explanation, as the 2T1C circuitry is basic and easily understandable. The 2T1C circuit includes a switching transistor T1, a driving transistor T2, and a storage capacitor Cs. Although the embodiment depicted in FIG. 6B illustrates the switching transistor T1 as an NMOS transistor and the driving transistor T2 as a PMOS transistor, embodiments are not limited to such transistor arrangements. The switching transistor T1 and the driving transistor T2 may each be an NMOS, PMOS, or any other transistor device. The switching transistor T1 has a gate electrode connected to a write signal line 505 and a first source/drain electrode connected to a pixel image data line 507. The driving transistor T2 has a gate electrode connected to a second source/drain electrode of the switching transistor T1 and a first source/drain electrode connected to a power source Vdd. The storage capacitor Cs is connected between the gate electrode of the driving transistor T2 and the first source/drain electrode of the driving transistor T2.

The selection device 515 has a first source/drain region connected to an anode electrode of a sensing IR diode 502 and a second source/drain region connected to a sensing output data line 511. An IR sense signal line 510 is electrically coupled to a gate electrode of the selection device 515 to turn the selection device 515, such as a transistor, ON or OFF to control the current flow between the sensing output data line 511 and the sensing IR diode 502. The selection device 515 can be turned ON to electrically couple the sensing output data line 511 to the sensing IR diode 502 depending upon the value of the IR sense signal 224 in the IR sense signal line 510. In an embodiment depicted in FIG. 6B, the selection device 515 is completely independent of the subpixel circuit 503 such that it may be placed alongside the subpixel circuit 503 or far away from the subpixel circuit 503. In an embodiment, the write signal line 505 and the IR sense signal line 510 are activated for different subpixels in different rows within the display panel 119. For example, where the write signal line 505 is selected in row X, the IR sense signal line 510 may be selected in row X+1 (the row immediately below), X−1 (the row immediately above), or any other row within the display panel 119. Although the write signal line 505 and the IR sense signal line 510 may be activated for different subpixels in different rows, embodiments where the write signal line 505 and the IR sense signal line 510 are activated for different subpixels in the same row at the same time are contemplated. The independent operation of the subpixel circuit 503 from the selection device 515 allows the write signal line 505 and the IR sense signal line 510 to be activated for different subpixels in the same row at the same time.

In an embodiment illustrated in FIG. 6C, an exposure capacitor Cx is connected in parallel with the sensing IR diode 502. The exposure capacitor Cx may be used to determine an intensity of light sensed by the sensing IR diode 502, as will be discussed in more detail with respect to FIGS. 7B-7D further below.

Figure 6D:
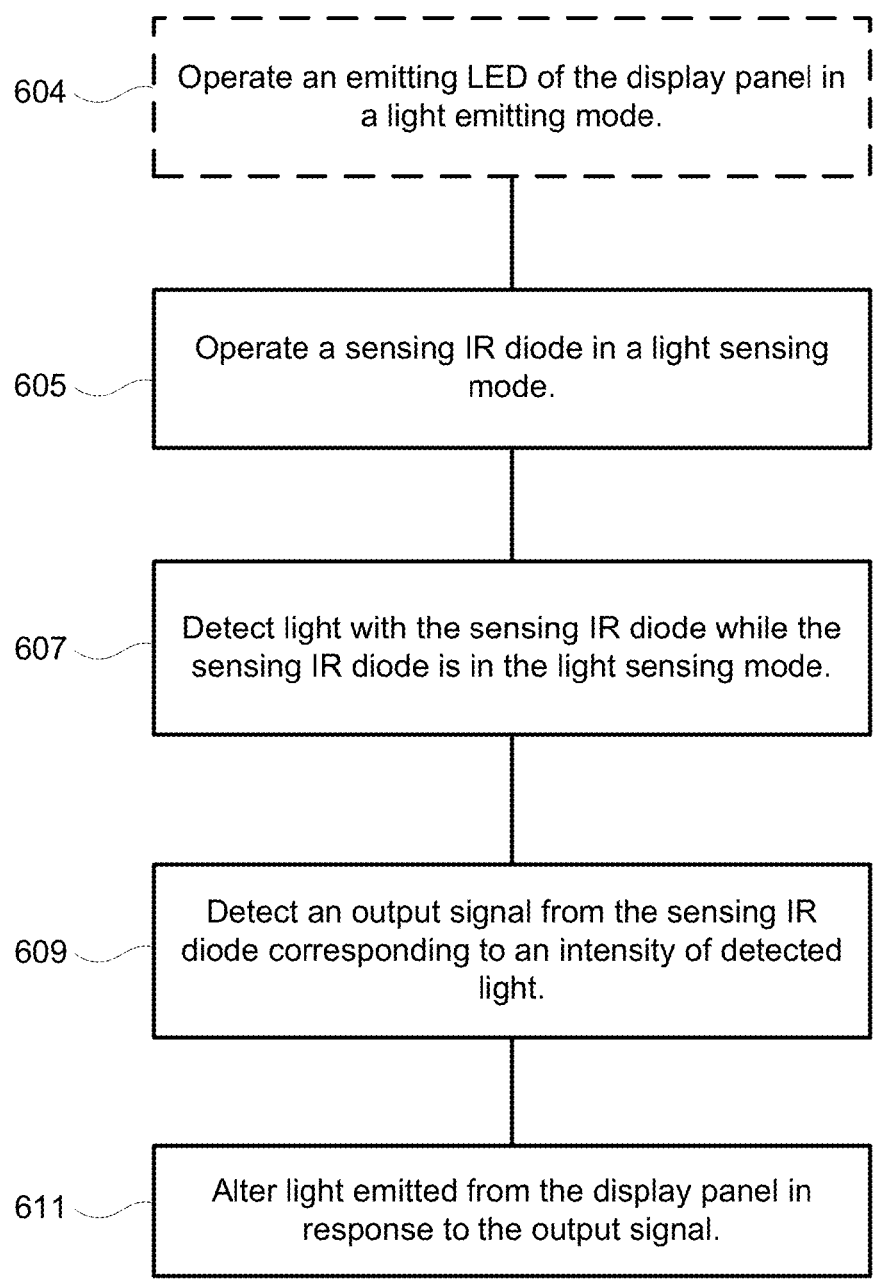
FIG. 6D is a flow chart of a method of sensing IR light with a sensing IR diode in an interactive display panel in accordance with an embodiment.

A method of sensing light with a sensing IR diode in an interactive display panel 119 according to an embodiment is illustrated in FIG. 6D. At 604, an emitting LED 501, such as an IR emitting LED, is optionally operated in a light emission mode. The dotted line denotes that operating the emitting LED 501 in the light emission mode is optional because light does not have to be emitted from the emitting LED 501 to detect light with the sensing IR diode 502. For example, the emitting LED 501 does not have to emit light when the sensing IR diode 502 is detecting ambient light. Operating the emitting LED 501 in the light emission mode includes forward biasing the emitting LED 501 such that it emits light at a brightness corresponding to a forward bias voltage. At 605, a sensing IR diode 502 is operated in a light sensing mode. Operating the sensing IR diode 502 in the light sensing mode includes non-forward biasing the sensing IR diode 502, such as reverse or zero biasing the sensing IR diode 502, to detect light. The non-forward biased sensing IR diode 502 detects light and generates an output signal corresponding to an intensity of the detected light as described herein. In an embodiment, the detected light is light emitted from at least the IR emitting LED 501 located on the interactive display panel 119. In an embodiment, the detected light is light emitted from a red, green, blue, or IR emitting LED located on the interactive display panel 119. In an embodiment, the detected light is ambient light emitted from the environment outside of the display panel 119.

At 607, the sensing IR diode 502 detects light while the sensing IR diode 502 is in the non-forward bias mode. In an embodiment, a current is generated by the sensing IR diode 502 when IR light is exposed on the sensing IR diode 502. At 609, the sense receiver 115 detects the output signal from the sensing IR diode 502 within the sensing circuit. The output signal, in an embodiment, is a current flow with a magnitude corresponding to the intensity of light sensed by the sensing IR diode. In an embodiment, the output signal is a voltage with a magnitude corresponding to the intensity of light sensed by the sensing IR diode. The sense receiver 115 monitors the sensing output data line 511 and detects a change in current flow or a voltage amount from the sensing IR diode when light is detected. For example, a greater intensity of sensed light results in a higher magnitude of current flow or voltage potential. In an embodiment, the sense receiver 115 sends the output signal to the output processor 123 through the sense timing controller 121.

At 611, the output processor 123 alters light emitted from the display panel 119 in response to the output signal received from the sense timing controller 121. In an embodiment, light emitted from emitting LEDs within the display panel 119, in whole or in part, increases or decreases. In an embodiment, the pattern of light emitted from emitting LEDs within the display panel 119 changes to display a different image. In embodiments, the output processor 123 is coupled to a system memory 105 carrying instructions that, when executed by the output processor, the output processor alters light emission for a number of operations. For example, the output processor 123 can alter light emission for one or more of ambient light detection, ambient light proximity detection, reflected light proximity detection, ambient light object location determination, reflected light object location determination, surface profile determination, and display panel calibration as mentioned above. Such operations are discussed in more detail below.

Figure 7A:
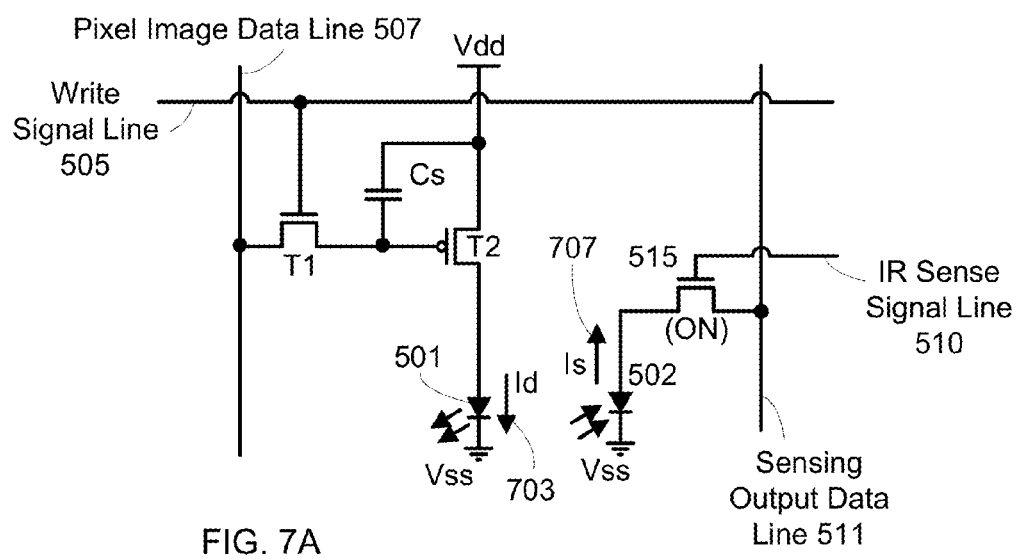
FIG. 7A is a circuit diagram of a subpixel for an interactive pixel while it is detecting light with a sensing IR diode in accordance with an embodiment.
Figure 7B:
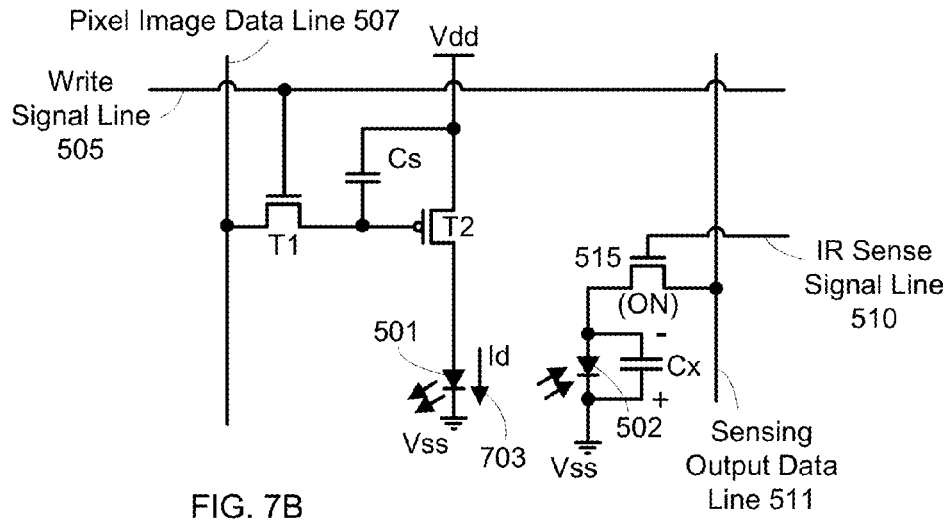
FIGS. 7B-7D are circuit diagrams of different operational states of a subpixel for an interactive pixel with an exposure capacitor in accordance with an embodiment.
Figure 7C:
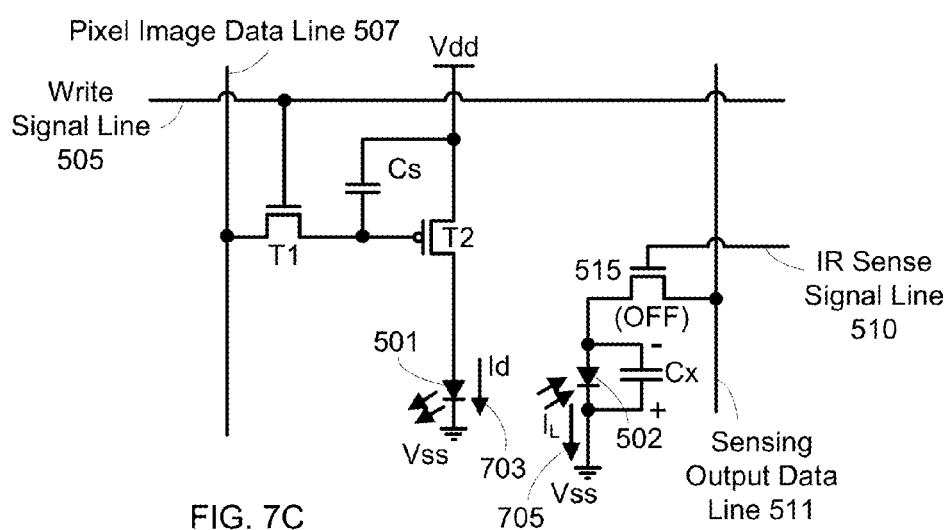
Figure 7D:
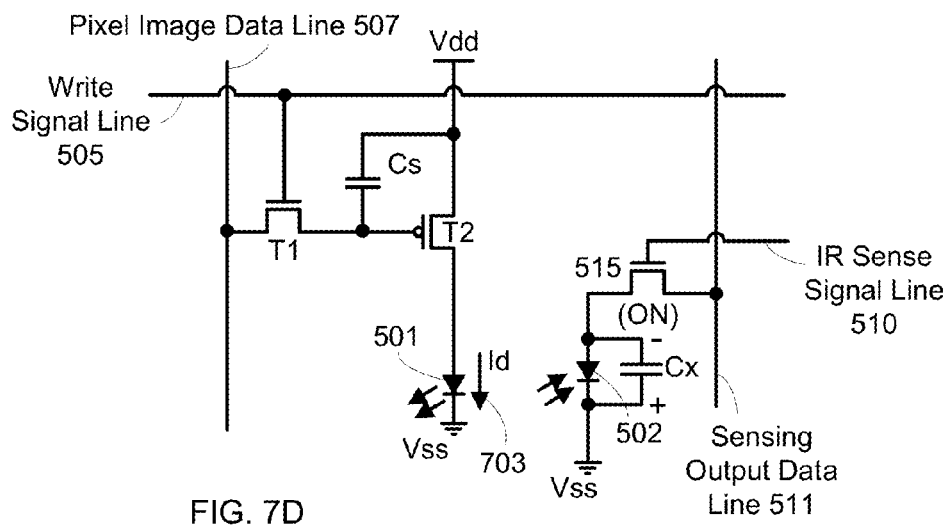

During sensing operation, the sensing IR diode 502 is non-forward biased to detect light when the selection device 515 is turned ON to electrically couple the sensing IR diode 502 to the sensing circuit, such as sense receiver 115. FIG. 7A illustrates an exemplary circuit diagram for non-forward biasing a sensing IR diode to detect IR light in accordance with an embodiment. FIGS. 7B-7D illustrate exemplary circuit diagrams for sensing IR light with a sensing IR diode connected in parallel with an exposure capacitor in accordance with an embodiment. Similar to the description above, FIGS. 7A-7D illustrate basic 2T1C driving circuits to show how the driving and sensing circuits operate together in an easily understandable circuit arrangement. As such, embodiments are not so limited to such operations and circuit arrangements.

In FIG. 7A, a subpixel is written with pixel image data and the emitting LED 501, such as an IR emitting LED, is forward biased to emit light while a sensing IR diode 502 is sensing light. Initially, a write signal from the write signal line 505 may be activated (ON) to apply a voltage to a gate electrode of a switching transistor T1. The activated write signal may turn on the switching transistor T1 to apply a pixel image data voltage from a pixel image data line 507 to a storage capacitor Cs, which then may store the image data voltage. Thereafter, the write signal may be deactivated (OFF) to turn off the switching transistor T1, which now completes writing to the subpixel. To emit light, the storage capacitor Cs turns on the driving transistor T2 with the stored image data 112 voltage to allow a corresponding driving current, Id 703, to flow across the driving transistor T2 and through the emitting LED 501. Accordingly, the driving current 703 causes the emitting LED 501 to be operated in a light emission mode to emit light 701 with a brightness corresponding to the magnitude of the image data 112 voltage. In an embodiment, the emitting LED 501 is a red, green, blue, or IR emitting LED.

As further illustrated in FIG. 7A, the sensing IR diode 502 is operated in the light sensing mode to detect light. In this embodiment, the sensing IR diode 502 is detecting light emitted from the emitting LED 501. The emitted light may be from a single emitting LED 501 or from a combination of emitting LEDs 501 on the display panel. The selection device 515 is turned ON to electrically couple the sensing IR diode 502 to the sensing circuit through the sensing output data line 511 in response to an activated (ON) IR sense signal 224 from the IR sense signal line 510. A non-forward bias voltage 228, such as a reverse or zero bias voltage, may then be applied to the sensing IR diode 502 from the sense receiver 115 through the sensing output data line 511 to operate the sensing IR diode 502 in a light sensing mode. For example, sensing output data line 511 may be driven with a negative potential, which results in a reverse biasing of the sensing IR diode 502. In reverse bias mode, charge accumulates on the anode and cathode of the sensing IR diode 502 from the reverse bias voltage and causes the sensing IR diode 502 to be sensitive to light. In zero bias mode, the sensing output data line 511 is not driven with any voltage such that charge accumulates on the anode and cathode of the sensing IR diode 502 from exposure to light. As light, such as IR light, is projected onto the non-forward biased sensing IR diode 502, a corresponding sensing signal in the form of a current, Is 707, is induced across the sensing IR diode 502 and through the sensing output data line 511. As such, the sensing signal 707 may flow through the sensing output data line 511 with a magnitude corresponding to the intensity of light sensed by the sensing IR diode 502.

In an embodiment, the IR emitting LED 501 is not emitting light while the sensing IR diode 502 is sensing light. In such an embodiment, the sensing IR diode 502 is sensing ambient light emitted from an environment outside of the display panel. The ambient light may be any visible light as well as IR light emitted at a wavelength lower than the emitting wavelength of the sensing IR diode 502.

With reference to FIGS. 7B-7D, the operation of sensing light with a sensing IR diode 502 connected in parallel with an exposure capacitor Cx is illustrated. In FIG. 7B, the sensing IR diode 502 is connected in parallel with the exposure capacitor Cx, both of which are coupled to the sensing output data line 511 through a selection device 515, such as a transistor. A non-forward bias voltage, such as a reverse bias voltage or zero bias voltage may be applied through the sensing output data line 511 from the sense receiver 115 to store a negative potential in the exposure capacitor Cx. In FIG. 7C, the sensing IR diode 502 and the exposure capacitor Cx are electrically disconnected from any circuit by turning the selection device 515 OFF. In an embodiment, a cathode of the sensing IR diode 502 and a first plate of the exposure capacitor Cx are connected to ground Vss. Additionally, an anode of the sensing IR diode 502 and a second plate of the exposure capacitor Cx are electrically isolated, thus floating the sensing IR diode 502 and the exposure capacitor Cx. Due to the stored negative potential within the exposure capacitor Cx, the sensing IR diode 502 is reverse biased and therefore sensitive to visible and IR light. When IR light is detected by the sensing IR diode 502, current may be generated through the parallel circuit and causes the exposure capacitor Cx to lose a proportionate amount of charge through a leakage current $I_L$ 705. In an embodiment, the sensing IR diode 502 senses for a set amount of exposure time. Generally, longer exposure times result in stronger, more accurate sensing output signals. In FIG. 7D, the sensing IR diode 502 and the exposure capacitor Cx are reconnected to the sensing output data line 511 by turning the selection device 515 back ON. The sense receiver 115 may determine the remaining potential stored in the exposure capacitor and determines the intensity of visible and/or IR light sensed by the sensing IR diode 502.

Figure 8A:
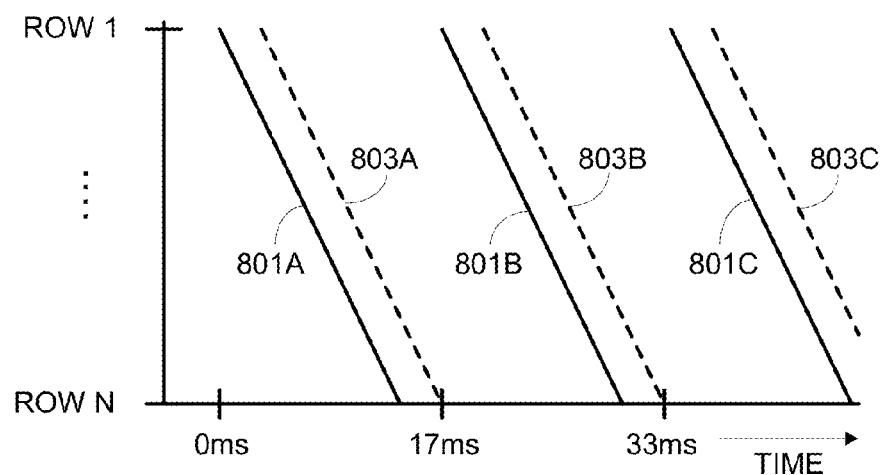
FIGS. 8A-8C are charts illustrating write and sense signal timing schemes in accordance with embodiments.
Figure 8B:
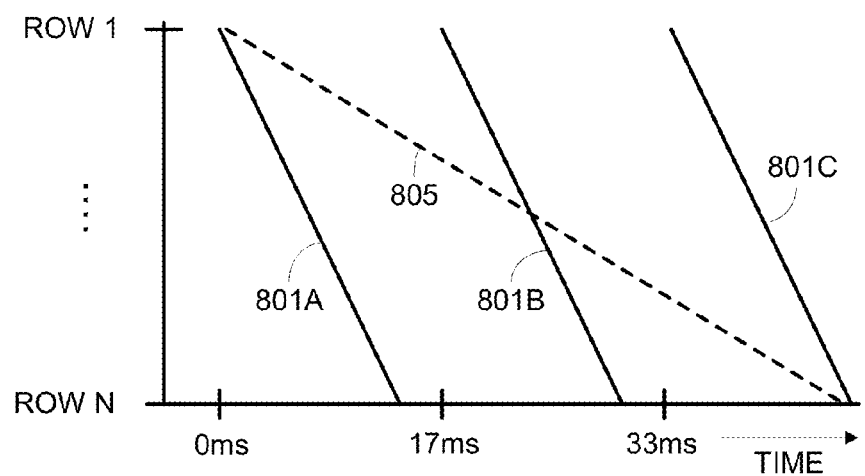
Figure 8C:
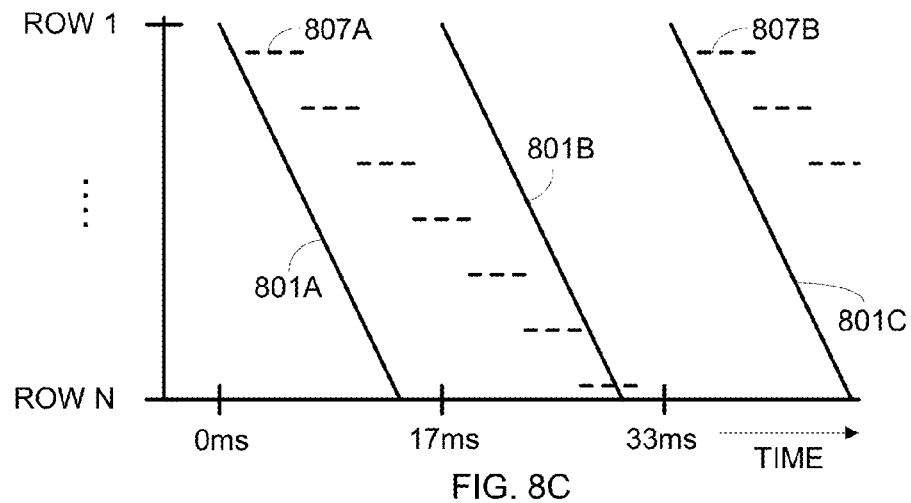

The frequency at which writing image data and reading sensing signals are performed may dictate the balance between sensing strength and display refresh rate. Generally, higher sensing strengths lead to more accurate sensing results whereas higher display refresh rates lead to smoother display operation. FIGS. 8A-8C depict exemplary charts of writing and reading timing schemes for display panels during interactive operation (i.e., simultaneous sensing and emitting operation) according to embodiments. The Y-axis represents rows of a display panel, such as display panel 119, in descending sequential order. The X-axis represents time in milliseconds in ascending sequential order.

FIG. 8A illustrates writing cycles 801 and reading cycles 803 for writing image data to and reading sensing signals from a display panel at the same frequency. In an embodiment, the master timing controller 127, as discussed above, may control the timing synchronization of writing and reading cycles based on a timing scheme. Three writing cycles 801A-801C and reading cycles 803A-803C are illustrated for purposes of ease of explanation. It is to be appreciated that many more cycles are performed during typical interactive operation and that embodiments are not limited to only three cycles. In one embodiment, each writing cycle 801 writes image data (e.g., using write signal 222) to a display panel starting from ROW 1 to ROW N in sequential order. Similarly, each reading cycle 803 reads sensed light (e.g., using IR sense signal 224) from the display panel from ROW 1 to ROW N in sequential order. Accordingly, as illustrated in FIG. 8A, each writing and reading cycle 801 and 803 has a negative slope when plotted with respect to time. Writing and reading frequency may be determined by the speed at which each writing and reading cycle 801 and 803 is performed. Generally, higher frequencies result in steeper negative slopes. Therefore, as shown in FIG. 8A, writing and reading cycles 801 and 803 that are performed at the same frequency have the same negative slope. In one embodiment, both writing and reading cycles are performed at a frequency of 60 Hz. Both writing and reading cycles may also be performed at 120 Hz, 240 Hz, or at a higher or lower frequency. In this embodiment, because both frequencies are high, the display operation may be smooth and the sensing operation may be highly sensitive. One example of why this may be beneficial is when the display panel is running a gaming application. In such instances, the display panel can display a smooth image while being highly responsive to input coordinates.

Although the writing and reading frequencies may be the same in some embodiments, the writing and reading frequencies may be different in other embodiments. That is, the writing frequency may be higher or lower than the reading frequency. FIG. 8B illustrates an embodiment where the writing frequency is higher than the reading frequency. Three writing cycles 801A-801C and one reading cycle 805 are illustrated for purposes of ease of explanation. It is to be appreciated that many more cycles are performed during typical interactive operation and that embodiments are not so limited. In the embodiment depicted in FIG. 8B, because the writing cycles 801 are performed at a higher frequency than the reading cycle 805, the slope of the writing cycles 801 is steeper than the slope of the reading cycle 805. The slope of the reading cycle 805 depicted in FIG. 8B is such that one reading cycle expands across three writing cycles 801A-801C. This means that in this particular embodiment the display panel is written three times before the display panel is read once. In one embodiment, at the instances when the reading and writing cycles intersect, the row is being written and read at the same time. For example, a storage capacitor for a red, green, blue, or IR emitting LED can be written with a new pixel image data value while the sensing IR diode is sensing light. In one embodiment, the writing cycle frequency is 60 Hz while the reading cycle frequency is 20 Hz. Reducing the frequency at which the display panel senses may achieve stronger sensing signals because each row is sensed for a longer period of time. However, the tradeoff may be a decrease in sensing responsiveness. As such, a lower reading frequency may be utilized when the display panel is constantly displaying images with minimal user interaction, such as when the display panel is playing a video.

While the display panel may write image data to and read sensing signals from all rows of the display panel in some embodiments, other embodiments may not read sense data from all rows of the display panel. FIG. 8C illustrates an embodiment where the display panel writes to all rows of the display panel but reads sensing signals from only certain rows of the display panel. Three writing cycles 801A-801C and one full reading cycle 807 are illustrated for purposes of ease of explanation. It is to be appreciated that many more cycles are performed during typical interactive operation. As shown in FIG. 8C, each writing cycle is one single, continuous line as image data is written to rows 1 to N in sequential order. Accordingly, every row of the display panel is written with image data. On the other hand, the reading cycle 807 is a discontinuous set of horizontal lines because sensing signals are read from only certain rows of the display panel. Although not every row is read, an extended read-out time can be applied to each row that is read as illustrated by the horizontal lines. Sensing each row for an extended period of time may result in a stronger, more fully developed sensing signal. However, the resulting effect may be a tradeoff between sensing spatial resolution and signal strength. A possible further disadvantage of longer read-out times may be that the row emits dimmer light due to less emission time. In response to this shortcoming, higher driving currents may be applied to these rows to compensate for their short emission time. An instance when decreasing spatial resolution in exchange for stronger signal strength is desired includes when the display panel is used for touch applications in which high spatial resolution for sensing is not needed because the size of a human finger likely spans several rows.

A processor, such as the input processor 101 or output processor 123 from FIG. 1, may determine the frequency at which the display panel is written and read. Depending on what type of application is being run, the processor may indicate to the master timing controller to read and write at suitable frequencies according to a timing scheme. Additionally a user may have the ability to change the read and write speed.

Figure 8D:
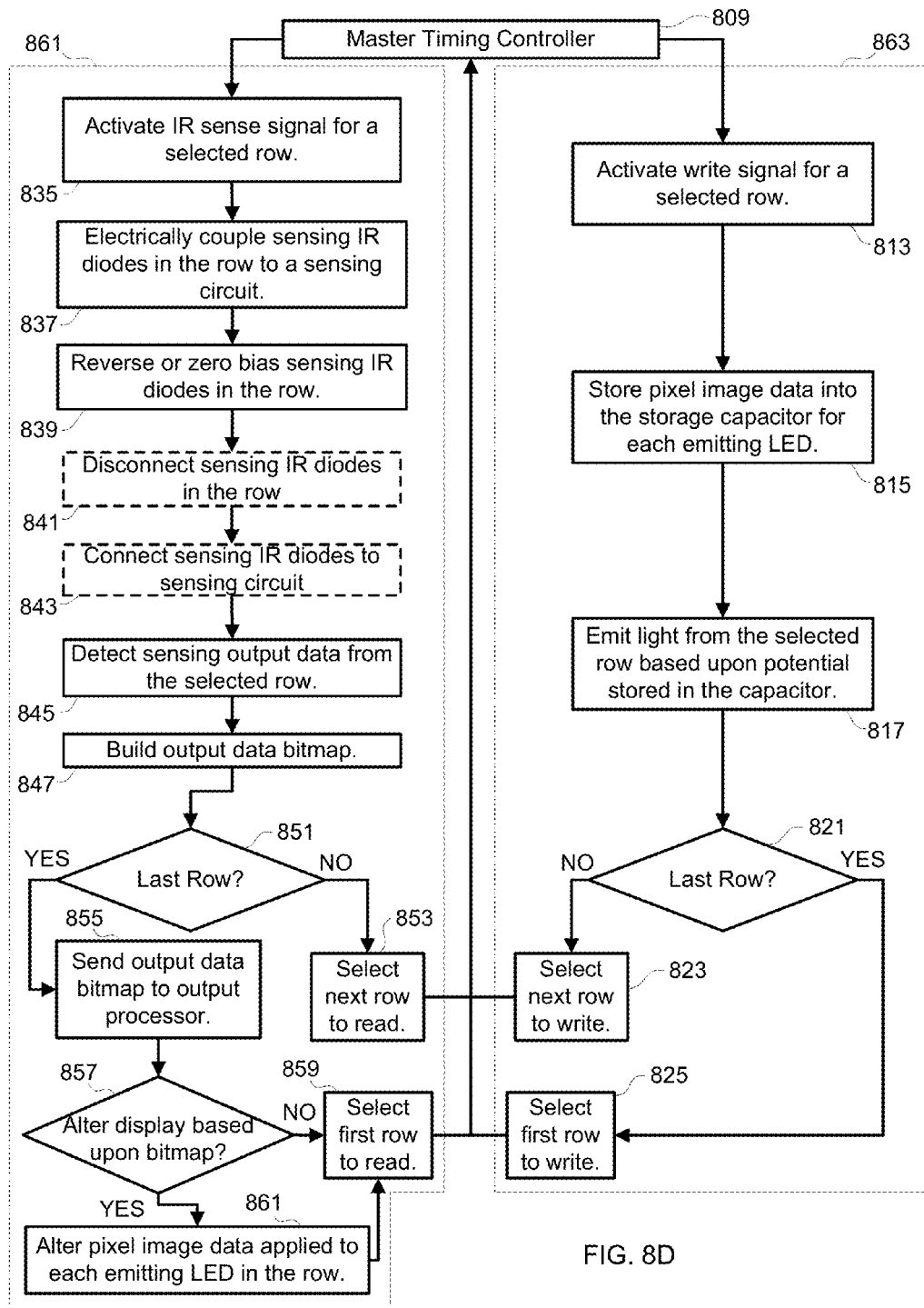
FIG. 8D is a flow chart of a method of operating an interactive display panel in accordance with an embodiment.

FIG. 8D is a flow chart that illustrates an exemplary method of operating the interactive display panel 119 from a high-level perspective. At 809, the master timing controller, e.g., 127 from FIG. 1, sends timing signals to the write and sense timing controllers, e.g., 113 and 117, respectively, from FIGS. 1 and 2, according to a timing scheme. As mentioned above, the timing scheme may be determined by the input or output processor 101 or 123, respectively. The write and sense timing controllers may operate a read operation 861 and a write operation 863 according to the timing signals received from the master timing controller. The read and write operations 861 and 863 can be performed according to the timing schemes illustrated above in FIGS. 8A-8C. As such, the read operation 861 can be performed simultaneously and independently of the write operation 863.

For the read operation 861, at 835, the sense signal, e.g., IR sense signal 224 from FIG. 2, is activated for a selected row, e.g., the selected sense row 202 from FIG. 2. In an embodiment, the selected row is the next incremental row or the first row of the display panel, as determined by the sense controller 117. At 837, the selection device 515 is turned ON such that the sensing IR diodes 502 in the selected row are electrically coupled to the sensing circuit, such as sense receiver 115.

At 839, the sense receiver 115 non-forward biases the sensing IR diodes 502 within the selected row through the sensing output data line 511 with a non-forward biasing voltage, such as a reverse or zero bias voltage, to operate the selected row in a light sensing mode. As the selected row is exposed to light, a voltage may be generated across the sensing IR diode 502 or a current may be generated from the sensing IR diode 502 through the sensing output data line 511. In one embodiment, the sensing IR diode 502 is connected in parallel with an exposure capacitor Cx as disclosed in FIG. 6C above. In this embodiment, when the non-forward bias voltage, such as a reverse bias voltage, is applied to the sensing IR diode 502 and the charge capacitor Cx, the applied reverse bias voltage is stored on the exposure capacitor Cx.

In the embodiment where the sensing IR diode 502 is connected in parallel with an exposure capacitor Cx, at 841, the selection device 515, such as a transistor, is turned OFF to disconnect the sensing IR diode 502 and the exposure capacitor Cx in the selected row from the sensing circuit. The dotted lines indicate unique operations that are performed for display panels with pixels configured with a sensing IR diode 502 connected in parallel with an exposure capacitor Cx. When the sensing IR diode 502 is disconnected, the sensing IR diode 502 may sense light and cause the stored charge within the exposure capacitor Cx to leak out at a rate proportionate to the amount of light sensed by the sensing IR diode 502. In an embodiment, an exposure time determines the amount of time that the sensing IR diode 502 and exposure capacitor Cx are disconnected. Generally, longer exposure times result in stronger, more accurate output sense signals. Once the exposure time has passed, at 843, the sensing IR diode 502 and exposure capacitor Cx are reconnected to the sensing circuit by turning the selection device 515 ON.

At 845, for display panels that do not have exposure capacitors Cx, the sense receiver 115 detects the change in current or voltage from one or more sensing IR diodes 502 within the selected row through the respective sensing output data line 511. The change in current or voltage may be the sensing output data 230, as described above, which corresponds to the intensity of light sensed by the sensing IR diode 502. At 847, the sense timing controller 121 receives the sensing output data from the sense receiver 115 and builds an output data bitmap, such as display panel sensing data 125. On the other hand, for display panels that do have exposure capacitors Cx, at 845, the sense receiver 115 may detect the change in voltage from one or more exposure capacitors Cx within the selected row through the respective sensing output data line 511 and build an output data bitmap at 847. In embodiments, the change in voltage may be the sensing output data 230, as described above, which may correspond to the intensity of light sensed by the sensing IR diode 502. The sense timing controller 121 may build an output data bitmap by storing the sensing output data in its corresponding position in the bitmap.

At 851, the sense controller 117 determines whether the selected row is the last visible row in the current sense cycle. If the selected row is not the last visible row, at 853, the sense controller 117 selects the next visible row to sense light. Furthermore, the sense timing controller 121 may indicate to the master timing controller 127 that one sense operation has been completed. At 809, the master timing controller receives the indication that the sense operation has been completed and sends the next timing signal 128 to sense or write data depending on the timing scheme discussed above. If, however, the selected row is the last visible row in the display panel 119, at 855, the sense receiver 115 sends the completed output data bitmap representing the display panel sensing data 125 to the output processor 123. In an embodiment, if the selected row is the last visible row in the display panel 119, the write controller 113 can proceed to select dummy rows, if any, or to a vertical blanking phase, after which the sense receiver 115 sends the completed output data bitmap to the output processor 123.

At 857, the output processor 123 determines, based on the received display panel sensing data 125, whether or not the emission pattern or intensity of the display panel needs to be altered. Determining whether or not the emission pattern or intensity of the display panel needs to be altered can be based upon several different circumstances, as will be discussed in detail further below. If the output processor 123 determines that the display panel 119 needs to alter its emission pattern or intensity, at 861, the pixel image data 226 to be stored on storage capacitors for emitting LEDs 501 in one or more rows is altered. At 859, the first row of the display panel 119 is selected by the sense controller, and the method returns to the master timing controller at 809. If the output processor 123 determines that the display panel 119 does not need to alter its emission pattern or intensity, the first row is selected by the sense controller at 859, and the method returns to the master timing controller at 809.

For the write operation 863, at 813, the write signal, e.g., 222 from FIG. 2, is activated for a selected row, e.g., the selected write row 201 from FIG. 2. In an embodiment, the selected row is the next incremental row or the first row of the display panel, as determined by the write controller 113. At 815, the pixel image data 226 is stored by the driving circuit, e.g., on a storage capacitor Cs. The pixel image data 226 indicates the intensity at which an emitting LED 501 is to emit light.

At 817, the driving circuit 601 forward biases the emitting LED 501 to operate the emitting LED 501 in a light emission mode to emit light. In an embodiment, the emitting LED 501 emits light corresponding to a potential stored in the storage capacitor, e.g., pixel image data 226 from a write cycle. The emitting LED 501 may be a red, green, blue, IR emitting LED that emits red, green, blue, and IR light accordingly. Furthermore, in an embodiment, the emitting LED 501 is an IR emitting LED that emits invisible IR light, such as in instances where the display panel is operating outside at night, where no visible light is being emitted from the display panel, or where the display panel is emitting visible light.

At 821, the write controller 113 determines whether the selected row is the last visible row in the current write cycle. If the selected row is not the last visible row, at 823, the write controller 113 selects the next row to sense light. Furthermore, the write timing controller 109 indicates to the master timing controller that one write operation has been completed. At 809, the master timing controller 127 receives the indication that the write operation has been completed and sends the next timing signal 128 to sense or write data depending on the timing scheme discussed above. If, however, the selected row is the last visible row in the display panel 119, at 825, the first row of the display panel 119 is selected by the write controller, and the method returns to the master timing controller at 809. In an embodiment, if the selected row is the last visible row in the display panel 119, the write controller 113 can proceed to select dummy rows, if any, or to a vertical blanking phase, after which the method selects the first row of the display panel at 825.

The output processor 123 may be configured to perform a number of operations by utilizing the display and sensing capabilities of the interactive display panel to alter the display based upon the display panel sensing data 125 according to embodiments. As mentioned above, the output processor 123 may be configured to perform a variety of operations, such as: (1) brighten or dim a display panel in response to an amount of ambient light (ambient light detection), (2) turn a display panel on or off in response to an object's proximity to the display panel by sensing ambient light (ambient light proximity detection) or reflected light (reflected light proximity detection), (3) determine the location of an object relative to the dimensions of the display panel by sensing ambient light (ambient light object location detection) or by sensing reflected light (reflected light object location determination), (4) determine a surface profile of a target object by sensing reflected light (surface profile determination), and (5) calibrate display panel uniformity (display panel calibration). Because such operations are not exclusive of one another, the output processor 123 may be configured to perform more than one operation.

FIGS. 9A-9C illustrate exemplary operations performed by the interactive display system 100 with an output processor 123 configured for ambient light detection. The output processor 123 may be configured to increase or decrease the brightness of the display panel 119 in response to ambient light. The output processor 123 may receive a bitmap or other representation of light intensities sensed by LEDs, such as the sensing IR diodes 502 in the display panel 119. The sensed light intensities may represent every sensing IR diode in the display panel 119 or only a portion of the sensing IR diodes within the display panel 119. For example, one row of sensing IR diodes may be sensing ambient light while a row of emitting LEDs is emitting light, or one sensing IR diode within a row may be sensing ambient light while surrounding emitting LEDs within the same row are emitting light. With the bitmap of sensed light intensities, the output processor 123 may calculate the total ambient light intensity sensed by the sensing IR diodes. Thereafter, the output processor 123 may compare the total ambient light intensity to a control value and send feedback data to the input processor 101. In an embodiment, the control value is determined by an algorithm programmed by a designer. The algorithm may calculate the control value based upon a number of different variables established by the designer. Additionally, in an embodiment, the control value is a max value or a degree of change. If the total ambient light intensity is greater than the control value, then the feedback data includes a signal to increase the brightness of the entire display panel 119 or otherwise operate the emitting LEDs of the display panel 119 at an intensity corresponding to the ambient light. If, however, the total brightness is less than the control value, then the feedback data includes a signal to decrease the brightness of the entire display panel 119 or otherwise operate the emitting LEDs of the display panel 119 at an intensity corresponding to the ambient light. For example, as shown in FIG. 9A, if a display panel 119 is operating outside on a sunny day where ambient light is bright, the output processor 123 would send feedback data to the input processor 101 to increase the brightness of the display panel 119, resulting in a brightened display panel 901. On the other hand, as shown in FIG. 9B, if the display panel 119 is operating outside at night or indoors where it is relatively dark, the output processor 123 would send feedback data to the input processor 101 to decrease the brightness, resulting in a dimmed display panel 903. That way, the display panel 119 would not be too bright when used indoors or too dark on a bright, sunny day.

Rather than adjusting the brightness of the entire display panel 119, the output processor 123 may adjust the brightness of a portion of the display panel 119 as depicted in FIG. 9C. In one such embodiment, the output processor 123 is configured to compare each interactive pixel's sensed light intensity with the control value and adjust the brightness of each emissive pixel accordingly. If a portion 907 of the display panel 119 senses less ambient light while a portion 905 of the display panel senses more ambient light (e.g., a shadow cast across the portion 907, or glare on the portion 905 of display panel 119), the output processor 123 may be configured to increase the drive voltage for the portion 905 of emissive pixels that are displaying under more light to increase light emission and brighten portion 905, and/or decrease the drive voltage for the portion 907 of emissive pixels that are displaying under less light to decrease light emission and dim portion 907. As a result, the perceived display brightness may be substantially consistent across the display panel 119.

Figure 9D:
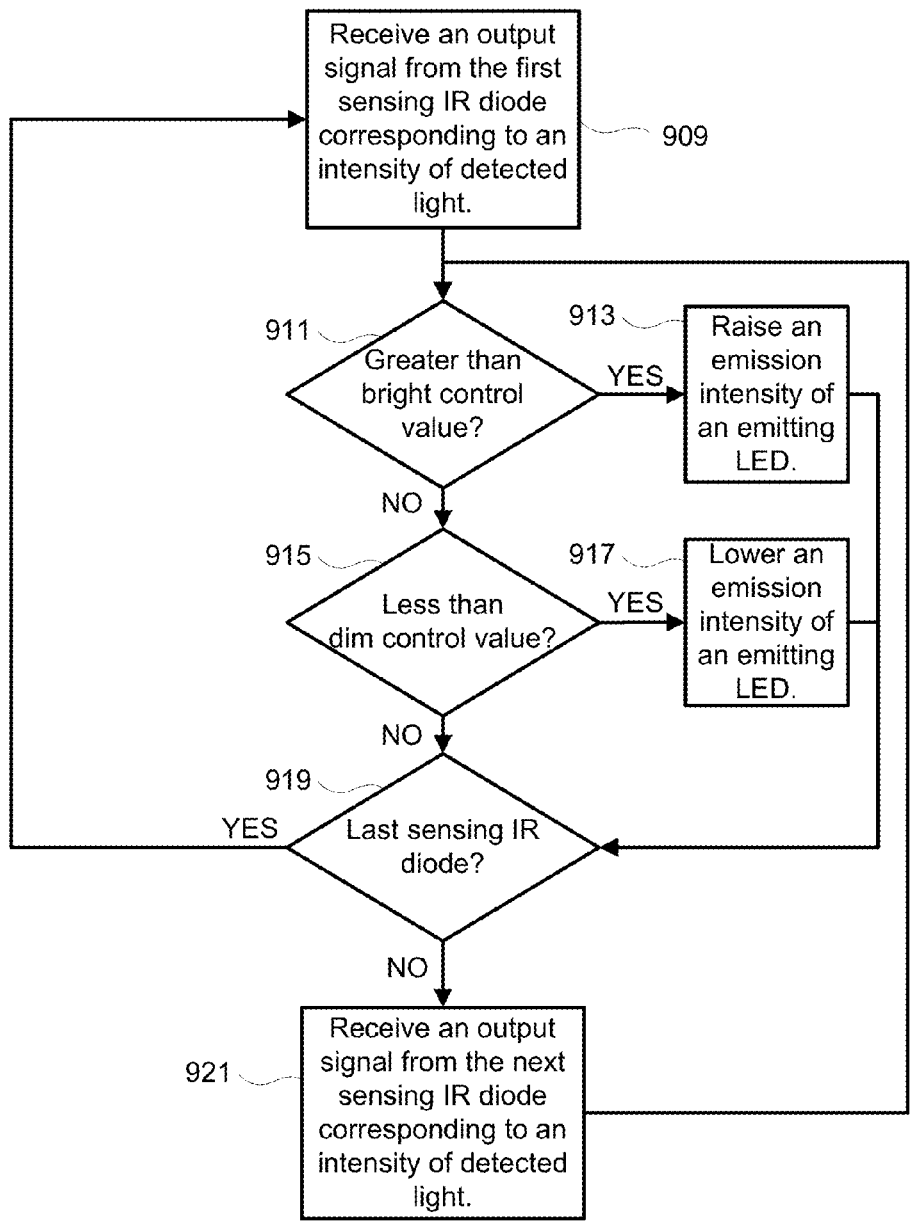
FIG. 9D is a flow chart of a method of performing ambient light detection with an interactive display panel in accordance with embodiments.

An exemplary method of performing ambient light detection with an interactive display panel 119 is illustrated in FIG. 9D. At 909, the output processor 123 receives an output signal from a first sensing IR diode corresponding to an intensity of detected light. In this embodiment, the output signal is the sensing output data 230 of the first sensing IR diode sent from the sense receiver 115. In an embodiment, the sensing output data 230 is not incorporated within a bitmap, but gets relayed directly to the output processor 123 through the sense timing controller 121. Alternatively, output processor 123 may receive output signals from sensing IR diodes in the form of an output data bitmap, as described herein. In an embodiment, the first sensing IR diode is the top left most sensing IR diode in the display panel 119.

At 911, the output processor 123 determines whether the sensing output data 230 is greater than a bright control value. In an embodiment, the bright control value corresponds to a certain brightness of light determined by an algorithm programmed by a designer. The algorithm may calculate the bright control value based upon a number of different variables established by the designer. If the sensing output data 230 is greater than the bright control value, the output processor 123 determines that the ambient light sensed is too bright for the current emission intensity of an LED, such as one or more emitting LEDs in proximity to the sensing IR diode or in a subarea of the display panel. At 913, the output processor 123 raises an emission intensity of one or more emitting LEDs in proximity to the sensing IR diode to compensate for the bright ambient light. Accordingly, the display or portions thereof will be automatically adjusted to improve visibility in situations where there is bright ambient light. Alternatively, if the sensing output data 230 is not greater than the bright control value, at 915, the output processor 123 determines whether the sensing output data 230 is less than a dim control value. In an embodiment, the dim control value corresponds to a certain dimness of light determined by an algorithm programmed by the designer. The algorithm may calculate the dim control value based upon a number of different variables established by the designer. If the sensing output data 230 is dimmer than the dim control value, the output processor 123 may determine that the ambient light sensed is too dim for the current emission intensity of the one or more emitting LEDs in proximity to the sensing IR diode. At 917, the output processor 123 lowers an emission intensity of the one or more emitting LEDs in proximity to the sensing IR diode to compensate for the dim ambient light. Accordingly, the display or portions thereof will be automatically adjusted to improve visibility in situations where there is dim ambient light.

At 919, the output processor 123 determines whether the selected sensing IR diode is the last sensing IR diode in the display panel (or current output data bitmap). In an embodiment, the last sensing IR diode is the bottom right most sensing IR diode in the display panel 119. If the sensing IR diode is the last sensing IR diode in the display panel, then every sensing IR diode in the display panel has been processed and the first sensing IR diode in the display panel is selected again at 909. Alternatively, if the selected sensing IR diode is not the last sensing IR diode, at 921, the output processor 123 receives an output signal from the next sensing IR diode corresponding to an intensity of detected light. In an embodiment, the next sensing IR diode is another sensing IR diode immediately to the right of the selected sensing IR diode if possible, otherwise the next sensing IR diode is the left most sensing IR diode in the next row, such as the row below the selected row.

The exemplary method in FIG. 9D is performed for each sensing IR diode sensing light to allow any portion of the display panel 119 to brighten or dim according to the ambient light profile. As such, the whole display panel 119 may brighten or dim as shown in FIGS. 9A and 9B, or a portion of the display panel 119 may brighten or dim as shown in FIG. 9C.

Figure 10A:
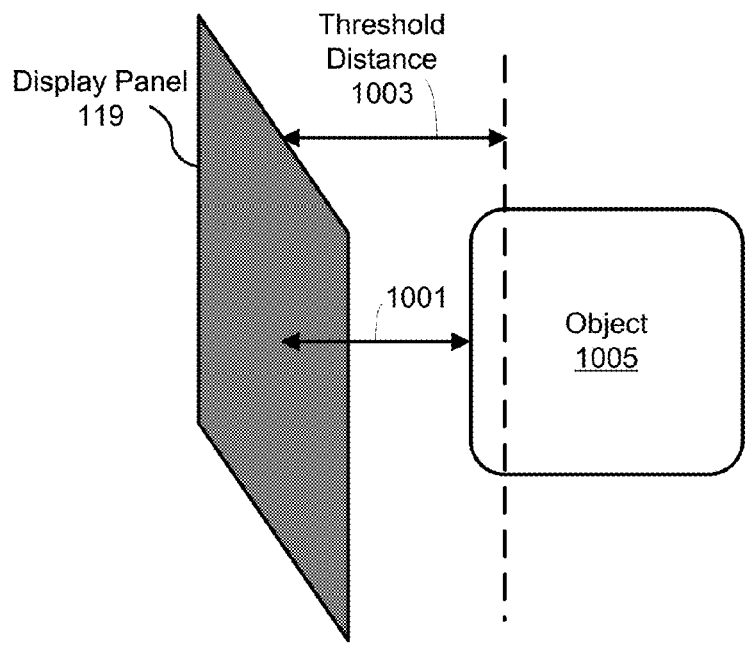
FIGS. 10A and 10B illustrate an operation of an interactive display panel with a processor configured for proximity detection in accordance with an embodiment.
Figure 10B:
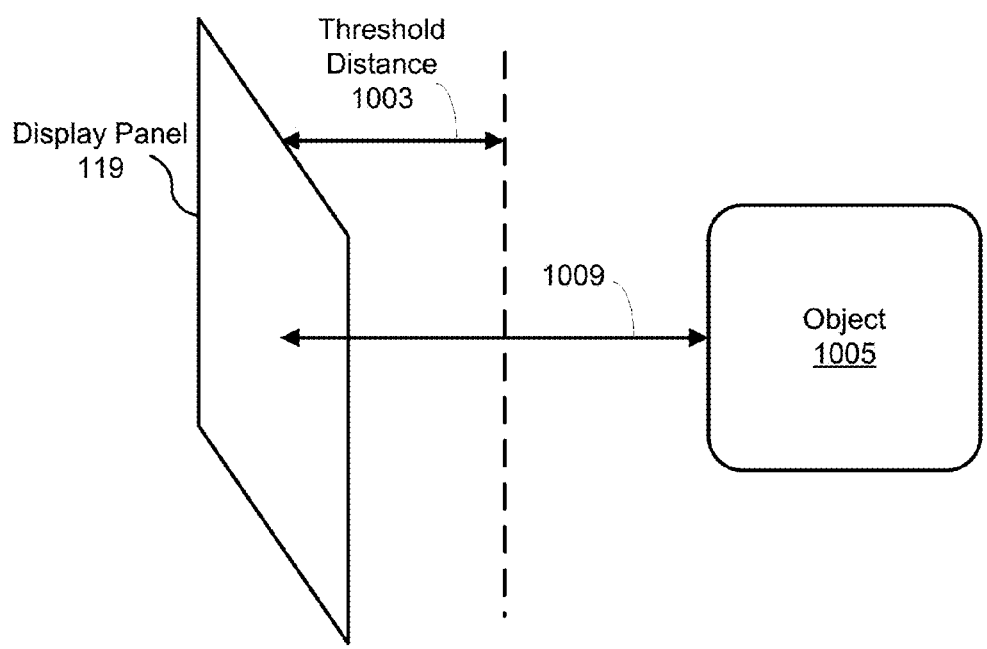

FIGS. 10A and 10B illustrate exemplary operations performed by the interactive display panel system 100 with an output processor 123 configured for proximity detection, such as ambient light proximity detection or reflected light proximity detection. FIG. 10A illustrates an exemplary instance in which a distance 1001 of an object 1005 is within the threshold distance 1003 to the display panel 119 and covers a threshold region of the display panel, thus causing the display panel 119 to cease emitting light. FIG. 10B illustrates an exemplary instance in which a distance 1009 of the object 1005 is not within the threshold distance 1003 to the display panel 119, thus causing the display panel 119 to begin or continue emitting light.

An output processor 123 configured for ambient light proximity detection turns the light emitting function of the display panel 119 on or off in response to an object's proximity to the display panel 119 by calculating an intensity of blocked ambient light. The output processor 123 may receive a bitmap or other representation of light intensities sensed by sensing IR diodes in the display panel 119 from the sense timing controller 121. As an object 1005 moves closer to the display panel 119, more ambient light is blocked. Accordingly, the sensing IR diodes may sense less ambient light as the object moves closer to the display panel 119. After receiving the bitmap, the output processor 123 may calculate the intensity of light sensed by the sensing IR diodes and compares the intensity of light to a control value. The control value may be an intensity of sensed light that represents a threshold distance 1003 to the display panel 119. In an embodiment, the control value is determined by an algorithm programmed by a designer. The algorithm may calculate the control value based upon a number of different variables established by the designer. If the intensity of sensed light is less than the control value (indicating, for instance, that the object 1005 is blocking more than a certain intensity of light), then the output processor 123 may compare the sensed light to a threshold region of the display panel 119. The threshold region of the display panel 119 may represent a certain portion of the display panel 119. For example, the threshold region of the display panel 119 may represent half of the display panel 119. As such, if a portion of the display panel 119 that is sensing an intensity of light less than the control value is greater than the threshold region of the display panel 119 (indicating that the object 1005 is blocking more than the threshold region of the display panel, such as half of the display panel), then the output processor 123 may send feedback data to the input processor 101 that includes a signal to turn the light emitting function of the display panel 119 off. In an alternative example, the threshold region of the display panel 119 can be determined by a specific location within the display panel 119. In an embodiment, the threshold region of the display panel represents a portion of the display panel 119 near the top of the display panel 119 closest to a speaker used for talking on a phone. If, however, the intensity of sensed light is greater than the control value (indicating that the object 1005 is blocking less than the threshold region of the display panel 119) or the area of a region of the display panel that is sensing an intensity of light less than the control value is less than a threshold region of the display panel 119, then the feedback data may include a signal to keep/turn the light emitting function of the display panel 119 on. In one embodiment, the output processor 123 is configured to turn the display panel 119 off when an object, such as a person's cheek or ear, is within a distance of 2 cm from a top quarter of the display panel 119 and turn back on when the cheek or ear is farther than 2 cm from the top quarter of the display panel 119. Accordingly, the display panel 119 may advantageously save battery power by not displaying an image when more than a threshold region of the display panel 119 is blocked.

On the other hand, an output processor 123 configured for reflected light proximity detection may turn the display panel 119 off in response to an object's proximity to the display panel 119 by calculating an intensity of reflected light. The output processor 123 may receive a bitmap or other representation of light intensities sensed by sensing IR diodes in the display panel 119 from the sense timing controller 121. In an embodiment, the light sensed by the sensing IR diodes includes light emitted from a source light that is reflected off the object's surface. For example, the source light may be one or more adjacent emitting LEDs or one or more distant emitting LEDs from within the display panel 119. In an embodiment, one or more adjacent IR emitting LEDs and one or more distant IR emitting LEDs are emitting light, which is detected by the sensing IR diodes. One exemplary circumstance for using such an embodiment is when the display panel is operating at night or in a dark room where no ambient light is available, or when no visible light is being emitted from the display panel. That way, the display panel can sense reflected IR light without disturbing the darkness or unnecessarily emitting bright visible light in a dark environment. After receiving the bitmap, the output processor 123 may calculate the total intensity of reflected light sensed by the sensing IR diodes and compares the total intensity of sensed light to a control value. The control value may be a certain intensity of sensed light that represents a threshold distance 1003 to the display panel 119. In an embodiment, the control value is determined by an algorithm programmed by a designer. The algorithm may calculate the control value based upon a number of different variables established by the designer. It is to be appreciated that the intensity of reflected light generally increases as the object 1005 gets closer to the display panel 119. Accordingly, if the total intensity of sensed light is greater than the control value, then the object 1005 is too close. Additionally, the output processor 123 may compare the sensed light to a threshold region of the display panel 119. The threshold region of the display panel 119 may represent a certain portion of the display panel 119 that is being reflected by the object, such as half of the display panel 119. If more than the threshold region of the display panel 119 is reflected, then the output processor 123 sends feedback data to the input processor 101 that includes a signal to turn the visible light emitting function of the display panel 119 off. In an alternative example, the threshold region of the display panel 119 can be determined by a specific location within the display panel 119. In an embodiment, the threshold region of the display panel 119 represents a portion of the display panel 119 near the top of the display panel 119 closest to a speaker or an earpiece used for talking on a phone. In this manner, the display panel detects proximity to a user's face. If, however, the total intensity of sensed light is less than the control value, or the portion of the display panel that is being reflected by the object is less than the threshold region of the display panel 119, then the feedback data may include a signal to turn the visible light emitting function of the display panel 119 on, if off, or continue emitting light with the display panel 119.

Figure 10C:
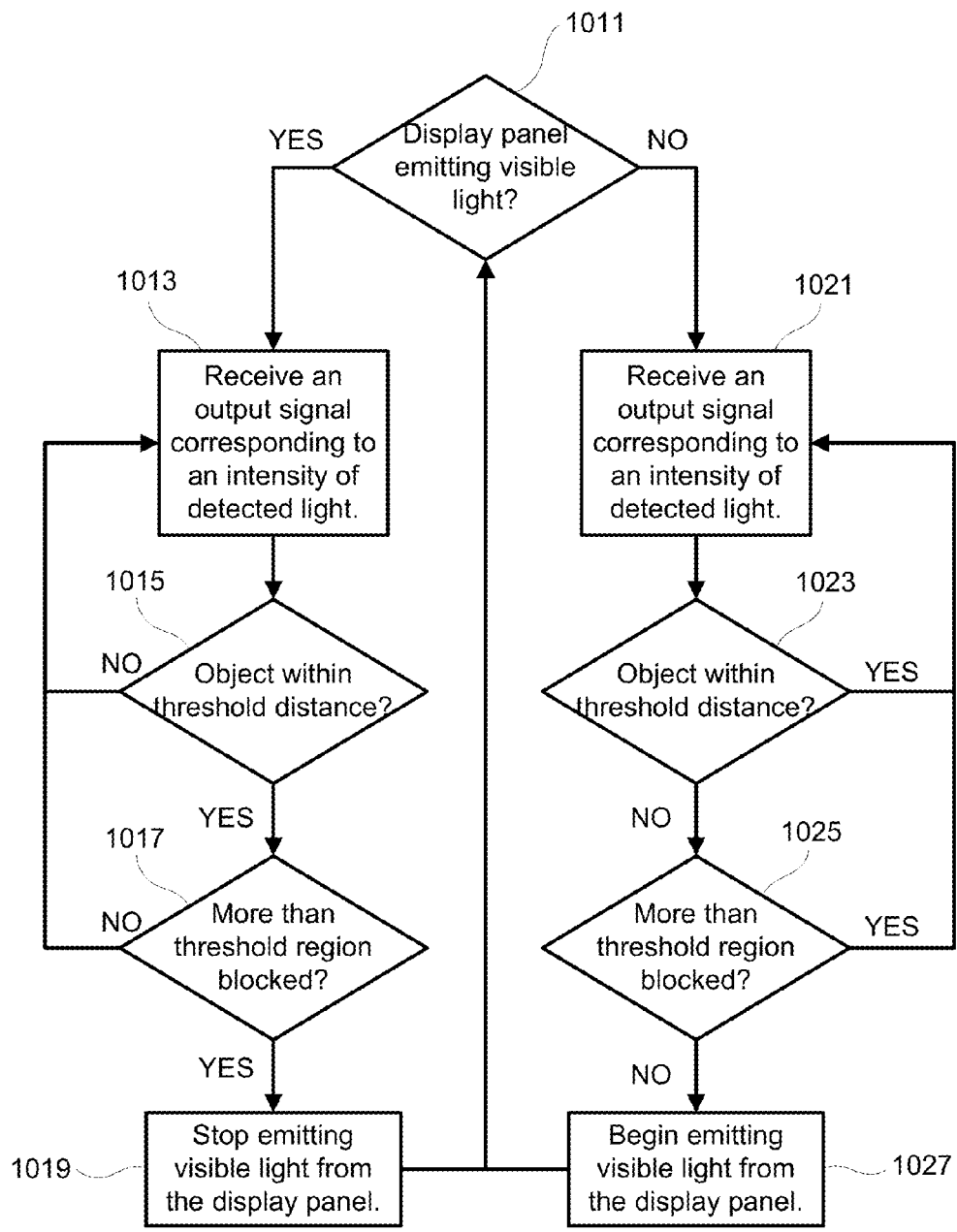
FIG. 10C is a flow chart of a method of performing proximity detection with an interactive display panel in accordance with an embodiment.

A method of performing proximity detection to control a light emitting function of the display panel 119 is illustrated in FIG. 10C according to an embodiment. At 1011, the output processor 123 determines whether or not the display panel 119 is emitting visible light. If the display panel 119 is emitting visible light, at 1013, the output processor 123 receives the display panel sensing data 125 in the form of a bitmap corresponding to an intensity of detected light (IR and/or visible).

In the case of ambient light proximity detection, at 1015, the output processor 123 determines whether the object is within a threshold distance to the display panel 119 by comparing the lowest intensity of light sensed with a control value, such as the control value disclosed above. In embodiments, ambient light proximity detection is used when ambient light exists, such as outdoors during the day or in a brightly lit room. Accordingly, ambient light proximity detection may be useful when the display is not emitting light. The control value represents a low intensity of light to indicate that an object is within the threshold distance to the display panel 119 due to a significant amount of blocked light. In an embodiment, the lowest intensity of light sensed may be an intensity of light sensed from any sensing IR diode in the display panel or any group of sensing IR diodes in the display panel. For example, the lowest intensity of light sensed may be determined by one sensing IR diode or the average of the lowest 10% of light sensed by all sensing IR diodes within the display panel. As such, if the lowest intensity of light sensed crosses the control value, then the object may be determined to be within the threshold distance. In an embodiment, the group of sensing IR diodes is located near the top of the display panel 119 closest to a speaker or earpiece used for talking on a phone. If the object does not block enough light, the output processor 123 determines that the object is not within the threshold distance and the output processor 123 will continue monitoring whether or not an object comes within the threshold distance to the display panel at 1013.

In the case of reflected light proximity detection, at 1015, the output processor 123 determines whether the object is within the threshold distance to the display panel by comparing the highest intensity of light sensed with a control value. In embodiments, reflected light proximity detection is used when ambient light does not exist, such as outdoors at night or in a dark room and the display panel 119 is emitting light. Accordingly, reflected light proximity detection may be useful when the display is emitting light and is the only source of light in the surrounding environment. In this case, the control value represents a high intensity of light to indicate that an object is within the threshold distance to the display panel due to a significant amount of reflected IR light. In an embodiment, the high intensity of light is determined by light sensed by one sensing IR diode or an average of the highest 10% of light sensed by all sensing IR diodes within the display panel. In an embodiment, the intensity of light is sensed by a group of sensing IR diodes located near the top of the display panel 119 closest to a speaker or earpiece used for talking on a phone. If an object does not reflect enough light, the output processor 123 may determine that the object is not within the threshold distance and the output processor 123 will continue monitoring whether or not an object comes within the threshold distance to the display panel at 1013.

Once the object comes within the threshold distance, the output processor 123, at 1017, will then determine whether or not the object blocks or reflects more than a threshold region of the display panel 119 to the display panel 119. The threshold region of the display panel 119 can be determined by a specific location within the display panel 119. In an embodiment, the threshold region of the display panel 119 is a portion of the display panel 119 near the top of the display panel 119 closest to a speaker or earpiece used for talking on a phone. Alternatively, in an embodiment, the threshold region of the display panel 119 is represented by a percentage of blocked or reflected LEDs in the display panel 119. For example, the threshold region may be 50% of the display panel 119. Accordingly, if less than 50% of the display panel 119 is blocked or reflected, the output processor will continue monitoring whether or not an object is within the threshold distance and has blocked or reflected more than the threshold region of the display panel 119 to the display panel 119 by looping back to 1013. Alternatively, if more than the threshold region of the display panel 119 is blocked or reflected, the output processor 123 will cause the display panel 119 to stop emitting visible light at 1019. Thereafter, at 1011, the output processor will again determine whether the display panel is emitting light. In an embodiment, the threshold region of the display panel 119 is determined by a specific location within the display panel 119. In an embodiment, the threshold region of the display panel 119 is a portion of the display panel 119 near the top of the display panel 119 closest to a speaker or earpiece used for talking on a phone.

Continuing with the example above, when the output processor determines that the display panel is not emitting visible light, at 1021, the output processor 123 receives an output signal corresponding to an intensity of detected light. In other words, the display panel 119 continues using sensing IR diodes to sense light while not emitting visible light.

Because the display panel 119 is not emitting visible light, reflected light proximity detection uses IR emitting LEDs to emit IR light while using the sensing IR diodes to detect the emitted IR light. As such, the functionality of detecting reflected light may still be utilized while not unnecessarily emitting visible light. At 1023, the output processor 123 determines whether or not the object is within the threshold distance to the display panel 119 by comparing the highest intensity of light detected with the control value. As mentioned above, the highest intensity of light detected may be determined by the average of the highest 10% of light detected by all sensing IR diodes within the display panel 119. As such, if the highest intensity of light detected still crosses the control value, the output processor 123 determines that the object is still within the threshold distance and continues monitoring whether the object departs from within the threshold distance to the display panel by looping back to 1021.

Once the object departs from within the threshold distance from at least a portion of the display panel 119, the output processor 123, at 1025, determines whether the object reflects less than a threshold region of the display panel 119 to the display panel 119. For example, the threshold region of the display panel 119 may be half of the display panel 119. Accordingly, in the case of reflected light proximity detection, if more than the threshold region of IR light to the display panel 119 is reflected, then the output processor will continue monitoring whether or not an object is still within the threshold distance by looping back to 1021. Alternatively, if less than the threshold region of the display panel 119 is reflected, then the output processor 123 will cause the display panel 119 to begin emitting visible light from the display panel 119 at 1027. Again thereafter, the method returns to 1011.

FIGS. 11A-11D illustrate exemplary operations performed by the interactive display panel system 100 with an output processor 123 configured for ambient light object location determination or reflected light object location determination. An output processor 123 configured for ambient light object location determination may determine a spatial location of an object 1101 by calculating a location of blocked light. The output processor 123 may receive a bitmap 1119 from the sense timing controller 121 that corresponds to light intensities sensed by sensing IR diodes within the display panel 119 (or other representation of sensed light intensities). In this embodiment, the light sensed by the sensing IR diodes originates from ambient light 1109. Referring to FIG. 11B, as an object 1101, such as a finger, moves close to the display panel 119, the object 1101 blocks ambient light from reaching an area of the display panel 119. As such, the bitmap 1119 from FIG. 11C represents an area of darkness 1107 surrounded by an area of light 1103. After receiving the bitmap 1119, the output processor 123 determines the object's touch coordinates by calculating the horizontal and vertical locations of the darkest spot 1110. Accuracy may suffer, however, if ambient light is uneven and includes dark areas 1105 of ambient light among bright areas 1103 of ambient light as shown in the partially shaded bitmap 1117 in FIG. 11B (e.g., a shadow cast across a portion of the display panel 119). One way of increasing accuracy may be by correcting for the dark areas 1105 that do not correspond to the object's location. In an embodiment, the output processor 123 utilizes a frame buffer to store a control bitmap 1115 shown in FIG. 11A. The control bitmap 1115 may be a bitmap of ambient light before the object 1101 is close to the display panel 119. The control bitmap 1115 is captured when the display panel 119 begins to sense light. Thereafter, the control bitmap 1115 is captured periodically until an object moves close to (i.e., comes in contact with) the display panel 119 or when a triggering event occurs. In an embodiment, the control bitmap 1115 is captured every second when the display panel 119 is sensing light. In one embodiment, the triggering event is when a phone's accelerometer detects a movement, indicating that the display environment has changed. When an object moves close to the display panel (e.g., determined by output processor 123 as described above), the sensing bitmap 1117 may be captured and sent to the output processor 123. Once the sensing bitmap 1117 is received, the output processor 123 may compare the control bitmap 1115 to the sensing bitmap 1117 and generate a corrected bitmap 1119 as shown in FIG. 11C by removing the dark areas 1105 of the control bitmap 1115 from the sensing bitmap 1117. For example, the output processor 123 may remove the dark areas 1105 by subtracting value of the intensity of detected light represented by the control bitmap 1115 from corresponding values in the sensing bitmap 1117. As such, when the object's spatial location is calculated with the corrected bitmap 1119, the dark areas 1105 caused by variations in ambient light may be excluded from the calculation of the object's spatial location. Using the corrected bitmap 1119, the output processor 123 may determine and outputs the object's spatial location as described above.

On the other hand, an output processor 123 configured for reflected light object location determination may determine an object's spatial location by calculating a location of reflected visible or IR light. The output processor 123 may receive a bitmap 1121 (shown in FIG. 11D) from the sense timing controller 121 that corresponds to light intensities sensed by sensing IR diodes within the display panel 119. In this embodiment, the light sensed by the sensing IR diodes includes light emitted from a source light that is reflected off the object's surface. For example, the source light may be one or more adjacent emitting LEDs or one or more distant emitting LEDs from within the display panel 119. The amount of reflected light generally increases as the object gets closer to the display panel 119. Thus, as an object moves close to, i.e., comes in contact with, the display panel 119, the object reflects light in a corresponding area of the display panel 119. As such, in one embodiment, the resulting bitmap 1121 from FIG. 11D represents an area of light 1108 surrounded by an area of darkness 1104. After receiving the bitmap, the output processor 123 may determine the object's touch coordinates by calculating the horizontal and vertical locations of the brightest spot 1112. In an embodiment, the emitting LEDs are IR emitting LEDs that emit invisible IR light. In this embodiment, the display panel may be perceived to be off but actually emitting IR light to determine an object's location. As such, the display panel does not have to emit visible light to utilize the operation of reflected light object location determination. One circumstance where this may be useful is allowing a user to interact with the display panel when the display panel is visibly off. For instance, a cell phone may be unlocked when the display panel is not emitting visible light by swiping a finger across the dark display panel.

Figure 11E:
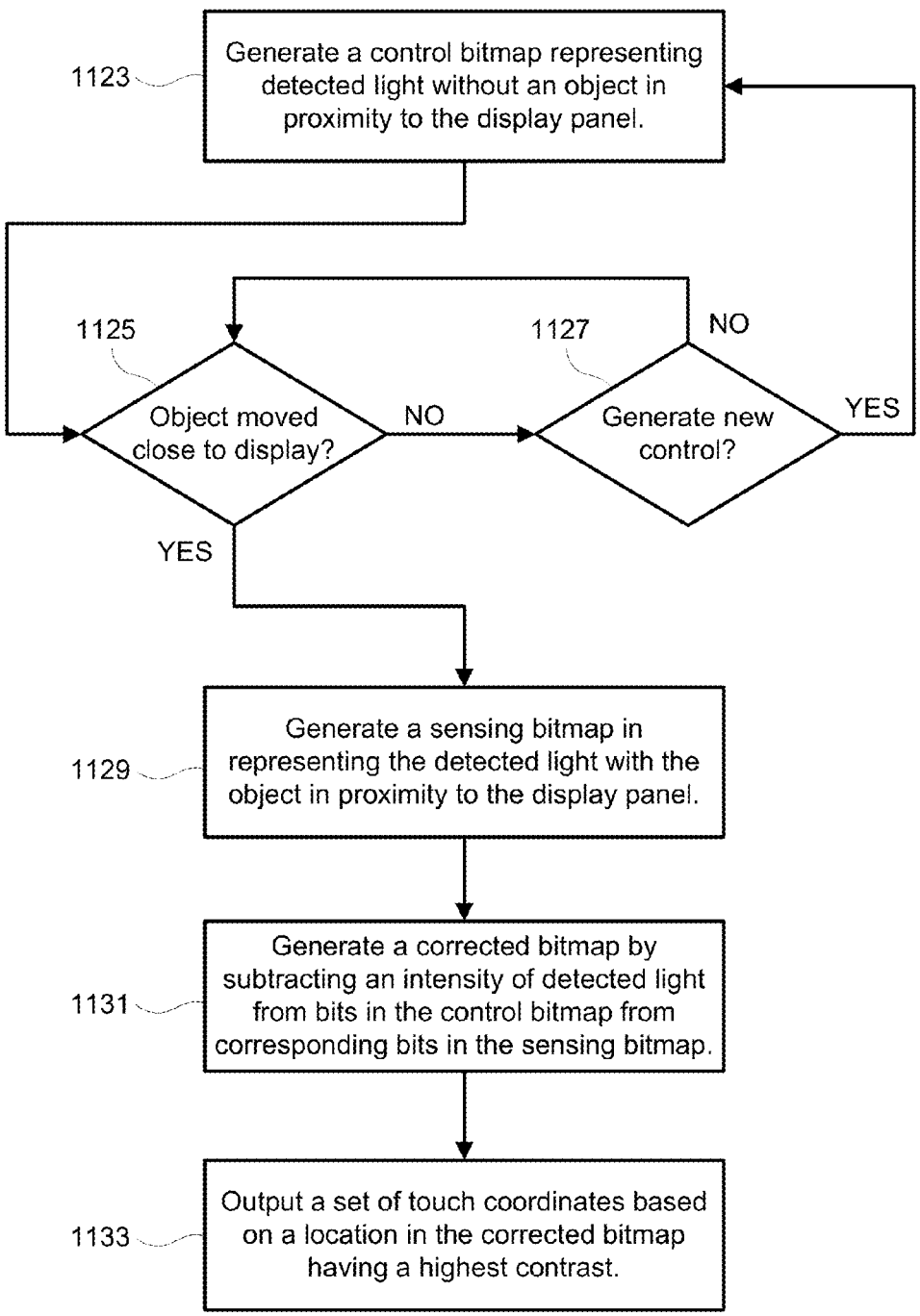
FIG. 11E is a flow chart of a method of performing object location determination with an interactive display panel in accordance with an embodiment.

A method of performing object location determination with the display panel 119 according to an embodiment is illustrated in FIG. 11E. At 1123, the output processor 123 generates a control bitmap, e.g., 1115 in FIG. 11A, representing detected light without an object in proximity to the display panel (e.g., when it receives display panel sensing data 125 from the sense timing controller 121). The control bitmap can be generated at various times of operation. For example, the control bitmap may be generated when the display is initially turned on to emit visible light. Furthermore, the control bitmap may be generated by or in response to a request from an application. For example, the control bitmap may be generated by a user when the user initiates execution of an application. The control bitmap may represent the environment's light profile before an object moves close to the display panel 119. As such, any deceptive light profiles that may be mistaken for the object's actual location (e.g., a partial shadow across display panel 119) may be recorded and later subtracted out of the calculation for a more accurate determination of the object's location.

At 1125, the output processor determines whether an object has moved close to the display panel. To make this determination, the output processor 123 compares an amount of sensed light with a control value. In this case, the control value may represent a complete blockage of ambient light (e.g., the darkest spot 1110 from FIG. 11C) or a complete reflection of source light (e.g., the brightest spot 1112 from FIG. 11D) to indicate that an object has made contact with the display panel 119. If the output processor 123 does not receive a bitmap with an area that crosses the control value, then, at 1127, the output processor 123 determines whether a new control bitmap should be generated. In making this determination, the output processor may consider an amount of time that has elapsed such that a new control bitmap is generated periodically. For instance, a new control bitmap may be generated every second where an object has not moved close to the display panel 119. In another example, a new control bitmap may be generated when a triggering event occurs. In an embodiment, the triggering event is when a separate sensor, such as an accelerometer, detects movement of the display panel, indicating that the environment from which the control bitmap is to be generated as changed. As such, if the set amount of time has not elapsed or no movement has been made, then the output processor 123 returns to 1125 to determine whether an object has moved close to the display panel. Alternatively, if it is determined that a new control is to be generated, the output processor 123 generates a control bitmap at 1123.

Once an object moves close to the display panel 119, at 1129, the output processor 123 generates a sensing bitmap representing the detected ambient light with the object in proximity to the display panel, e.g., as illustrated in the sensing bitmap 1117 of FIG. 11B. At 1131, the output processor 123 may generate a corrected bitmap by subtracting a value of intensity of detected light represented by the control bitmap from corresponding values in the sensing bitmap and calculates a set of touch coordinates. The corrected bitmap may illustrate the profile of the object without any deceptive light profiles that may be been introduced by the environment, allowing for a more accurate calculation of the object's location. At 1133, the output processor outputs the set of touch coordinates based on adjacent locations within the corrected bitmap having a highest contrast. In an embodiment, for ambient light object location determination, the location having the highest contrast is the darkest spot 1110. For reflected light object location determination, the location having the highest contrast is the brightest spot 1112. For circumstances where the display panel is not displaying visible light, the brightest spot 1112 is the spot that reflects the most IR light.

Figure 13:
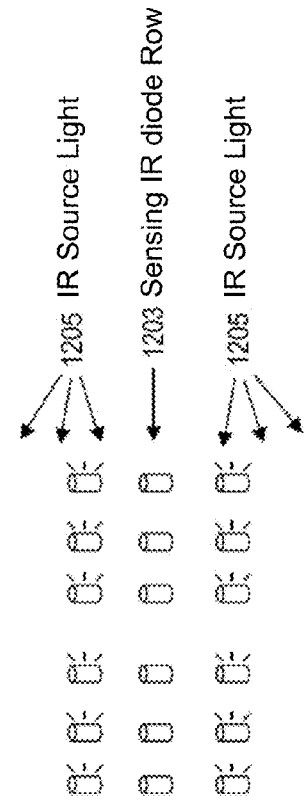
FIG. 13 illustrates a layout of subpixels in an interactive display panel for surface profile determination with IR light in accordance with an embodiment.
Figure 12:
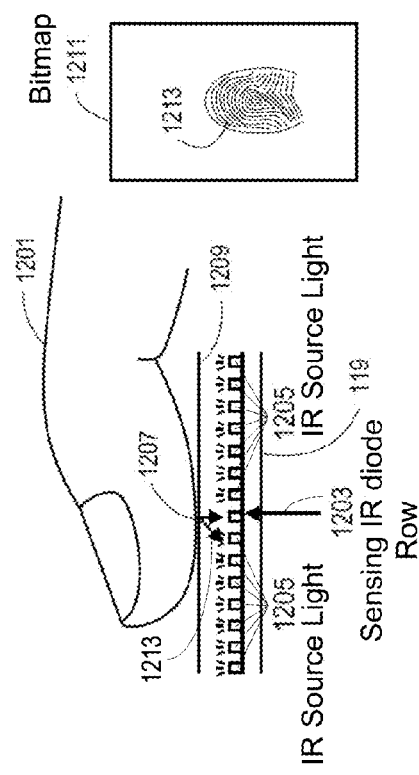
FIG. 12 illustrates an operation of an interactive display panel with a processor configured for surface profile determination with IR light in accordance with an embodiment.

FIG. 12 illustrates an exemplary operation performed by the interactive display panel system 100 with an output processor 123 configured for surface profile determination. An output processor 123 configured for surface profile determination may determine a surface profile of a target object. The output processor 123 may receive a bitmap 1211 from the sense timing controller 121 that corresponds to light intensities sensed by sensing IR diodes within the display panel 119 (or other representation of sensed light intensities). In this embodiment, the light sensed by the sensing IR diodes includes visible or invisible light emitted from a source light 1205 that is reflected off the target object's surface 1207. In an embodiment, the source light 1205 is an IR emitting LED that emits invisible IR light. As shown in FIG. 13, the IR source light 1205 may be one or more adjacent IR emitting LEDs or one or more distant IR emitting LEDs from within the display panel 119. Referring back to FIG. 12, when the target object is placed on a transparent substrate 1209 encapsulating the display panel 119, IR light may be reflected off the surface 1207 of the target object 1201 and sensed by sensing IR diodes, such as the sensing IR diodes in a sensing row 1203. During a typical sensing operation, the sensing row 1203 sequentially scrolls from row 1 to row N as described above in FIGS. 8A-8C. The target object's unique surface profile results in a corresponding reflection pattern 1213 that is sensed by the sensing IR diodes in the sensing row 1203. As such, the bitmap 1211 may represent patterned areas of brightness and darkness 1213 that correspond to the pattern of the target object's surface profile. After receiving the bitmap 1211, the output processor 123 may interpret the patterned areas of brightness and darkness 1213 and determines the target object's surface profile. In one example, the target object 1201 contains a fingerprint surface. When the fingerprint is placed upon the transparent substrate, the sensing IR diodes 1203 within the display panel 119 sense patterned IR light reflected off grooves of the fingerprint surface. This patterned IR light is relayed to the output processor 123 as a bitmap 1211 where it is processed to determine the fingerprint surface's unique pattern. Because the display panel can sense IR light, the display panel is able to perform surface profile determination when the display panel is not emitting visible light. The ability to detect an object's surface profile while the display panel is not emitting visible light enables the display panel to detect a user's fingerprint to unlock a mobile device such as a cell phone when the display panel appears to be off. Accordingly, the display panel need not emit visible light to detect a surface profile of an object, nor does the display panel require a separate sensor to detect the surface profile of an object.

FIG. 13 illustrates a layout of a section of a display panel with sensing and emitting rows, according to embodiments of the invention. In an embodiment, the sensing row 1203 is between two rows of source lights 1205, one above the sensing row 1203 and one below the sensing row 1203. In an embodiment, the source lights 1205 are IR emitting LEDs that emit invisible IR light. The sensing row 1203 may include sensing IR diodes that sense light emitted from the IR source lights 1205 in adjacent rows.

Figure 14:
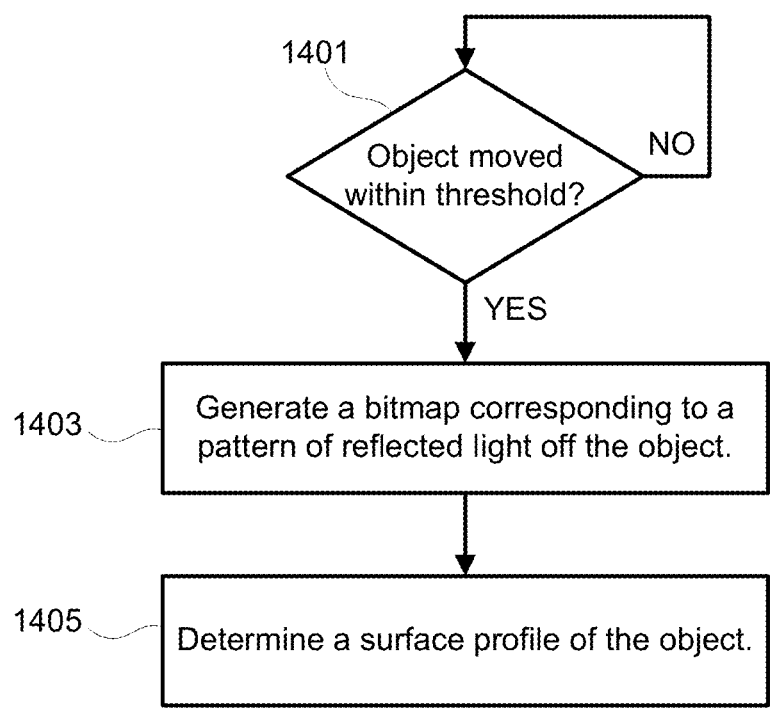
FIG. 14 is a flow chart of a method of performing surface profile determination with an interactive display panel in accordance with an embodiment.

An exemplary method of performing surface profile determination with the interactive display panel 119 is illustrated in FIG. 14. At 1401, the output processor 123 determines whether an object has moved within a threshold distance to the display panel. To make this determination, the output processor 123 compares an amount of sensed light with a control value. In this case, the control value may be an intensity of light that represents a complete reflection of source light to indicate that an object has made contact with the display panel 119. In an embodiment, the source light is light emitted from an IR emitting LED that is sensed by a sensing IR diode. If the object does not move within the threshold distance to the display panel, then the output processor 123 returns to 1401 and continues to monitor for an object to come within the threshold distance to the display panel.

Once an object moves within the threshold distance, at 1403, the output processor 123 generates a bitmap by receiving display panel sensing data 125 in the form of a bitmap corresponding to a pattern of reflected IR light off the object. The pattern of reflected IR light is created by the reflection of IR light off the surface profile of the object. For example, the ridges and grooves of a fingerprint will reflect IR light in different amounts/angles. At 1405, the output processor 123 determines the surface profile of the target object by analyzing bright and dark patterns of the bitmap.

Figure 15B:
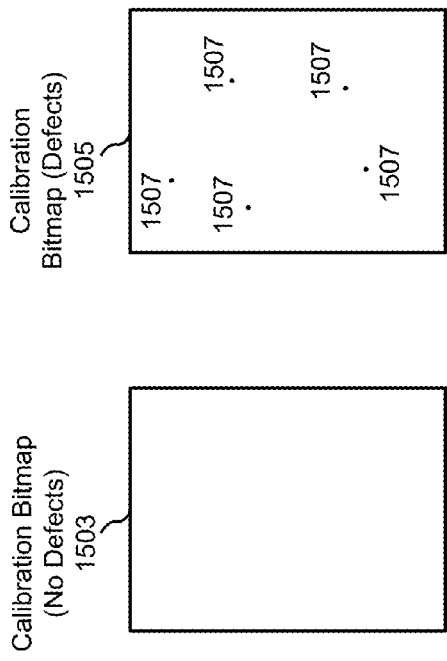
FIGS. 15A-15C illustrate operations of an interactive display panel with a processor configured for display panel calibration in accordance with embodiments.
Figure 15C:
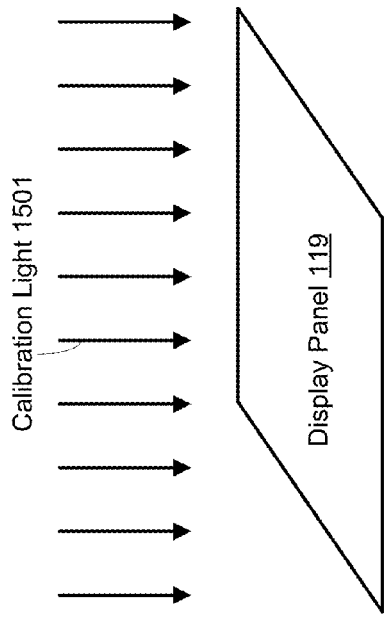
Figure 15A:
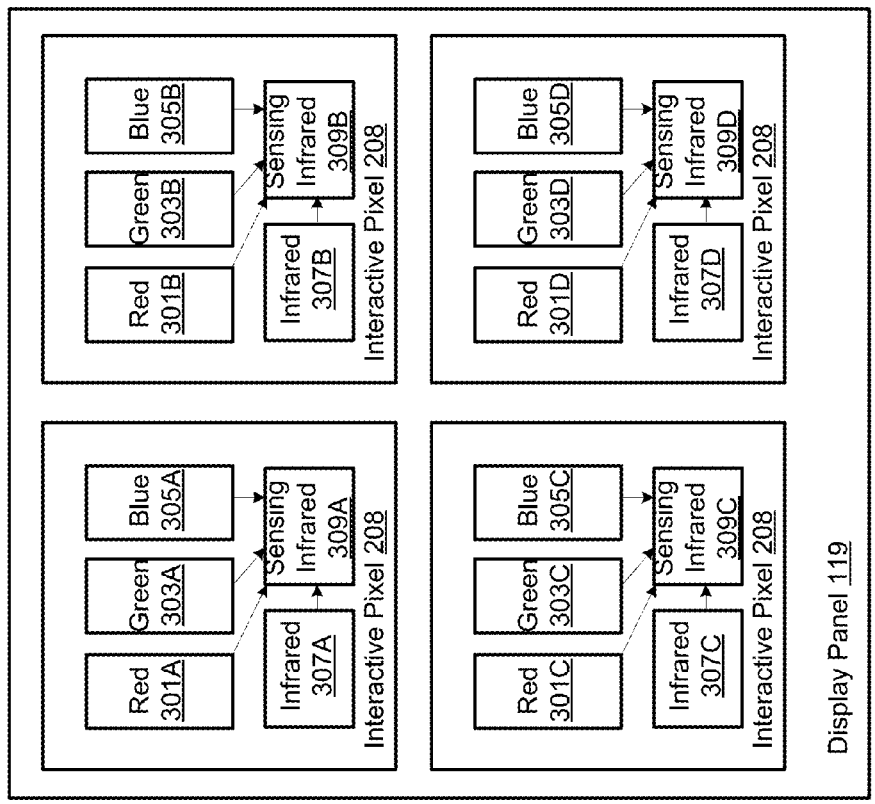

FIGS. 15A and 15B illustrate exemplary operations performed by the interactive display panel system 100 with an output processor 123 configured for display panel calibration. An output processor 123 configured for display panel calibration may receive a calibration bitmap 1503 or 1505 from the sense timing controller 121 that corresponds to light intensities sensed by sensing IR diodes within the display panel 119. In this embodiment, in FIG. 15A, the light sensed by the sensing IR diodes 309A, 309B, 309C, and 309D includes light emitted from an emitting LED within their respective interactive pixels 208A, 208B, 208C, and 208D. In an embodiment, the sensing IR diode 309A detects the intensity of light emitted from the red, green, blue, or IR emitting LEDs 301A, 303A, 305A, and 307A within the pixel 208A. Each emitting LED may be forward biased with a certain potential to drive the emitting LED to display light at a predetermined intensity of light. Accordingly, each sensing IR diode should detect the same intensity of light across the entire display panel 119. As such, as shown in FIG. 15B, for a non-defective display panel 119, the calibration bitmap 1503 represents a consistent plane of brightness that is substantially even across the whole display panel 119. The output processor 123 may receive the calibration bitmap 1503 and determine whether the brightness is substantially consistent across the whole display panel 119. The output processor 123 may then store the calibration bitmap as an initial calibration result in the system memory 105 and send feedback data to the input processor 101 indicating a satisfactory calibration check. In some instances, the stored initial calibration result is used in a subsequent calibration test to determine whether the emitting LEDs are degrading and, if they are degrading, the speed of their degradation. A subsequent calibration test result may be stored in place of the initial calibration result and used in subsequent calibration tests. In some instances, however, instead of receiving the calibration bitmap 1503, the output processor 123 may receive the calibration bitmap 1505 with representations of non-uniform brightness 1507. As such, the output processor 123 may determine that one or more defective emitting LEDs are emitting light inefficiently. As a result, the output processor 123 may send feedback data to the input processor 101 to increase the driving voltage applied to that defective emitting LED. That way, the defective LED may be driven at a higher voltage to compensate for its inefficiency. However, sensing a lower intensity of emitted light may not necessarily indicate that the emitting LED is defective. Rather, the sensing IR diode itself may be defective and therefore sensing less light. To determine whether the sensing IR diode is defective, a substantially uniform amount of light 1501 may be projected across the entire display panel 119 as depicted in FIG. 15C. Accordingly, since each sensing IR diode is exposed to the same amount of light, each sensing IR diode should detect the same intensity across the entire display panel. If one sensing IR diode is not detecting the correct amount of light, the output processor 123 may take this into consideration and sense light from the defective sensing IR diode for a longer period of time to develop a stronger sense signal.

Figure 15D:
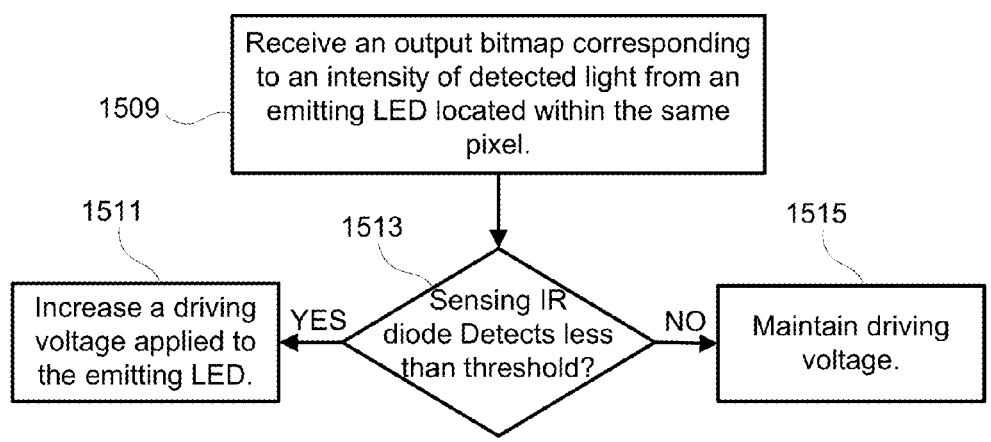
FIG. 15D is a flow chart of a method of performing display panel calibration with an interactive display panel in accordance with an embodiment.

An exemplary method of performing display panel calibration with the interactive display panel 119 is illustrated in FIG. 15D. At 1509, the output processor 123 receives an output bitmap corresponding to an intensity of detected light from the sensing IR diodes. In an embodiment, the intensity of detected light corresponds to light emitted at a predetermined intensity from an emitting LED within the same pixel. Pixels that do not contain a sensing IR diode may have sensing IR diodes in other pixels sense their emitted light. For instance, a sensing IR diode may detect an intensity of light emitted from an emitting LED in a nearby pixel. At 1513, the output processor determines whether there are any emitting LEDs that are emitting less than a threshold intensity of light by individually checking each sensing IR diode. In an embodiment, the threshold intensity of light is a predetermined intensity of light based upon the potential of a forward biasing voltage. Alternatively, the threshold intensity of light is calculated by averaging intensities sensed by a group of sensing IR diodes. In an embodiment, the group of sensing IR diodes is all the sensing IR diodes in the entire display panel 119. Alternatively, the group of sensing IR diodes is the top 10, 20, 50, or even 90 percent of sensing IR diodes that are sensing the most amount of emitted light from the emitting LEDs within their corresponding pixel. Sensing IR diodes that are sensing less than the threshold intensity indicate that the corresponding emitting LED is defective in emitting light. As such, if the output processor 123 determines that the emitting LED is emitting light inefficiently, at 1511, the output processor 123 increases a driving voltage applied to that emitting LED to compensate for its inefficiency in emitting light. The increase in driving voltage, in an embodiment, is proportional to the difference in intensity between expected emission intensity and sensed emission intensity. For example, the output processor 123 may use a look up table for an increased value, additional value, or multiplier for the value to compensate for the defect. However, if the output processor determines that the emitting LED is emitting at or greater than the control value, at 1515, the output processor maintains the driving voltage to that emitting LED.

FIGS. 16A-16H illustrate interactive display panels 119 with different microchip and sensing IR diode arrangements according to embodiments. While the embodiments illustrated and described in FIGS. 16A-16H are made with regard to microchips, embodiments are not so limited and similar embedded subpixel circuit arrangements are contemplated. For example, subpixel circuits and/or selection devices that may be located within the microchips can be embedded within the same substrate instead. In FIG. 16A, a display panel 119 having an array of interactive pixels 208 and a plurality of interactive microchips 1601 mounted within a display region 124 is illustrated. In an embodiment, the interactive microchip 1601 is capable of performing the same operations as the microchip 513. That is, each interactive microchip 1601 has a driving circuit 601 and a selection device 515 and is capable of driving an emitting LED to emit light in a light emission mode and electrically coupling a sensing circuit to a sensing IR diode to non-forward bias the sensing IR diode to detect light in a light sensing mode. The arrangement of microchips in the display panel 119 is such that every microchip is an interactive microchip 1601. Accordingly, interactive pixels 208 throughout the entire display panel 119 may emit and sense light.

In an embodiment depicted in FIG. 16B, an array of emissive pixels 207 and an array of decoupled sensing IR diodes 502 are arranged on the display panel 119 within the display region 124. Each decoupled sensing IR diode 502 is not formed in locations conventionally reserved for emitting LEDs in emissive pixels 207. For instance, as shown in FIG. 16B, the sensing IR diodes 502 are located in a sensing IR diode row 1610 located in an area where the emissive pixels 207 are not designed to be located. Each sensing IR diode row 1610 may have any number of sensing IR diodes 502 to achieve a desired sensing resolution according to design. In an embodiment, a plurality of interactive microchips 1601 is placed on the display panel 119. The plurality of interactive microchips 1601 may contain selection devices that electrically couple the decoupled sensing IR diodes 502 to a sensing circuit. Although FIG. 16B illustrates the display panel 119 containing only interactive microchips 1601, embodiments where some emissive microchips 1603 are mounted on the display panel 119 within the display region 124 and embodiments where only emissive microchips 1603 are mounted on the display panel 119 within the display region 124 are contemplated.

FIG. 16C illustrates an embodiment of FIG. 16B where emissive microchips 1603 are mounted on the display panel 119 within the display region 124 instead of interactive microchips 1601. Emissive microchips 1603 do not contain a selection device 515 to electrically couple the sensing IR diodes 502 to a sensing circuit for detecting light. Accordingly, the selection devices 515 may be embedded within the display panel 119 or disposed within a microchip located outside of the display region 124 of the display panel 119.

In FIG. 16D, a display panel 119 having an array of emissive pixels 207, an array of interactive pixels 208, and a plurality of interactive microchips 1601 and driving microchips 1603 in an alternating row arrangement within the display region 124 is illustrated according to an embodiment. In FIG. 16D, the interactive microchips 1601 and the driving microchips 1603 in the display panel 119 are arranged in alternating rows. The first row of microchips includes interactive microchips 1601. Immediately below the first row contains another row including driving microchips 1603. Thereafter, subsequent rows alternate between rows of interactive microchips 1601 and rows of driving microchips 1603. In an embodiment, the alternating row pattern is not every other row as illustrated in FIG. 16D. Rather, more than one row may include interactive microchips 1601 followed by more than one row of driving microchips 1603. As such, an alternating pattern of multiple rows of interactive microchips 1601 and multiple rows of driving microchips 1603 may be formed. Additionally, in an embodiment, the alternating row pattern includes an alternating pattern of a single row of interactive microchips 1601 followed by more than one row of driving microchips 1603. As such, the resulting microchip arrangement may be a plurality of single rows of interactive microchips 1601 separated by more than one rows of driving microchips 1603, or vice versa.

In an embodiment, the interactive microchips 1601 are electrically coupled with sensing IR diodes 502 to enable the sensing IR diodes 502 to detect light. The driving microchips 1603 are electrically coupled to emissive pixels 207 to emit light but not sense light. In an embodiment, alternating rows of interactive microchips 1601 and driving microchips 1603 enables an alternating pattern of one or more rows of interactive pixels 208 that emit and sense light and one or more rows of emissive pixels 207 that emit light but cannot sense light. As such, depending on the desired resolution for sensing IR diodes, the arrangement of interactive microchips 1601 and driving microchips 1603 may follow accordingly.

FIG. 16E illustrates a display panel 119 having an array of interactive pixels 208 and emissive pixels 207, and a plurality of interactive microchips 1601 and driving microchips 1603 in a checkerboard pixel and microchip arrangement within the display region 124 according to an embodiment. In an embodiment, the checkerboard microchip arrangement is an alternating arrangement of interactive microchips 1601 and driving microchips 1603 in both the horizontal (i.e., row) direction and the vertical (i.e., column) direction. In other embodiments, the alternating arrangement can be in either just the row or column direction. In some embodiments, a single interactive microchip 1601 alternates with a single driving microchip 1603 as illustrated in FIG. 16E. In some embodiments, a group of interactive microchips 1601 alternates with a group of driving microchips 1603 throughout the display panel 119.

In an embodiment depicted in FIG. 16F, the display panel 116 may have a pixel arrangement where each interactive pixel 208 is surrounded by emissive pixels 207. Each interactive pixel 208 includes a sensing IR diode that may sense light emitted from emitting LEDs in either the same interactive pixel 208 and/or surrounding emissive pixels 207. This arrangement may allow the display panel 119 to have different sensing and emitting resolutions. For instance, in touch applications the sensing resolution may be lower than the emitting resolution due to the fact that a finger likely spans across several pixels. Accordingly, in an embodiment, the display region 124 of the display panel 119 has a sensing IR diode density that is less than an emissive pixel density. Additionally, in instances where the sensing resolution may be higher than the emitting resolution, such as for surface profile detection, the sensing IR diode density may be higher than the emissive pixel density. As shown in FIG. 16F, interactive microchips 1601 and driving microchips 1603 are mounted on the display panel 119 within the display region 124 in a checkerboard pattern. Any microchip pattern is contemplated as long as the interactive pixels 208 are able to be electrically coupled to a selection device 515. For example, in an embodiment depicted in FIG. 16G, only interactive microchips 1601 are mounted on the display panel 119.

FIG. 16H illustrates a display panel 119 having a profile detection sensing area 1605 and a location detection sensing area 1607 with different densities of interactive microchips 1601, driving microchips 1603, and/or interactive pixels 208. As illustrated, the profile detection sensing area 1605 has a higher density of interactive pixels 208 than the location detection sensing area 1607. One reason for this discrepancy is that determining a location of an object does not require a high density of interactive pixels since the typical object, such as a user's finger, likely spans several rows of pixels. On the other hand, for determining a surface area of an object, such as a fingerprint, the pixel density needs to be at least 500 PPI. In an embodiment, the interactive microchips 1601 are located around the interactive pixels 208 within the profile detection sensing area 1605, whereas the interactive microchips 1601 are located scattered throughout the location detection sensing area 1607, although embodiments are not so limited. In an embodiment, the profile detection sensing area 1605 has a higher number of interactive microchips 1601 than the location detection sensing area 1607. In an embodiment, the display panel 119 has a greater number of interactive microchips 1601 than driving microchips 1603.

In utilizing the various aspects of this invention, it would become apparent to one skilled in the art that combinations or variations of the above embodiments are possible for emitting and sensing light with an interactive display panel. Although the present invention has been described in language specific to structural features and/or methodological acts, it is to be understood that the invention defined in the appended claims is not necessarily limited to the specific features or acts described. The specific features and acts disclosed are instead to be understood as particularly graceful implementations of the claimed invention useful for illustrating the present invention.

It will be apparent from this description that aspects of the invention may be embodied, at least in part, in software. That is, the methods described with reference to FIGS. 6D, 8D, 9D, 10C, 11E, 14, and 15D may be carried out in a computer system as illustrated in FIG. 1 or another data processing system in response to its processor(s) executing sequences of instructions contained in a memory or other non-transitory machine-readable storage medium. In various embodiments, hardwired circuitry may be used in combination with the software instructions to implement the present embodiments. Thus, the techniques are not limited to any specific combination of hardware circuitry and software, or to any particular source for the instructions executed by data processing system.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments may be implemented in, but not limited to, hardware or firmware utilizing an FPGA, ASIC, a processor, a computer, or a computer system including a network. Modules and components of hardware or software implementations can be divided or combined without significantly altering embodiments of the invention.

In an embodiment, a display panel includes a display substrate having a display region, an array of subpixel circuits, and an array of selection devices. Each subpixel circuit includes a driving circuit to operate a corresponding IR emitting LED within the display region in a light emission mode. Further, each selection device is coupled to a corresponding sensing IR diode within the display region to operate the corresponding sensing IR diode in a light sensing mode. In an embodiment, each selection device is a transistor coupled to at least a sensing circuit. The sensing circuit may be located outside of the display region and coupled to a processor for operating the display panel. In an embodiment, the arrays of subpixel circuits and selection devices are embedded within the display region of the display substrate. Each IR emitting LED and each sensing IR diode may be formed of inorganic semiconductor-based materials. In an embodiment, the display panel includes an array of interactive pixels. Each interactive pixel may include an IR emitting LED and a sensing IR diode.

In an embodiment, the display panel includes an additional LED in each interactive pixel. The additional LED may be selected from the group consisting of a red emitting LED, a green emitting LED, and a blue emitting LED. In an embodiment, the display panel includes an array of emission pixels. Each emissive pixel may not include a sensing IR diode. A density of emissive and interactive pixels may vary. In an embodiment, a density of emissive pixels is greater than a density of interactive pixels. In an embodiment, the array of subpixel circuits and the array of selection devices are embedded in the display substrate. The array of subpixel circuits and the array of selection devices may be in an array of interactive microchips mounted on the display substrate within the display region. Each interactive microchip may include at least one subpixel circuit and at least one selection device. In an embodiment, the display panel includes an array of driving microchips mounted on the display substrate within the display region. Each driving microchip may not include a selection device. In an embodiment, a number of driving microchips mounted on the display substrate within the display region is more than a number of interactive microchips. In an embodiment, the corresponding sensing IR diode of the display panel is a decoupled sensing IR diode. The decoupled sensing IR diode may be placed in an area typically reserved for emitting LEDs.

In an embodiment, a method of operating a display panel includes operating an IR LED mounted to a display substrate within a display region of the display substrate in a light emission mode, operating an IR diode mounted to the display substrate within the display region of the display substrate in a light sensing mode, detecting an intensity of light with the IR diode in the light sensing mode, and altering light emitted from the display panel in response to the detected intensity of light. Operating the IR LED in the light emission mode includes forward biasing the IR LED. Operating the IR diode in the light sensing mode includes non-forward biasing the IR diode. Non-forward biasing the IR diode includes reverse biasing the IR diode. Alternatively, non-forward biasing the IR diode includes zero biasing the IR diode. Detecting an intensity of light with the IR diode includes detecting light emitted from a source. The source may be selected from the group consisting of the IR LED, a red emitting LED, a green emitting LED, a blue emitting LED, and ambient light.

What is claimed is:

1. A display panel comprising:
a display substrate having a display region;
a row of interactive pixels within the display region, each interactive pixel comprising an infrared emitting light emitting diode (IR emitting LED) and a sensing infrared diode (sensing IR diode);
a row of interactive microchips within the display region and adjacent to the row of interactive pixels, each interactive microchip including a selection device to operate a corresponding sensing IR diode in the row of interactive pixels in a light sensing mode and a subpixel circuit comprising a driving circuit to operate a corresponding IR emitting LED in the row of interactive pixels in a light emission mode;
a row of emissive pixels within the display region, each emissive pixel comprising an IR emitting LED, wherein each emissive pixel does not include a sensing IR diode;
a row of driving microchips within the display region and adjacent to the row of emissive pixels, each driving microchip includes a subpixel circuit comprising a driving circuit to operate a corresponding IR emitting LED in the row of emissive pixels.

2. The display panel of claim 1, wherein each IR emitting LED and each sensing IR diode are formed of inorganic semiconductor-based materials.

3. The display panel of claim 1, further comprising:
an additional LED in each emissive pixel, the additional LED selected from the group consisting of a red emitting LED, a green emitting LED, and a blue emitting LED; and
an additional LED in each interactive pixel, the additional LED selected from the group consisting of a red emitting LED, a green emitting LED, and a blue emitting LED.

4. The display panel of claim 1, further comprising:
a second row of interactive pixels within the display region and adjacent to the row of interactive microchips, each interactive pixel comprising an IR emitting LED and a sensing IR diode;
wherein each interactive microchip includes a second selection device to operate a corresponding sensing IR diode in the second row of interactive pixels in a light sensing mode and a second subpixel circuit comprising a second driving circuit to operate a corresponding IR emitting LED in the second row of interactive pixels in a light emission mode.

5. The display panel of claim 4, further comprising:
a second row of emissive pixels within the display region and adjacent to the row of driving microchips, each emissive pixel comprising an IR emitting LED;
wherein each driving microchip includes a second subpixel circuit comprising a second driving circuit to operate a corresponding IR emitting LED in the second row of emissive pixels in a light emission mode.

6. The display panel of claim 5, wherein:
the row of interactive pixels and the second row of interactive pixels are on opposite sides of the row of interactive microchips; and
the row of emissive pixels and the second row of emissive pixels are on opposite sides of the row of driving microchips.

7. The display panel of claim 1, further comprising a plurality of rows of interactive microchips within the display region, and a plurality of rows of driving microchips within the display region, wherein adjacent rows of interactive microchips are separated by a plurality of rows of driving microchips.

8. The display panel of claim 1, further comprising an IR sense signal line connected to the row of interactive microchips.

9. The display panel of claim 1, wherein a number of the driving microchips within the display region is more than a number of the interactive microchips.

10. The display panel of claim 1, wherein each interactive microchip has a width of 1 to 50 μm, and each driving microchip has a width of 1 to 50 μm, each IR emitting LED has a width of 1 to 20 μm and each IR diode has a width of 1 to 20 μm.

11. The display panel of claim 1, wherein each selection device is a transistor coupled to at least a sensing circuit.

12. A method of operating a display panel comprising:
sending a write signal to a row of driving microchips within a display region of a display substrate to operate a row of infrared emitting light emitting diodes (IR emitting LEDs) mounted to the display substrate within a row of emissive pixels adjacent to the row of driving microchips within the display region in a light emission mode;
sending a sense signal to a row of interactive microchips within the display region to operate a row of sensing infrared diodes (sensing IR diodes) mounted to the display substrate within a row of interactive pixels adjacent to the row of interactive microchips within the display region in a light sensing mode;
wherein each emissive pixel does not include a sensing IR diode;
detecting an intensity of light with the row of sensing IR diodes in the light sensing mode; and
altering a light emitted from the display panel in response to the detected intensity of light.

13. The method of claim 12, wherein operating the IR emitting LEDs in the light emission mode comprises forward biasing the IR emitting LEDs, and operating the sensing IR diodes in the light sensing mode comprises non-forward biasing the sensing IR diodes.

14. The method of claim 13, wherein non-forward biasing the sensing IR diodes comprises reverse biasing the sensing IR diodes.

15. The method of claim 13, wherein non-forward biasing the sensing IR diodes comprises zero biasing the sensing IR diodes.

16. The method of claim 12, wherein detecting an intensity of light with the sensing IR diodes comprises detecting light emitted from a source selected from the group consisting of the IR emitting LEDs, red emitting LEDs, green emitting LEDs, blue emitting LEDs, and ambient light.

17. The display panel of claim 1, wherein:
each interactive pixel further comprises an emitting diode that emits a peak wavelength within a visible light spectrum of 400 nm to 700 nm;
each interactive microchip further comprises a second driving circuit to operate a corresponding emitting diode in the row of interactive pixels in a light emission mode;
each emissive pixel further comprises an emitting diode that emits the peak; and
each driving microchip further comprises a second driving circuit to operate a corresponding emitting diode in the row of emissive pixels in a light emission mode.

18. The display panel of claim 17, wherein each interactive microchip controls a plurality of interactive pixels within the row of interactive pixels, and each driving microchip controls a plurality of emissive pixels within the row of emissive pixels.

19. The display panel of claim 18, wherein each interactive microchip controls a plurality of interactive pixels within a second row of interactive pixels, and each driving microchip controls a plurality of emissive pixels within a second row of emissive pixels.

20. The method of claim 12, further comprising:
sending a write signal to the row of driving microchips cause a plurality of emitting diodes within the row of emission pixels to emit light at peak wavelength within a visible light spectrum of 400 nm to 700 nm; and
sending a write signal to the row of interactive microchips to cause a second plurality of emitting diodes within the row of interactive pixels to emit light at the peak wavelength.

* * * * *